United States Patent
Noonan

(10) Patent No.: US 10,425,527 B1
(45) Date of Patent: Sep. 24, 2019

(54) SYSTEMS AND METHODS FOR DETECTING AND CONTROLLING TRANSMISSION DEVICES

(71) Applicant: BINJ Laboratories, Inc., Scituate, MA (US)

(72) Inventor: Joseph S. Noonan, Scituate, MA (US)

(73) Assignee: BINJ LABORATORIES, INC., Scituate, MA (US)

(*) Notice: Subject to any disclaimer, the term of this patent is extended or adjusted under 35 U.S.C. 154(b) by 0 days.

(21) Appl. No.: 14/957,575

(22) Filed: Dec. 2, 2015

Related U.S. Application Data

(63) Continuation of application No. 13/887,300, filed on May 4, 2013, now Pat. No. 9,226,259, and a continuation-in-part of application No. 12/870,808, filed on Aug. 28, 2010, now Pat. No. 8,626,195, and a continuation-in-part of application No. 12/510,036, filed on Jul. 27, 2009, now Pat. No. 8,983,446, which is a continuation-in-part of application No. 12/157,530, filed on Jun. 11, 2008, now Pat. No. 8,238,936, which is a continuation-in-part of application No. 11/457,786, filed on Jul. 14, 2006, now Pat. No. 8,078,190, application No. 14/957,575, filed on Dec. 2, 2015, which is a continuation of application No. 13/887,300, filed on May 4, 2013, now Pat. No. 9,226,259, which is a continuation-in-part of application No. 12/231,437, filed on Sep. 2, 2008, now Pat. No. 9,037,098, which is a continuation-in-part of application No. 12/157,530, filed on Jun. 11, 2008, now Pat. No. 8,238,936, which is a continuation-in-part of application No. 11/457,786, filed on Jul. 14, 2006, now Pat. No. 8,078,190.

(60) Provisional application No. 61/642,526, filed on May 4, 2012, provisional application No. 61/264,838, filed on Nov. 30, 2009, provisional application No. 61/307,838, filed on Feb. 24, 2010, provisional
(Continued)

(51) Int. Cl.
| | |
|---|---|
| H04M 1/725 | (2006.01) |
| H04W 4/021 | (2018.01) |
| H04W 4/02 | (2018.01) |
| H04W 8/00 | (2009.01) |
| H04W 12/08 | (2009.01) |
| H04W 76/11 | (2018.01) |

(52) U.S. Cl.
CPC ....... *H04M 1/72572* (2013.01); *H04W 4/021* (2013.01); *H04W 4/025* (2013.01); *H04W 8/005* (2013.01); *H04W 12/08* (2013.01); *H04W 76/11* (2018.02)

(58) Field of Classification Search
CPC . H04M 1/72572; H04W 76/11; H04W 4/021; H04W 4/025
USPC .................................. 455/419, 418
See application file for complete search history.

(56) References Cited

U.S. PATENT DOCUMENTS

| | | |
|---|---|---|
| 4,054,754 A | 10/1977 | Nicodemus |
| 4,083,003 A | 4/1978 | Haemming |

(Continued)

*Primary Examiner* — Chuck Huynh
(74) *Attorney, Agent, or Firm* — Law Office of Carl Giordano, PC.

(57) ABSTRACT

Disclosed is a system for managing wireless transmitting devices in which a wireless transmission from a transmission device is detected within or about a set area and an allowability of the transmission device to continue transmitting is based on an identification information, of the device, a location of the device and a number being called by the device.

29 Claims, 31 Drawing Sheets

Related U.S. Application Data application No. 61/237,682, filed on Aug. 28, 2009, provisional application No. 60/699,281, filed on Jul. 14, 2005, provisional application No. 60/739,877, filed on Nov. 23, 2005.

(56) References Cited

U.S. PATENT DOCUMENTS

| | | |
|---|---|---|
| 4,638,496 A | 1/1987 | Jensen |
| 5,440,758 A | 8/1995 | Grube |
| 5,613,205 A | 3/1997 | Dufour |
| 5,966,655 A | 10/1999 | Hardouin |
| 6,031,490 A | 2/2000 | Forssen |
| 6,205,189 B1 | 3/2001 | Ha |
| 6,222,458 B1 | 4/2001 | Harris |
| 6,343,212 B1 | 1/2002 | Weber |
| 6,490,455 B1 * | 12/2002 | Park ............... H04K 3/45 370/342 |
| 6,580,372 B1 | 6/2003 | Harris |
| 6,687,506 B1 | 2/2004 | Girod |
| 6,765,492 B2 | 7/2004 | Harris |
| 6,907,254 B1 * | 6/2005 | Westfield ........... H04W 48/04 455/404.2 |
| 7,046,990 B2 * | 5/2006 | Grego ............... H04W 12/08 455/410 |
| 7,110,774 B1 | 9/2006 | Davis |
| 7,202,798 B2 | 4/2007 | Harris |
| 7,533,188 B1 | 5/2009 | Greger |
| 2001/0036821 A1 | 11/2001 | Gainsboro |
| 2002/0011119 A1 | 1/2002 | Bignell |
| 2002/0080954 A1 | 6/2002 | Felder |
| 2002/0087062 A1 | 7/2002 | Schmit |
| 2002/0098850 A1 | 7/2002 | Akhteruzzaman |
| 2003/0056043 A1 | 3/2003 | Kostadinov |
| 2003/0206112 A1 | 11/2003 | Harris |
| 2004/0009778 A1 | 1/2004 | Makuta |
| 2004/0033805 A1 | 2/2004 | Verma |
| 2004/0043774 A1 | 3/2004 | Lee |
| 2004/0113755 A1 | 6/2004 | Ricci |
| 2004/0198346 A1 | 10/2004 | Swensen |
| 2004/0203857 A1 | 10/2004 | Wang |
| 2004/0246139 A1 | 12/2004 | Harris |
| 2005/0046608 A1 | 3/2005 | Schantz |
| 2006/0099968 A1 | 5/2006 | Harris |
| 2006/0105758 A1 | 5/2006 | Maislos |
| 2006/0111062 A1 | 5/2006 | Cunningham |
| 2006/0132307 A1 | 6/2006 | Velhai |
| 2006/0160545 A1 | 7/2006 | Goren |
| 2006/0192709 A1 | 7/2006 | Schantz |
| 2007/0206542 A1 | 9/2007 | Proctor, Jr. |
| 2008/0043689 A1 | 2/2008 | Walter |
| 2009/0325566 A1 | 12/2009 | Bell |
| 2010/0159877 A1 | 6/2010 | Slakini |
| 2010/0159879 A1 | 6/2010 | Slakini |
| 2010/0176918 A1 | 7/2010 | Turner |

* cited by examiner

1500

1700

1902

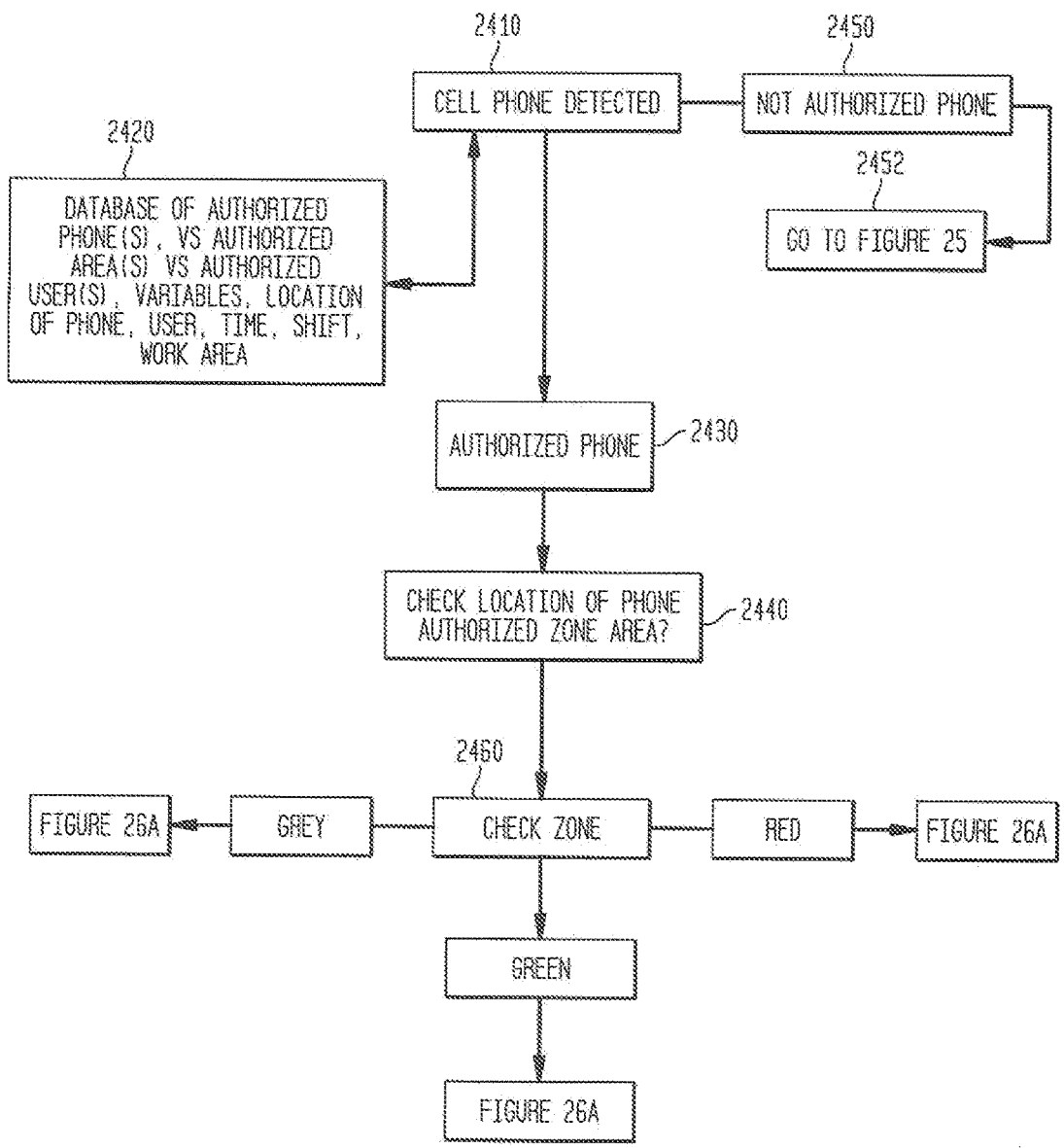

SYSTEMS AND METHODS FOR DETECTING AND CONTROLLING TRANSMISSION DEVICES

CLAIM OF PRIORITY

This application claims the benefit of the earlier filing date, pursuant to 35 USC § 120, as a continuation:

to that patent application filed on May 4, 2013 and afforded Ser. No. 13/887,300 (U.S. Pat. No. 9,226,259), which claimed the benefit of the earlier filing date, pursuant to 35 USC 120, as a continuation-in-part:

to that patent application filed on Aug. 28, 2010 and afforded Ser. No. 12/870,808 (U.S. Pat. No. 8,626,195), which claimed the benefit of the earlier filing date, pursuant to 35 USC 119, to U.S. Provisional App. No. 61/237,682, filed on Aug. 28, 2009 and to U.S. Provisional App. No. 61/264,838, filed on Nov. 30, 2009 and to U.S. Provisional App. No. 61/307,838 filed on Feb. 24, 2010, and further claims the benefit of the earlier filing date, pursuant to 35 USC § 120, as a continuation-in-part;

to that patent application filed on Jul. 27, 2009 and afforded Ser. No. 12/510,036 (U.S. Pat. No. 8,983,446), which claimed the benefit of the earlier filing date, pursuant to 35 USC 120, as a continuation-in-part;

to that patent application filed on Jun. 11, 2008 and afforded Ser. No. 12/157,530 (now U.S. Pat. No. 8,238,936), which claimed the benefit of the earlier filing date, pursuant to 35 USC 120, as a continuation-in-part;

to that patent application filed on Jul. 14, 2006 and afforded Ser. No. 11/457,786 (now U.S. Pat. No. 8,078,190), which claimed the benefit of the earlier filing date, pursuant to 35 USC § 119, of U.S. Provisional App. No. 60/699,281 filed on Jul. 14, 2005 and U.S. Provisional App. No. 60/739,877 filed on Nov. 23, 2005. The entire contents of all of which are incorporated by reference, herein.

patent application Ser. No. 13/887,300 (U.S. Pat. No. 9,226,259), further claims the benefit of the earlier filing date, pursuant to 35 USC 119, to that provisional patent application filed on May 4, 2012 and afforded Ser. No. 61/642,526. The entire contents of which are incorporated by reference, herein.

This application further claims the benefit of the earlier filing date, pursuant to 35 USC § 120, as a continuation:

to that patent application filed on May 4, 2013 and afforded Ser. No. 13/887,300 (U.S. Pat. No. 9,226,259), which claimed the benefit of the earlier filing date, pursuant to 35 USC 120 as a continuation-in-part:

to that patent application filed on Sep. 2, 2008 and afforded Ser. No. 12/231,437 (U.S. Pat. No. 9,037,098), which claimed the benefit of the earlier filing date, pursuant to 35 USC § 120, as a continuation-in-part to that patent application entitled filed on Jun. 11, 2008 and afforded Ser. No. 12/157,530, (U.S. Pat. No. 8,238,936), which claimed the benefit of the earlier filing date, pursuant to 35 USC § 120, as a continuation-in-part to that patent application filed on Jul. 14, 2006 and afforded Ser. No. 11/457,786, (U.S. Pat. No. 8,078,190), the entire contents of all of which are incorporated by reference, herein.

RELATED APPLICATION

This application is related to co-pending patent application entitled "Systems and Methods of Detection of Transmission Facilities," filed on Jul. 27, 2009 and afforded Ser. No. 12/510,006, which claimed the benefit, pursuant to 35 USC 120, as a continuation of that patent application entitled "Systems and Methods of Detection Transmission Facilities," filed in the United States Patent and Trademark Office on Jul. 14, 2006 and afforded Ser. No. 11/457,786, (U.S. Pat. No. 8,078,190), the contents of all of which are incorporated by reference, herein.

BACKGROUND

This invention relates to the field of wireless transmission and more particularly controlling the use of wireless communication devices in confined areas.

There are many facilities, such as government buildings, and in particular correctional facilities, such as prisons, that do not permit cellular phone usage or wireless transmission devices on the premises or even possession of cellular phones within the premises. Finding and preventing usage of cell phones and other transmission facilities is difficult, and a need exists for improved methods of detecting, locating, and managing the transmission of such devices particularly when an emergency call is initiated.

SUMMARY OF THE INVENTION

Provided herein are methods and systems for locating transmission devices (or transmission facilities) such as cellular phones, cell phones, mobile phones, satellite phones, radios, transmitters, PDAs, beepers, pagers, walkie-talkies, email devices, instant messenger devices, voice over IP devices, and other types of wireless communication or transmission facilities whose possession is prohibited. In addition, control of the devices is important as such wireless devices are known to be used to detonate bombs, as in the case of improvised explosive devices. The methods herein are also to positively identify, locate and track individuals with such transmission facilities. For example, the system provides the location and tracking of one or more individuals who utilize a wireless device to communicate and further determines whether the individual is authorized to transmit within a general area local to the individual. In one aspect, law enforcement may be interested in tracking the individual's identification and movements.

Methods relate to locating and managing the use and presence of wireless communication facilities are further disclosed. Embodiments relate to detecting wireless devices when they transmit a signal are further disclosed. Other embodiments relate to detecting of transmission devices when the transmission devices (i.e., facilities) are in a non-active transmission active state.

In embodiments the methods and systems disclosed herein include methods and systems for detecting a transmitting device within an obstruction rich environment. The methods and systems may include detecting the transmitting device within a wireless detection transmission facility; communicating signal information relating to the detected transmitting device from the wireless transmission detection facility to a central unit; determining the location of the transmitting device; displaying information of the detection and location of the transmitting device through a user interface; and providing the information to an action facility for causing actions related to the detected transmitting device. In embodiments, the wireless transmission detection facility is an antenna. In embodiments, the antenna is a dual dipole embedded antenna. In embodiments, the dual dipole embedded antenna is tuned to receive cell phone transmissions. In embodiments the dual dipole embedded antenna is tuned to receive a frequency band of approximately 700 to 950 MHz. In embodiments the dual dipole embedded antenna is tuned to receive a frequency band of approximately 1.7 to 2.0 GHz. In embodiments the dual dipole antenna is tuned to receive signals in frequency bands of approximately 700 to 950 MHz and 1.7 to 2.0 GHz. In embodiments the obstruction rich environment is a correctional facility. In embodiments the obstruction rich environment is a mall. In embodiments, communicating the information relating to the detected transmitting device from the wireless transmission detection facility to a central unit involves wireless communications. In embodiments, the wireless communications are 802.11 communications. In embodiments, determining the location of the transmitting device is accomplished through transmission triangulation. In embodiments location of the transmitting device is accomplished through a known location of a single antenna. In embodiments the location of the transmitting device is determined based on extrapolation of the receipt of a plurality of received signals through a series of non-iterative linear equations.

Disclosed is a system for managing wireless transmitting devices in which a wireless transmission from a transmission device is detected within or about a set area and an allowability of the transmission device to continue transmitting is based on an identification information, of the device, a location of the device and a number being called by the device.

BRIEF DESCRIPTION OF FIGURES

The systems and methods described herein may be understood by reference to the following figures:

FIG. 24A illustrates an exemplary process of determining authorized and/or unauthorized wireless communication devices.

FIG. 28 further illustrates an exemplary process of determining authorized and/or unauthorized wireless communication devices.

DETAILED DESCRIPTION OF THE INVENTION

Figure 1:
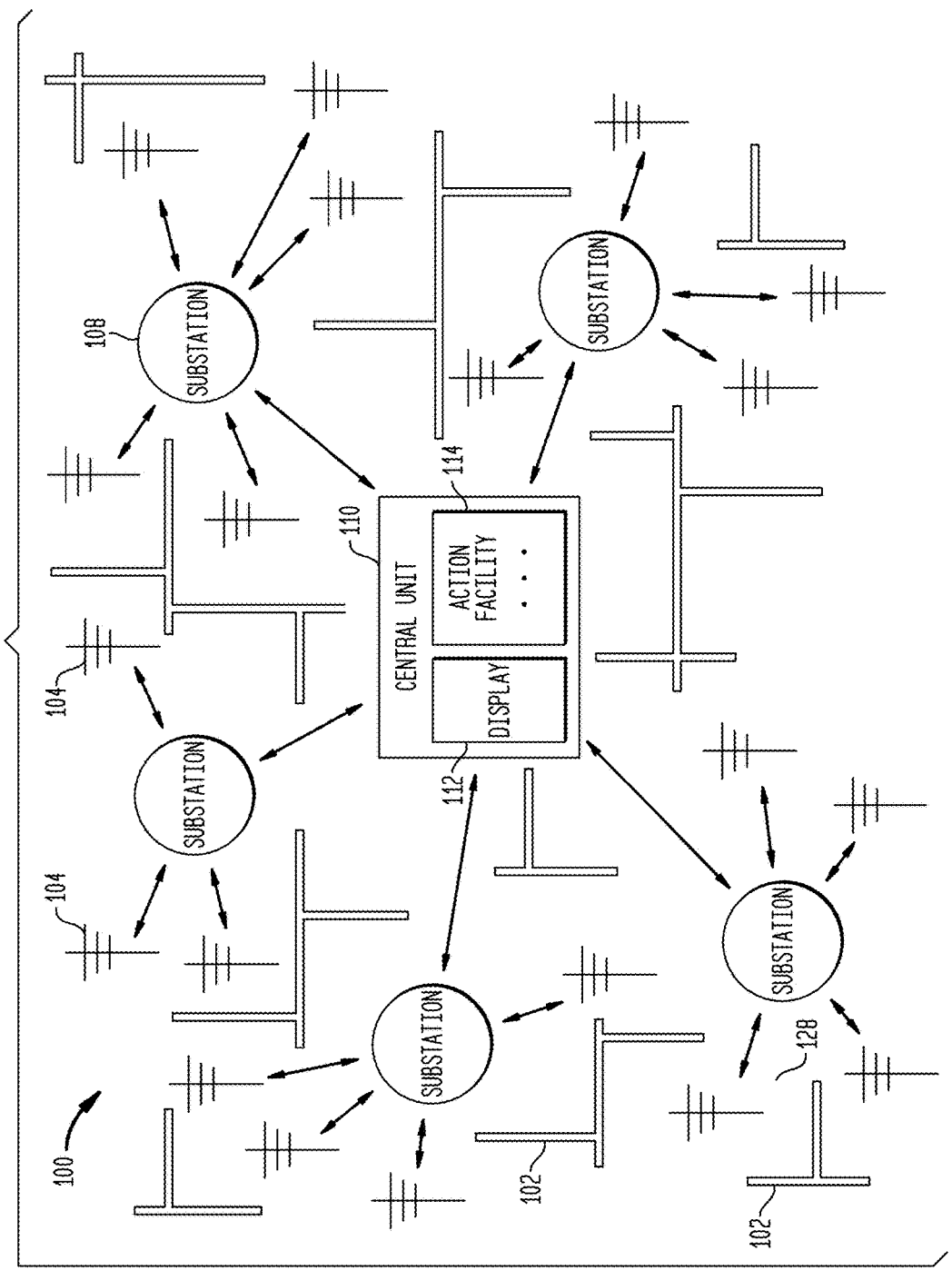
FIG. 1 shows a transmission detection, identification, and reporting system.
Figure 2:
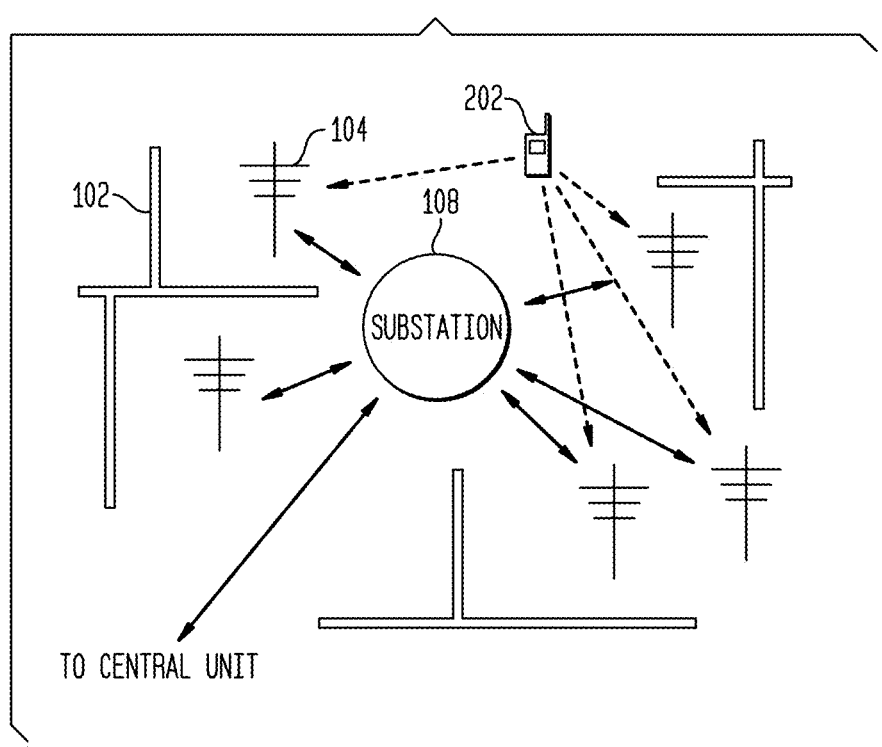
FIG. 2 illustrates a system for detecting a transmission facility

Detection of a transmission facility, such as a mobile phone or hand-held radio transmitter, or other transmission facility as described herein, within an obstruction rich environment, such as a facility with many physical barriers to electronic transmission, is difficult to achieve. Referring to FIG. 1, the transmission detection, identification, and reporting system 100 described herein provides a method of detecting a transmission facility 202, such as depicted in FIG. 2, within an environment rich in obstructions 102. One embodiment of the transmission detection, identification, and reporting system 100 may involve the detection of a mobile phone within a heavily walled and metal-barred government facility such as a correctional facility. In this embodiment, the system may utilize an array of antennas 104 selectively placed within the facility, collection substations 108 for localized collection of detected signals, a central unit 110 for the processing of incoming signals from the facility, a display 112 for showing the location of the detected transmission facility 202, and an action facility 114 for implementing standard procedures in the event of a detection. In this embodiment, the communications between the antennas 104 and the substations 108, and between the substations 108 and the central unit 110, may be wireless to make installation and maintenance of the system within the facility, cost and time effective. Selective placement of the antennas 104, combined with algorithms and methods for determining location of the transmission facility 202, may allow a substantially improved means for locating transmission facilities 202, such as mobile phones, in an otherwise heavily shielded environment.

Figure 3:
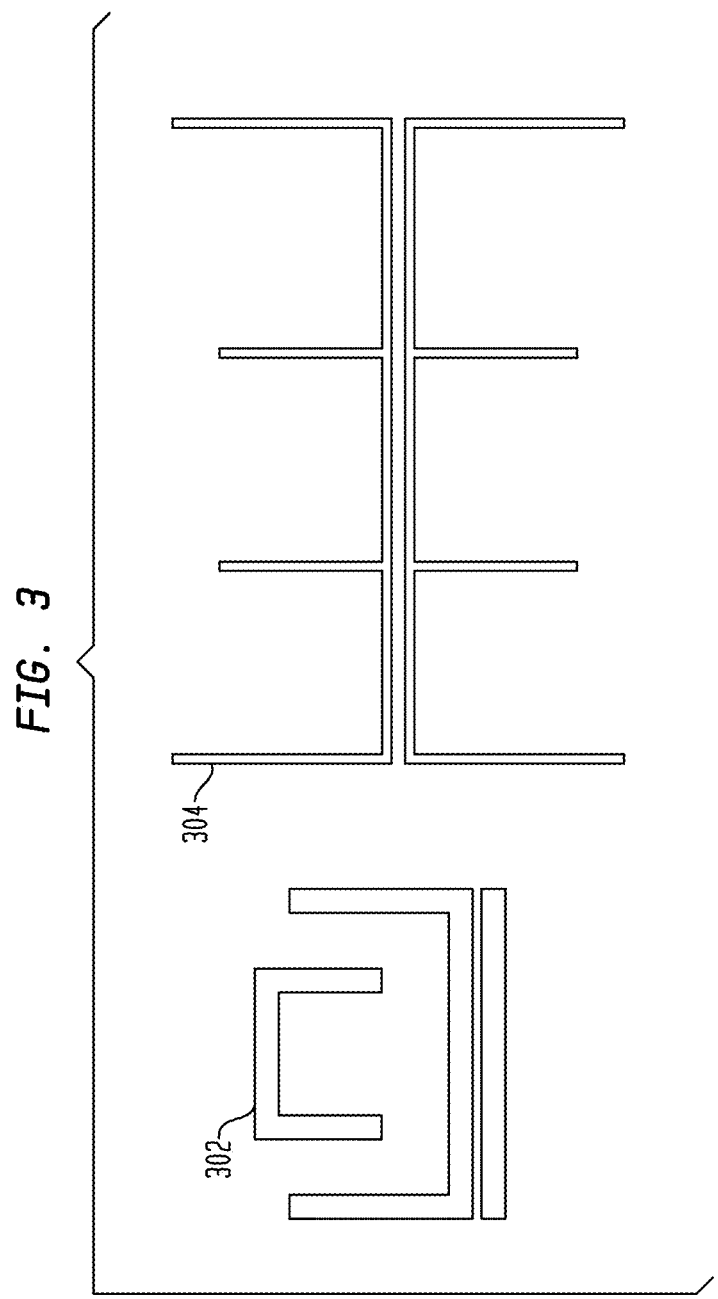
FIG. 3 illustrates exemplary antenna configurations.

In embodiments the antenna 104 may be a multi-dipole embedded antenna. Two examples of dual dipole embedded antennas are provided in FIG. 3 as a first dual-dipole embedded antenna 302 and a second dual dipole embedded antenna 304. In embodiments the antenna may be adapted to receive one, two, three, four, or more bandwidths. In embodiments the antenna 104 may be selected as one or more of a dipole antenna 104, a Yagi-Uda antenna 104, a loop antenna 104, a quad antenna 104, a micro-strip antenna 104, a quad antenna 104, a helical antenna 104, a phase array antenna 104, a patch antenna or a combination thereof.

In embodiments, the transmission facility 202 may be a mobile phone, such as a flip phone, a slide phone, a cellular phone, a handset, a satellite phone, a 3G phone, a wireless phone, a cordless phone or the like. In embodiments, the transmission facility 202 may be a radio, such as a Walkie-Talkie, a mobile radio, a short-wave radio, or the like.

In embodiments, the transmission band from the transmission may be within the radio or other electromagnetic frequency spectrum, such as extremely low frequency (ELF), super low frequency (SLF), ultra low frequency (ULF), very low frequency (VLF), low frequency (LF), medium frequency (MF), high frequency (HF), very high frequency (VHF), ultra high frequency (UHF), super high frequency (SHF), extremely high frequency (EHF), microwave, a frequency suitable for 802.11x wireless communications, ultra wide band (UWB), Bluetooth, or the like.

In embodiments, the obstruction rich environment 102 may be a building, such as a corrections facility, a school, a government facility, a store, a mall, a residence, a hotel, a motel, or the like. In embodiments, the obstruction rich environments 102 may be a large confined space, such as a courtyard, a food court, a recess area, a hallway, greenhouse, recreation room, gymnasium, auditorium, kitchen, cafeteria, craft area, work area, library, prison yard, or the like. In embodiments, the transmission obstruction 102 materials such as cinderblock, cement, rebar, wire cage, metal, metal coated surface, or the like. In embodiments, the obstructions in the obstruction rich environments 102 may be other construction materials, such as wood, glass, rug, flooring materials, roofing materials, and the like.

In embodiments, the transmitting signal information from the antenna 104 module to the central unit 110 may be through a communications connection, such as an IEEE 802.15.4 wireless network, IEEE 802.11 Wi-Fi, Bluetooth, Ethernet, and/or other similar type wireless communication protocols. In embodiments, the communications connection may utilize CAT-5, RJ-45, RS-232 connections, and/or other similar type wired communication protocols and hardware. In embodiments the communications connection may utilize an optical connection, such as a wireless infrared link, wireless visible light, an optical fiber, and the like.

In embodiments, the transmitting signal information from the antenna 104 module to the central unit 110 may contain data, such as CDMA, CDPD, GSM, TDMA, and the like, and may be used to discriminate which service signal is being used, such as Verizon, Cingular, T-Mobile, Sprint, and the like. The detection of the cell phones may be further resolved down to cell phone manufacturer and cell phone provider.

In embodiments, the transmitting signal information to the central unit 110 may be made through an intermediate connection, such as a substation 108, router, switch, hub, bridge, multiplexer, modem, network card, network interface, processing unit, preprocessor, computer, repeater, antenna 104, and the like. (see FIG. 2).

In embodiments, the central unit 110 may have in part a computer, a computer system, a network of computers, a state machine, a sequencer, a microprocessor, a digital signal processor, an audio processor, a preprocessor, a microprocessor, and the like.

In embodiments, the central unit 110 may process information, such as location information, such as the location of people, inmates, corrections personnel, visitors, all personnel within the facility, equipment, resources, weapons, products, incoming goods, outgoing goods, and the like. In embodiments, the information may be a type of signal, such as mobile phone standard protocols such as CDMA, CDPA, GSM, TDMA, and the like. In embodiments, the information may be an event notification, such as personnel under duress, an emergency medical condition, a call for assistance, a fire, a call for police, a theft, and the like. In embodiments, the processed information may allow for the tracking of the person or object in possession of the transmission facility 202, such as a mobile phone, a radio, a weapon, a product, a resource, and the like. In embodiments, the processed information may allow for the discrimination and/or association between people or objects, such as determining the ownership of the transmission facility 202, the assignment of the source of transmission, current location of a transmission facility 202 compared to its predicted location, and the like. In embodiments, the processed information may also have time codes and unique identifiers assigned.

In embodiments, the central unit 110 may have a display 112, such as a cathode ray tube (CRT), liquid crystal display (LCD), electronic paper, 3D display, head-mounted display, projector, segmented display, computer display, graphic output display, and the like. In embodiments, the central unit 110 may have an action facility 114, comprising a user interface for causing actions relating to the detected transmission facility 202. Actions may for example represent operations such as closing a door, sealing a room, deploying and action signal, initiating an alarm, and the like.

In embodiments the functions of a central unit 110 as described herein may be replaced by an alternate configuration, such as a configuration of multiple computers, such as a group of servers, processors, or the like, operating in parallel. In embodiments the methods and systems described herein may involve locating computing capabilities in alternative network configurations, such as in a mesh network or a peer-to-peer network.

In embodiments, the location of a transmission facility 202 may be determined by various radiolocation or signal measurement techniques, including measuring phase, amplitude, time, or a combination of these; or by identifying and locating an area associated with an antenna 104 with the highest signal strength. In embodiments, the location of a transmission facility 202 may be determined when the transmission facility 202 is powered off though detection of a null in the band-pass of a transmitted frequency sweep due to the presence of a mobile phone antenna.

In embodiments, a method of detecting a transmission facility 202 (e.g. cell phone) when the transmission facility 202 is not powered may require a transmitting device and a receiving device that can recognize the signature of an antenna 104 associated with the transmission facility 202. By transmitting a known frequency and receiving the disturbance pattern produced by having a particular antenna 104 design in the transmission path, the pattern or 'signature' of that antenna 104 can be characterized. In embodiments, this characterization may be evaluated by central unit 110 with results output to a display 112. A database of these signatures can be placed into the unit, and as the transmitter sweeps across the various cell frequencies, a pattern received can be matched against the database patterns to determine the presence of transmission facilities 202. In embodiments, any class of antenna (e.g. WI-FI, Blackberry, Walkie-Talkie, etc.) can be classified and identified.

In embodiments, the range of a hand held device that can detect an inactive transmission facility is approximately 10 feet. In embodiments, greater distances could be attained for stationary units by increasing the power.

Radiolocation, also referred to as radio-determination, as used herein, encompasses any process of finding the location of a transmitter by means of the propagation properties of waves. The angle, at which a signal is received, as well as the time it takes to propagate, may both contribute to the determination of the location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (iix) location based on proximity to known locations (including locations of other radio-transmitters), (ix) map-based location, or any combination of any of the foregoing, as well as other location facilities known to those of skill in the art.

Obstructions to radio wave propagation in the obstruction rich environments 102 may greatly reduce the effectiveness of many of the conventional radiolocation methods due to obstruction of the line-of-sight between the transmission facilities 202 and the receiving antennas 104. However, by employing a large array of antennas 104, positioned so as to maintain line-of-sight between possible transmission facility 202 locations and the receiving antennas 104, several of these methods may be effectively used in the location of the transmission facility 202. These methods include time difference of arrival, time of arrival, and angle of arrival, amplitude comparison, and the like. The time difference of arrival method determines the difference in the time, or the difference in phase, of the same radio-transmitting signal arriving at different receiving antennas 104. Together with the known propagation speed of the radio wave, allows the determination of the location of the transmission facility 202. The time of arrival method determines the absolute time of reception of the signal at different receiving antennas 104, and again, along with the known propagation speed of the radio wave, allows the determination of the location of the transmission facility 202. The angle of arrival method utilizes direction of transmission to different antennas 104 to determine the location of the transmission facility. Amplitude comparison method compares the strength of the signal detected at each antenna to determine the location of a transmission facility 202. For example, two antennas 104 located in the same room would detect different signal amplitudes for the same transmission facility 202 output, thereby providing a means of determining which antenna 104 the transmission facility 202 is closer to. Increasing the number of antennas 104 therefore increases the resolution with which the location of the transmission facility 202 may be determined. All of these methods, and combinations of these methods, may employ mathematical processes such as triangulation, trilateration, multi-lateration, or like, in determining the location of the transmission facility.

Triangulation is the process of finding coordinates and distance to a point by calculating the length of one side of a triangle, given measurements of angles and/or sides of the triangle formed by that point, such as the target transmission facility 202, and two other known reference points, such as the receiving antennas 104. The calculation of the location of the transmission facility 202 may then be performed utilizing the law of Sines from trigonometry. Tri-lateration is a method similar to triangulation, but unlike triangulation, which uses angle measurements, together with at least one known distance, to calculate the subject's location, tri-lateration uses the known locations of two or more reference points and the measured distance to the subject, such as the transmission facility 202, and each reference point, such as the receiving antennas 104. Multi-lateration, or hyperbolic positioning, is similar to tri-lateration, but multi-lateration uses measurements of time difference of arrival, rather than time of arrival, to estimate location using the intersection of hyperboloids.

While several radiolocation and triangulation techniques have been described in connection with locating the transmitting device, it should be understood that one skilled in the art would appreciate that there are other location methodologies and such location methodologies are encompassed by the present invention. For example, in embodiments, the location of a single antenna may be known and the single antenna may detect a transmitting device. The location of the transmitting device may be estimated through its known proximity to the single antenna location. This may provide adequate location resolution for certain applications of the technology. Similarly, two or more antennas may be used and each of the antenna locations may be known. When each of the antennas receives a transmission, the corresponding signal strengths may be compared. The one with the highest signal strength may be determined as the one closest to the transmitting device so the corresponding antenna location may provide enough location resolution for certain applications.

In an embodiment of the transmission detection, identification, and reporting system 100, a corrections facility, with its substantial and inherent obstruction rich environment 102, presents a significant challenge to authorities of the correction facilities. In an embodiment of the invention shown and described herein, the system may be placed throughout the corrections facility for the purpose of alerting the corrections staff that cell phone activity is taking place, the location of the activity and the type, i.e., Nextel, T-Mobile, Verizon, and the like. The following technology may also allow for a standalone detection unit 408 or set of detection units 408 (see FIG. 4) to detect cell phones in schools, buildings and other environments in which the facility's or area's provider does not wish the use of cell phones and is interested in the detection of cell phone use.

In an embodiment, the system may include an integrated antenna 104 and RF detector (together referred to as a detector unit 408) (FIG. 4), a substation 108, (FIG. 1) whose purpose may be to communicate with each detector unit 408 within its sector, and report activity to the central unit 110 which reports confirmed activity, type of cell phone, and location to the display 112 of the central unit 110. These detection units 408 may be used individually or in conjunction with each other and may triangulate detection within a specific area. The outside yard areas may be monitored by detection units 408, which may cover large areas, such as 25×25 foot sectors or smaller areas, e.g., 5×5 foot sectors, to localize the detection of a cell phone (i.e., wireless transmission facility) and track its position from one sector to any adjoining sector. That is, as the person moves with a phone, the changing position of that phone may be reported. If the phone moves inside the facility, tracking may continue as interior detection units 408 detect the phone.

In an embodiment, within these basic groups of detection units 408 may be various detection unit 408 types. Some detection units 408 may be designed to be hard wired via RJ-45 connectors and/or CAT 5e cable, other detection units 408 may use 802.11b (WI-FI) wireless communications between detection units 408, and there may also be an Infra Red (IR) set of detection units 408 which utilize optical communications techniques. Each communications type may have a specific purpose within the corrections facility or other type of building and/or areas. Hard-wired units may be used when it is not possible to use either an optical unit or a WI-FI unit. Used when there are walls embedded with metal or where the distance and the obstructions 102 may preclude a wireless technique. WI-FI detection units 408 may be used when it is effective to communicate in an area where there are obstructions 102 such as cement walls or cement with embedded rebar walls, facades, and the like. Optical detection units 408 may be used in areas where clear, line-of-sight communications may be possible. Optical detection units 408 may operate over relatively long distances, (e.g., 3,000 feet), while WI-FI detection units 408 may be limited to shorter distances, such as 250 feet.

In an embodiment, there may also be a hand-held detection units 408 to be used once a cell phone has been detected, and the corrections officer(s) or monitor are attempting to pinpoint the location. This hand-held detection unit 408 may be similar to the integrated antenna/detector unit of the main system. This embodiment may also include a detector, discriminator and decoder module. The hand-held detection units 408 may detect and identify each cell phone and compare the cell phone identity to the allowed cell phone user list or in this case to a list of unauthorized cell phones. This detector unit 408 may output an audible alarm whose pitch changes as the signal becomes stronger or weaker.

In an embodiment, a second type of hand-held detector unit 408 may be used to detect a cell phone when it is either off or in a standby condition, also referred to as null detecting. Null detection may be used at an ingress or egress of a building or an area as a way of detecting a communication device or device with an antenna. This technique may be used in areas where it is unpractical, unwanted or unwarranted to have x-ray machines or more intrusive detection systems. A null detection system may also be deployed in a handheld device so an inspector can move through an area attempting to detect a communication device. In embodiments, the null detection system may detect the presence of a transmission facility even when the transmission facility is not transmitting a signal. In embodiments, a hand held or mounted null detection device may be used in a correctional institution or other government facility.

In embodiments, null detection may utilize a transmission-detection source, independent of the transmission source being detected, which is capable of sweeping across the frequency spectrum of interest and receiving its returning signal. The transmission source sweeps the spectrum of interest, searching for distortions in the returned field. Distortions in the spectrum may be due to the presence of an antenna of a transmission facility 202. Matching the distortion, also referred to as a null in the band pass, to characteristics of known antennas used with mobile phones may allow the detection and/or identification of the transmission facility 202. The unit may output an audible "beep" if it detects a null, allowing the officers to focus in on the location of the cell phone. The range of the hand-held detection units 408 may be, for example, 15 to 20 feet. This will allow cell phones that are in the immediate vicinity to be quickly detected. The null detection may be applicable for ingress and/or egress detection.

In an embodiment, a survey may be performed to determine optimal placement and the type and number of detection units 408 required. This will insure the minimum number of required detection units 408 to perform optimal detection. The team may provide a report detailing the layout determined to be optimized for the facility and may review this report with the facilities staff so that any required modifications to the plan may be incorporated before installation is begun.

In an embodiment, the initial coverage of a facility may be in the cell blocks 402 (FIG. 4) and/or pod areas. The same may be true for linear facilities. The survey may cover the entire facility, including open areas, such as courtyards, where required. Inmate also work in large yard and plantations such as Angola State Prison, it is anticipated this technology may be deployed over a large outside area.

Figure 4:
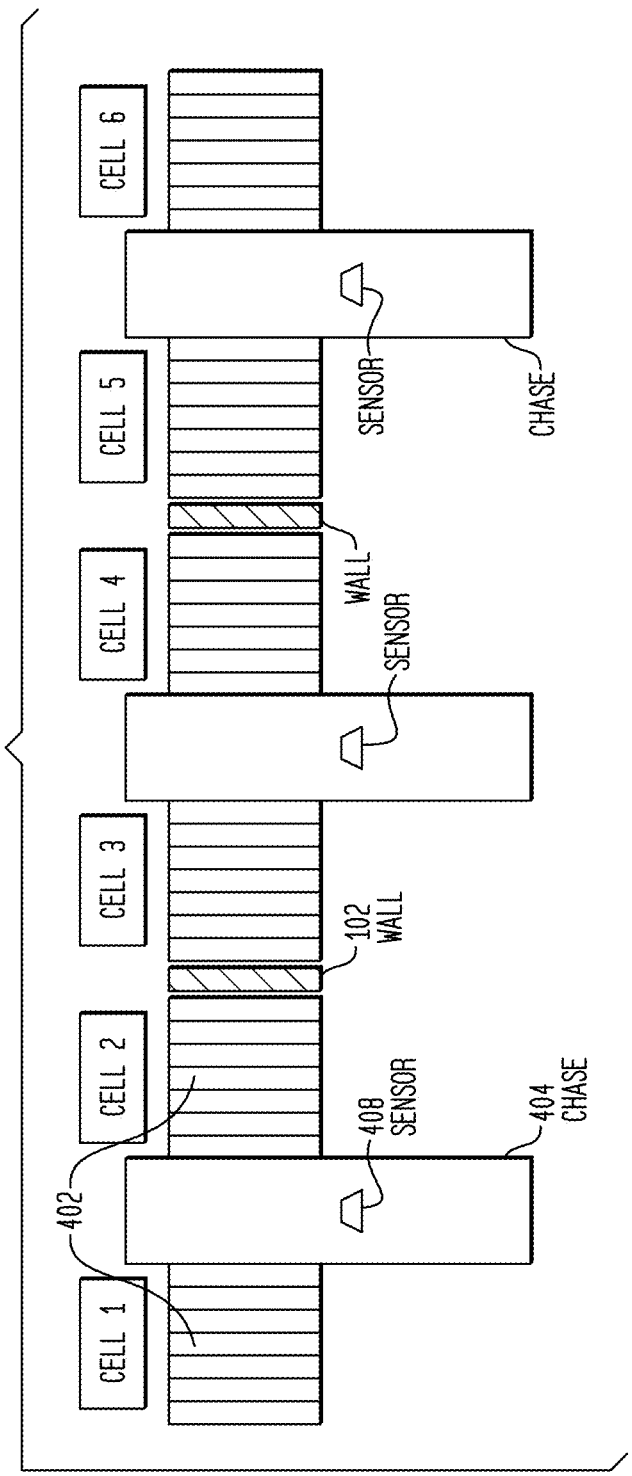
FIG. 4 illustrates a first system configuration for detecting a transmission facility in a cell environment.
Figure 5:
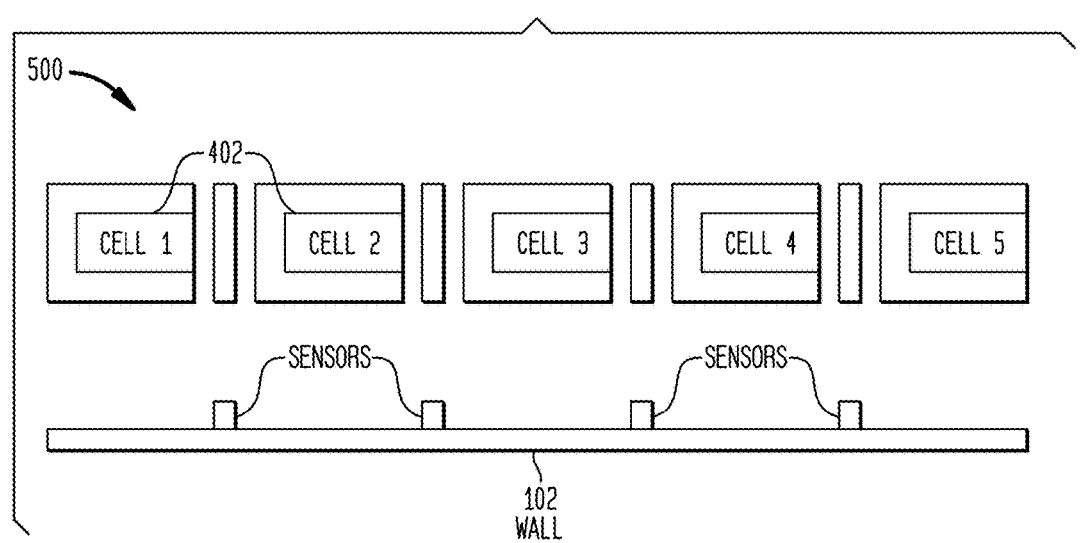
FIG. 5 shows a second system configuration for detecting a transmission facility in a cell environment.

In an embodiment, the cell block detection units 408 may be mounted inside each chase 404 (a column positioned between cells in a cell block that includes various utility facilities, such as for plumbing and electricity), as shown in FIG. 4, and may communicate to a substation 108 (not shown in FIG. 4) located at one end of the block. This detection unit 408 may communicate its information to the central unit 110 so that tracking, confirmation, and display may be accomplished. For linear facilities 500, as shown in FIG. 5, detector units 408 may be mounted along the walls in the obstruction rich environment 102 opposite the cells 402 and perform their function similar to the detection units 408 mounted within a chase 404.

Figure 6:
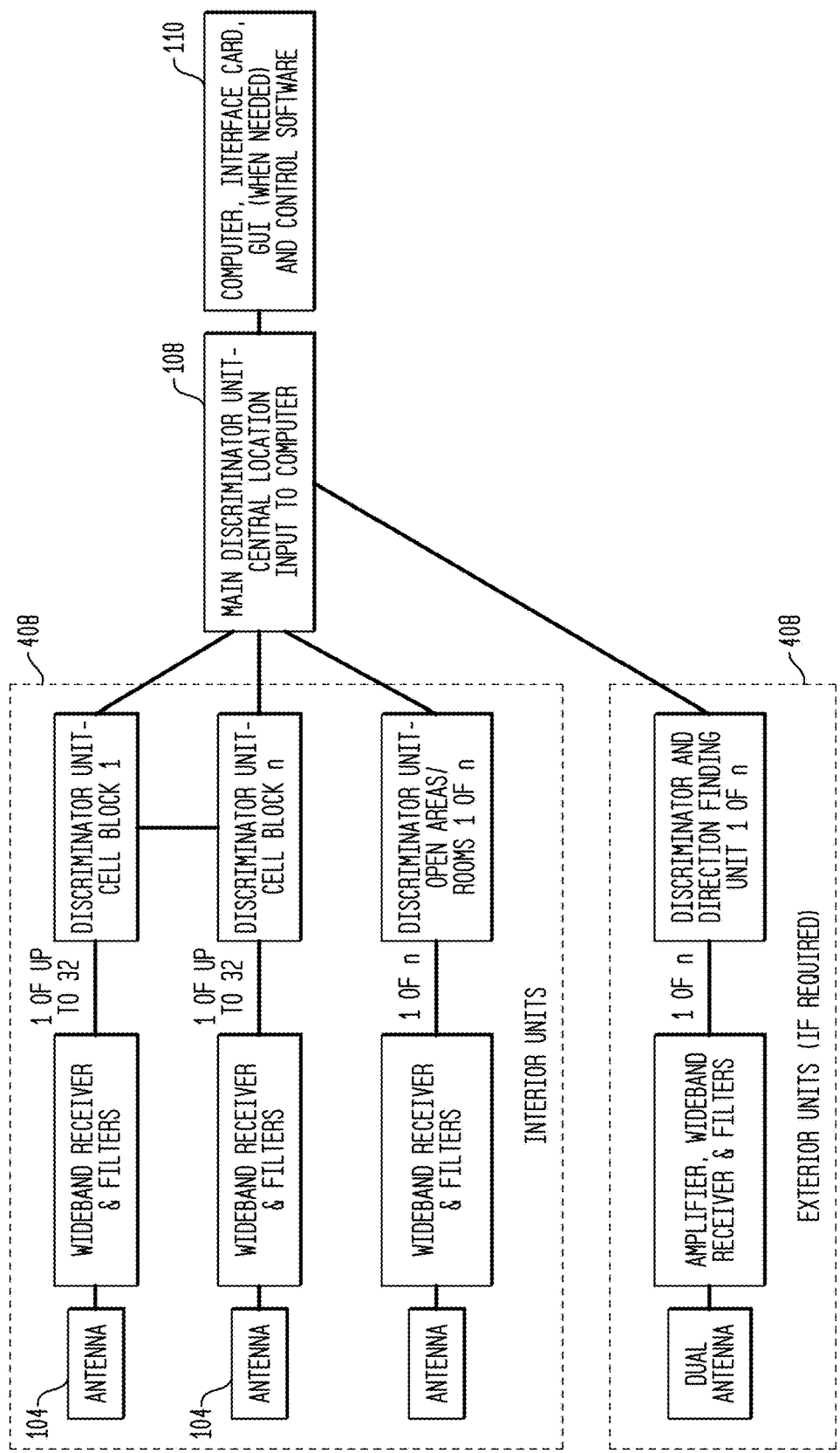
FIG. 6 illustrates a block diagram relating to actions taken when detecting transmission facilities.

In an embodiment, detector units 408 may be installed in open areas such as gymnasiums, kitchens, cafeterias, craft and work areas and other open areas where a cell phone may be used. The difference in these locations from the cell blocks 402 may include the method of detection and tracking. Since most facilities may only require the identification of a cell phones presence within a room, and there could be many inmates within that room, the process may be to lock-down the room, or rooms, in that area and use a hand held device and a physical search to pinpoint the phone location. A generalized block diagram of a detector unit 408 is shown in FIG. 6. For those facilities that require resolving the location within a large interior room or area, the use of triangulation to resolve to a 10×10 foot area may be used.

Figure 7:
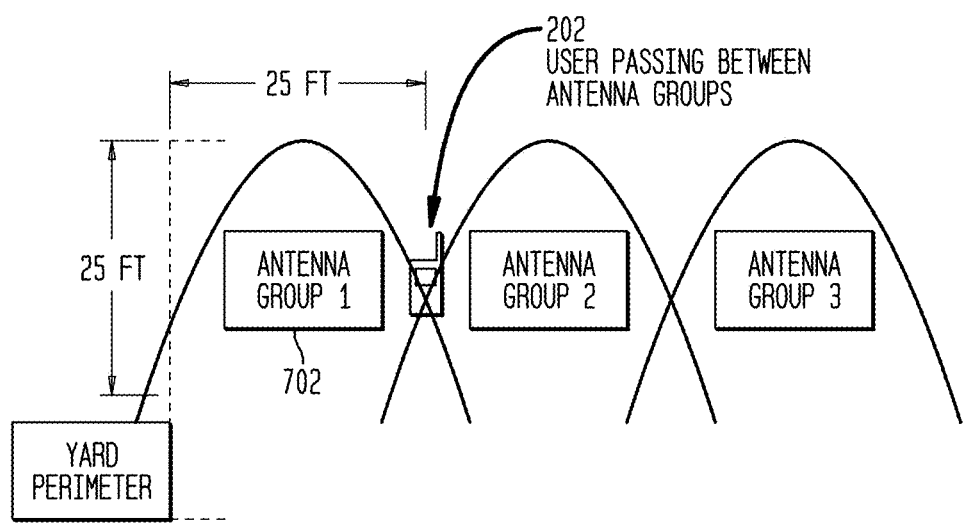
FIG. 7 shows a transmission facility detection system wherein an antenna array is used to determine location.

In an embodiment, facilities with the requirement to detect cell phones 202 in outside yard areas, the use of triangulation to a 25×25 foot space or smaller foot space (e.g., 5×5 foot) may be constructed. As a phone 202 is moved from area coverage 702 to area coverage 702, the system may track its movement. Each square foot sector may overlap an adjoining sector. In this way, as shown in FIG. 7, tracking may be continuous, without any gaps.

Figure 8:
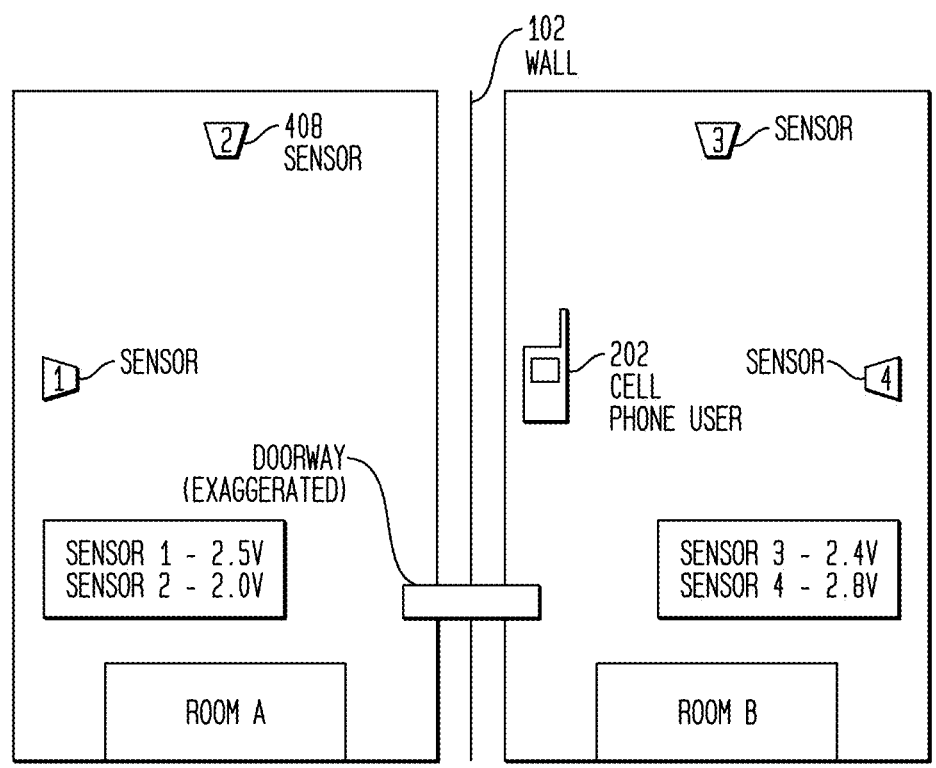
FIG. 8 shows a transmission facility detection system wherein a signal source is differentiated between two adjacent rooms.

In an embodiment, it may also be important to know whether a phone is located on one side of an obstruction or the other, such as doors, walls, and the like. If the wrong room is identified, it may make it more difficult to locate a phone and its user. As shown in FIG. 8, detection of the correct room may depend upon the level of the signal received. Proper placement of the detector units 408 may insure that the phone may be identified in the correct location.

Figure 9:
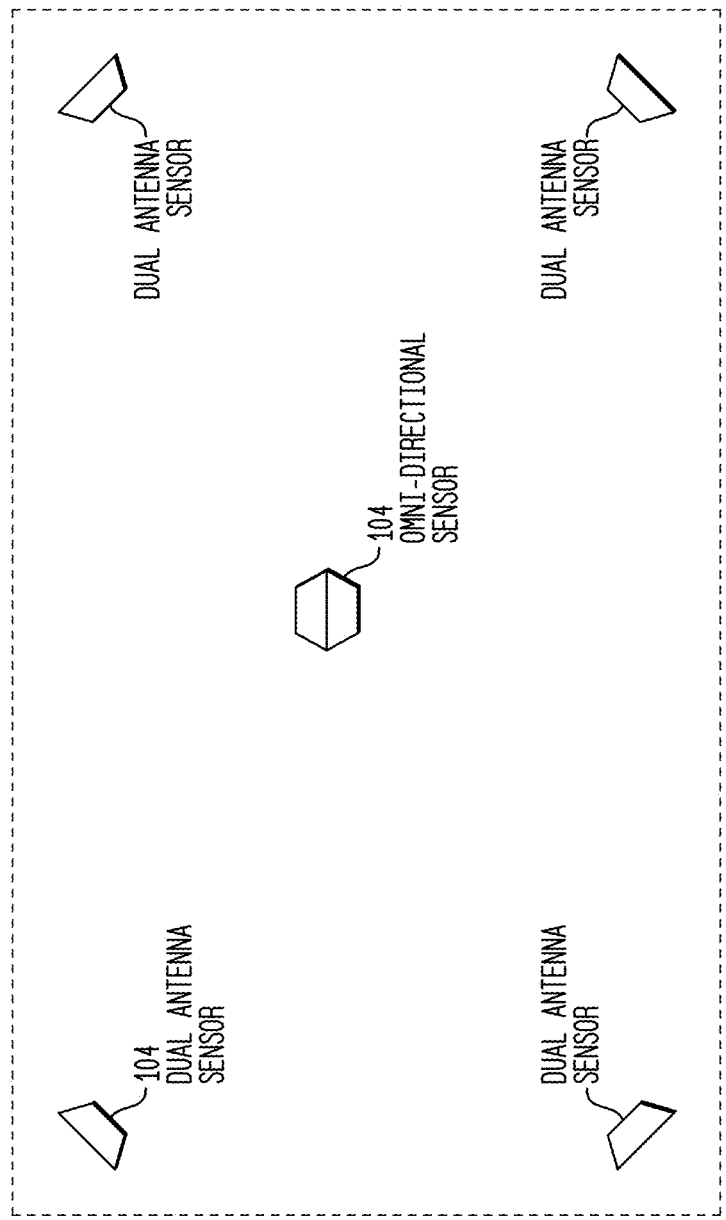
FIG. 9 illustrates a transmission facility detection system configuration employing multiple antennas are used to identify a location of a signal source after an omni-directional antenna has detected its presence.

In an embodiment, when sectoring a large room such as a gymnasium, the number and placement of antennas 104 may be critical. In order to sector large regions, such as a 10×10 foot section, within the room, the antenna 104 may need to be capable of narrowing their window to an area small enough to meet the requirement. In FIG. 9, there is shown an omni-directional antenna 104, which detects signal presence generally in a 360 degree direction. Once a signal crosses a threshold, the direction finding antennas 104 may be turned on to determine the position of the signal. This may be reported to the display 112 and tracked until it is either turned off or moves to another room or hallway. Then, normal positional tracking may take place.

In an embodiment, the transmission detection, identification, and reporting system 100 may work in conjunction with a personal alarm system, or an inmate tracking system, or a combination of all three and the like. This dual/tri role system(s) may allow for more cost effective use of the detection units 408 and provide for greater protection for the correctional officer and inmate alike. This detection system may utilize an individualized frequency, with known frequency separation between detection units 408 and between corrections officer's frequencies and Inmate frequencies. The detection configuration of the detection units 408 may provide complete coverage of the facility. Each transmission facility unit may be continually tracked throughout the facility. At all ingress or egress points the focus of the detection may ensure accurate location of all correctional and inmate personnel. With the combined systems more detection units 408 may be needed to ensure full coverage. In an embodiment, the known identity of the transmission facility, in this case a cell phone being carried and/or used by an officer or inmate can be accurately associated with another known identity of another transmission facility, in this case a corrections officer and/or inmate wearing a transmission facility. In this embodiment, the use of an authorized cell phone or an authorized transmission facility by an unauthorized person can be accurately detected and reported. This embodiment can be utilized inside the facility or outside the facility.

In an embodiment, the transmission detection, identification, and reporting system 100 may allow for cell phone owner discrimination. The system may provide for the allowance of authorized cell phones within the prohibited area. The system may detect and identify each cell phone and compare the cell phone identity to the allowed cell phone user list. The system may record all phone use and may automatically alert the facility of all prohibited cell phone use. In addition, each cell phone detection event may be identified with a unique identifier and time code, to ensure proper identification. The CCTV system may also be integrated to ensure greater accuracy identifying illegal use of wireless transmission devices.

Figure 10:
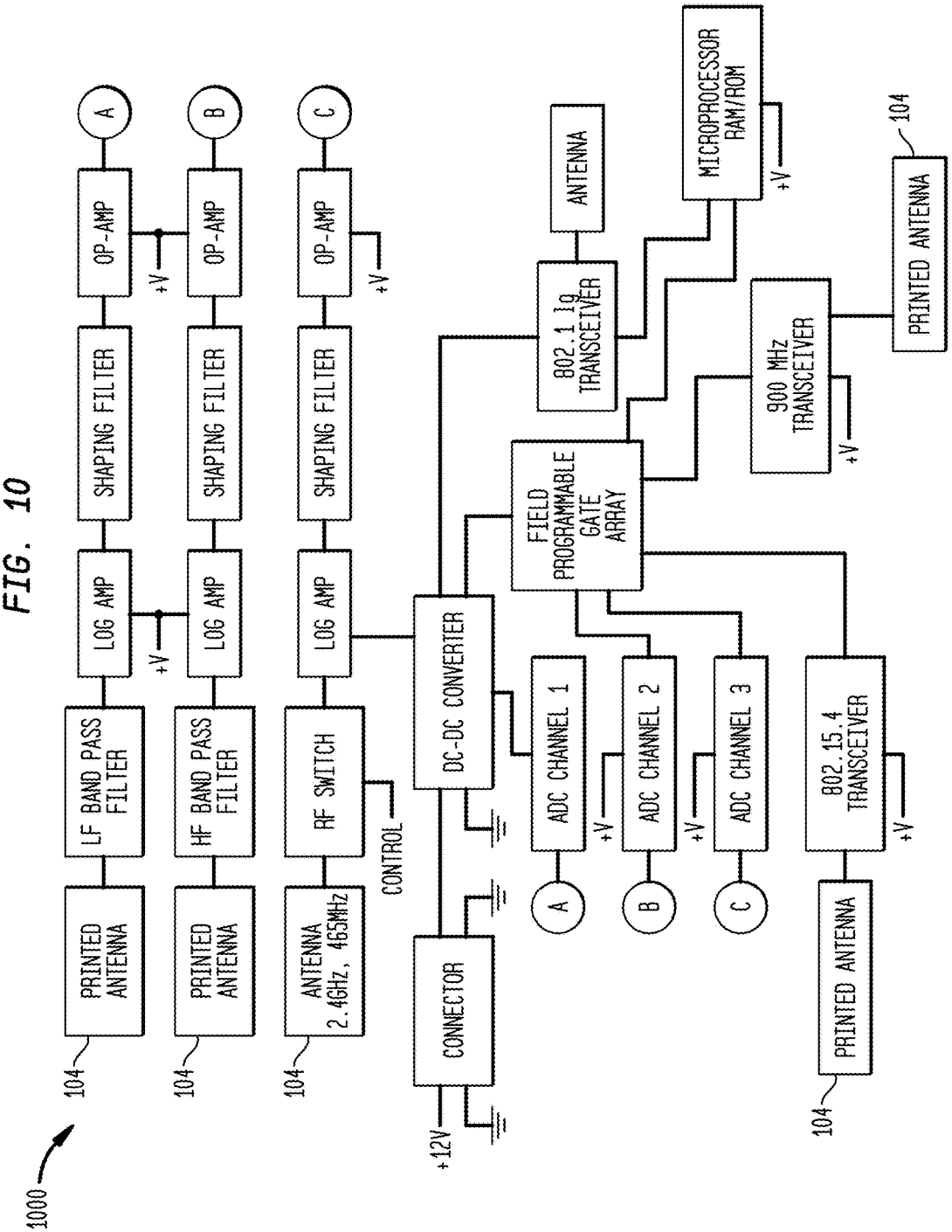
FIG. 10 shows a schematic diagram of a system for detecting signals of a transmission facility.

The cell scan-1 detection system 1000, shown in FIG. 10, is an embodiment of a system for detecting signals of a transmission facility. Antenna 104 receives transmission signals from wireless transmission device (not shown). Antenna 104 may operate, for example in the range of 2.4 GHz with a bandwidth of 465 MHz. The received signals are then provided to a low pass filter and a log amplifier, wherein the level of amplification is based on the input level of the input signal. The amplified signal is next provided to a shaping filter and an operational amplifier. The amplified signals are provided to an analog-to-digital (ADC) converter and provided to a Field Programmable Gate Array (FPGA). Information from the FPGA may be provided to a microprocessor to supplement the processing and control imposed by the FPGA. The FPGA may receive information from dedicated frequency bands (e.g., 9000 MHz) or from known wireless protocols (e.g., 802.15.4). The microprocessor may then determine whether a detected transmission facility for example is a person with a transmission facility (e.g., wristband, a cell phone) and may allow or prevent that person from accessing an area. The microprocessor may also alert the central unit of the persons entering or desire to enter a restricted area. In another embodiment, if the transmission facility, for example, is a cell phone and the cell phone was in use within a restricted area, the cell phone would be identified by the central unit as being in a restricted area, then the system will determine whether the cell phone is authorized or not authorized, then the system would make a determination, based upon set rules whether to allow or disallow the transmission unit within the restricted area.

The cell scan-1 detection system 1000, shown in FIG. 10, is an embodiment of a system for detecting signals of a transmission facility. An antenna 104 receives wireless transmission facilities in a 2.4 GHz band, with a 465 MHz antenna. In other aspects, the detection system may detect signals in other frequency bands, for example, 933 MHz, 433 Mhz, 2.4 GHz and other known frequencies. The detected signals are provided to High and Low band RF filter. The RF filters (band pass filter) isolate sets of frequencies for greater sensitivity. For example, the received signals may be provided to a low band RF filter to isolate low band RF signals and high band RF filters to isolate high band RF signals. The isolated RF signals are provided to Log Amplifiers that amplify or boost the signals using known amplification methods. The switch between two Wi-Fi frequencies switches all three wireless signal inputs into a log amp circuit and then to a smoothing filter to clean up the signal to be analyzed. The signals are then provided to an Operational Amplifier (Op Amp) which amplifies the received analog signal. The amplified RF signal is then processed through an A/D converter which changes the signal into a digital signal. The signal is then processed in a processing unit (in this case a dedicated Field Programmable Gate Array (FPGA)) and the results are then transmitted via a dedicated 2.4 GHz transceiver unit. The 2.4 GHz transceiver unit has several other applications, and is used to transmit and receive communication information and to connect to external Wi-Fi communication devices. An example of this is an education system for inmates, medical monitoring equipment in a hospital application, an interactive ID for safe school applications. The 900 MHz transceiver unit is for synch-ing the sensors. The 465 MHz transceiver unit is for communication with inmates bracelets and Staff (personal alarm system) as is further discussed in the aforementioned related patent applications. The lower frequency of the 465 MHz unit also provides better wall penetration and alterative wireless communication device with better wall penetration. In another embodiment, the front end of the signal detection circuit, an amplifier (e.g., 0-40 dB) gain is added before the RF filter (for example a 824-849 MHz RF filter) to provide for greater sensitivity. In addition, a mixer and Voltage Controlled Oscillator (VCO) (not shown) is added after the RF filter. The output of the mixer is an IF (intermediate) frequency that is amplified and then provided to a band pass filter (e.g., a 200 MHz filter with a bandwidth of 4 MHZ). The signal is then amplified and then provided to the Log Amp then to an Op Amp and then to the ADC (A/D). Depending on the noise floor (which is determined by proper grounding), one with an understanding of RF circuitry would know to have proper impedance matching between components, and will utilize transformer (s) where appropriate. The IF section's general parameters are 70 MHz to 350 MHz and sensitivity is related to frequency and the width of the band pass filter. As would be appreciated, the tighter the width of the band pass, the greater the sensitivity. In another embodiment, the VCO/mixer may be fixed and the IF band pass filter may be the bandwidth of a desired frequency providing for faster detection without the need to scan. Additionally, the greater the dynamic range of the sensor system, the greater accuracy and resolution in determining the exact location of the transmission facility.

In an embodiment as shown in FIG. 10, the processing section may be placed on a separate board, this provides for multiple sensors front ends utilizing one back end processing unit. This provide for more cost effective sensors and versatility of assets. This also allows for specific functionality such as antenna array directional location and angle tri-angulation being synchronized to at least one processing unit. It is also anticipated the more expensive processing component be shared such a transmission signal decoding, data analysis, communications and the like.

Figure 11:
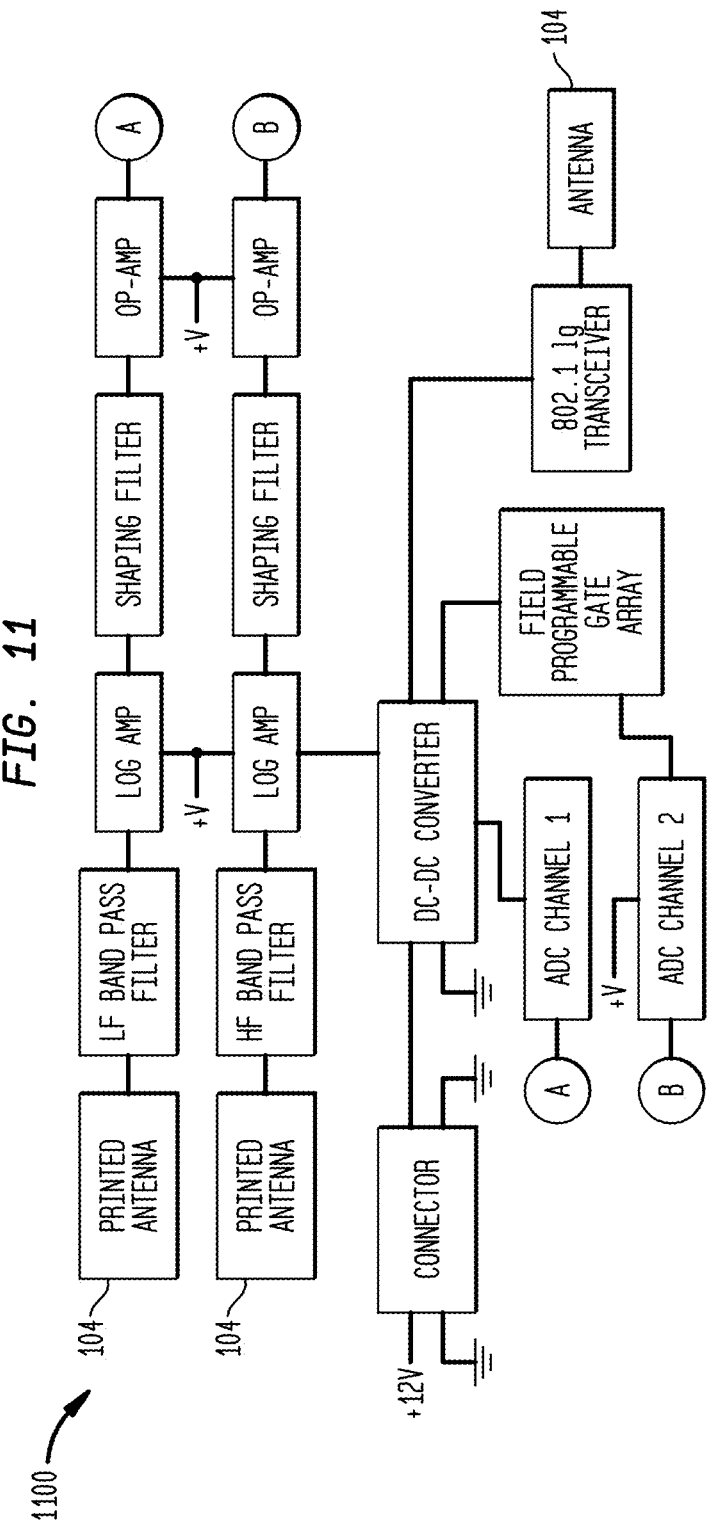
FIG. 11 shows a schematic diagram of an alternate embodiment of a system for detecting a signal of a transmission facility.

The cell scan-2 detection system 1100, shown in FIG. 11, shows an alternate embodiment of a system for detecting a signal of a transmission facility. The RF filters (i.e., band pass filter) isolate sets of frequencies for greater sensitivity, in this example a low band cell phone signals and high band cell phone signals. The operation of the elements in FIG. 11 is similar to that of FIG. 10 and need not be discussed in detail herein.

Figure 12:
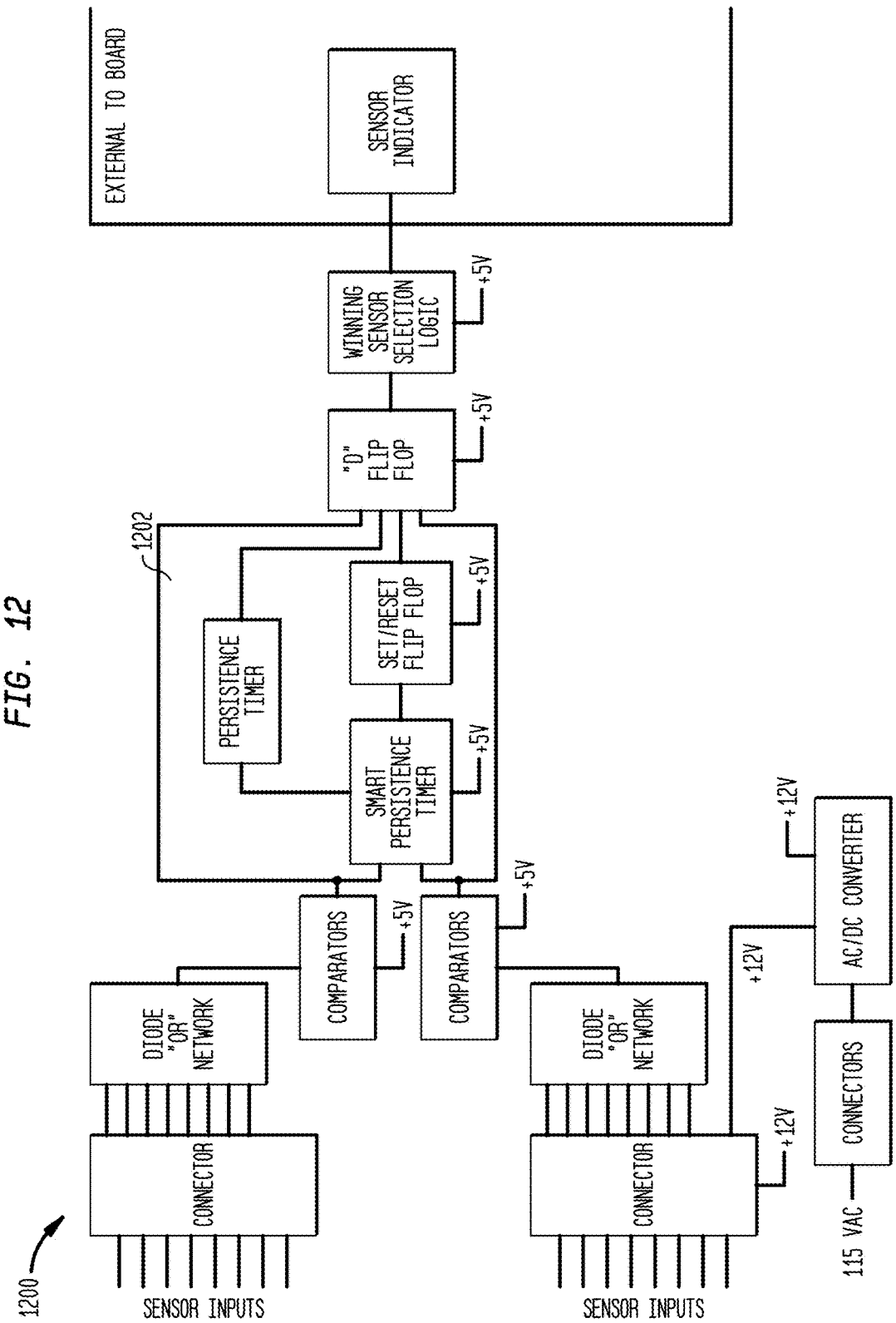
FIG. 12 shows a schematic diagram of a main circuit board within a system for detecting transmission facilities.

The main board system 1200, shown in FIG. 12, is an embodiment of a main circuit board within a system for detecting transmission facilities. The system may be used to determine each signal received is an actual cell phone signal and not a spurious output. Thus, a test may need to be performed that checks for the 'persistence' of the received signal. A persistence test may run a timer 1202 for a minimum required time that may be nearly as long as the time of the shortest signal type expected. If the signal is present at the end of the timeout period, it is less likely to be a spurious response and more likely that it is a cell phone output. For example, if a GSM signal of 500 microseconds long is the shortest duration signal of all the cell phone protocols received, the persistence test may run for 450 microseconds to further ensure that the received signal is not merely a spurious response.

Figure 13:
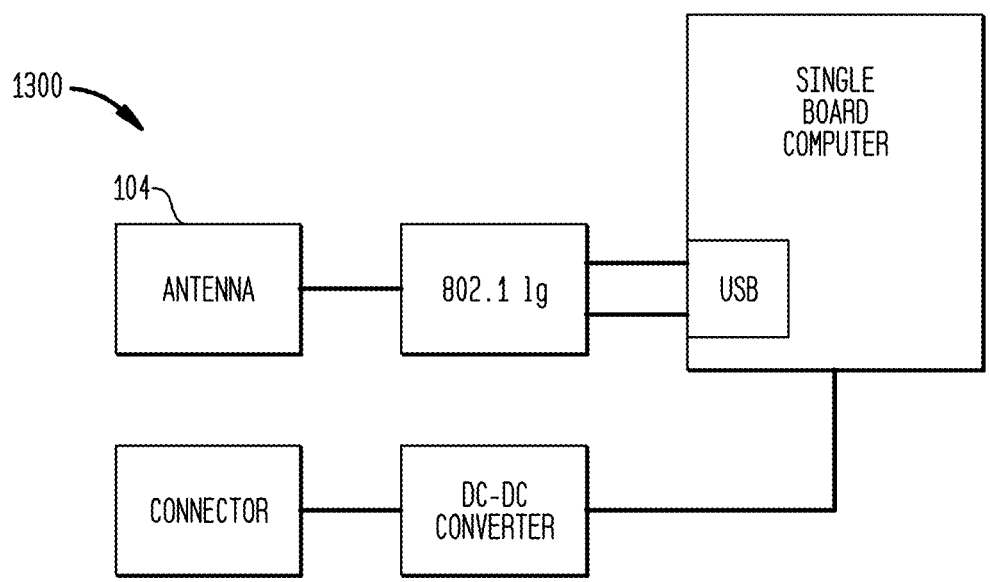
FIG. 13 shows a schematic diagram of a sub-station in a system for detecting transmission facilities.
Figure 14:
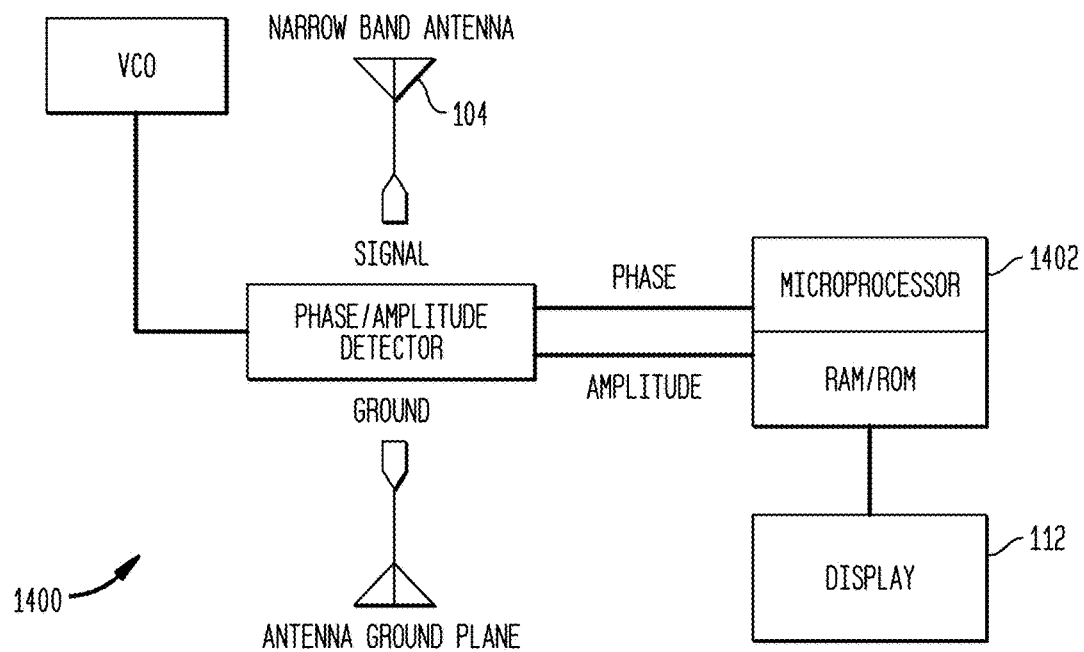
FIG. 14 illustrates a null detection facility.

The sub-station system 1300, shown in FIG. 13, is an embodiment of a sub-station in a system for detecting transmission facilities FIG. 14 illustrates an embodiment of a null detector (1400), wherein the VCO in FIG. 14 tunes to known antenna frequencies and the system detects a null in the known antenna frequencies in which the antenna is detected. In embodiments, the null detection system may detect the presence of a transmission facility even when the transmission facility is not transmitting a signal. In embodiments, a hand held or mounted null detection device may be used in a correctional institution or other government facility. In embodiments, null detection may utilize a transmission-detection source, independent of the transmission source being detected, which is capable of sweeping across the frequency spectrum of interest and receiving its returning signal. The transmission source sweeps the spectrum of interest, searching for distortions in the returned field. Distortions in the spectrum may be due to the presence of an antenna of a transmission facility 202.

In embodiments of the system described herein, detection levels may be determined by which output levels are possible with the various cell phone technologies that are in use today. Since the system described is an amplitude system, the strongest and weakest possible signals must be determined in order to identify the system's required dynamic range. Cell phone signals vary from −22 dBW to 6 DBW and this range defines the detection requirements of the system. This translates to a maximum signal of 4.0 Watts at the antenna. The minimum value is equal to 0.006 Watts or 6 milliwatts. Therefore, the dynamic range required is −52 dBm to +36 dBm. In order to achieve such a dynamic range, an amplifier that is gain adjustable is required such that with an input value of +36 dBm, the amplifier is not saturated.

In the embodiment, the system determines the characteristics required to insure that each cell phone is correctly identified. The amplitude of each signal is determined which allows the system to determine which sensor (i.e., transmission detection facility, antenna) has received the largest signal. The system time stamps each data sample so that other sensors receiving the same signal will be recognized as such when the data is presented for analysis. Each sensor analyzes the wave shape of the signal detected. Each transmission type (i.e., CDMA2000, PCS, TDMA, GSM, IS-95, etc.) has a unique wave shape. These wave shapes allow the analysis software to recognize that signals seen in different parts of a facility can be associated with each other (using time and wave shape) and the signal that consistently contains the largest amplitude will be identified as closest to the cell phone transmission In embodiments of the invention, signals directed toward an IED (improvised explosive device) may be intercepted, identified and denied service. Such interception may be up to a known range in forward and side quadrants. The identification and determination of the position of the person or persons using a satellite phone and/or land-based cell phone may be determined. Cell phones, as well as other RF devices, e.g., garage door openers, walkie-talkie, etc., may be captured, identified and/or jammed that are attempting to activate or contact the IED.

In embodiments of the invention, when a cell phone, for example, is on, but not in an active communication, the cell phone is essentially invisible to anyone attempting to monitor cell phone activity. In order to be aware of the existence of such "on but not transmitting devices" the system described herein operates as a cell tower. That is, the system actively addresses the problem of cell phone detection by operating (becoming) the tower. A vehicle with similar but modified equipment to that of a cell tower may actively poll the area of phones that are "on but not in a communication of any sort." The vehicle (i.e., Pseudo Tower) collects the current database of active phones and those phones in standby from the tower(s) in the area and uses this data base to poll these phones in order to locate them. Once potential phones that could be possible detonation cell phones are identified and located, the Pseudo Tower would affect a handoff and make itself the active tower. Thus, the captured cell phones are not allowed to rotate back to (i.e., connect to) the local cell phone tower, insuring that any calls attempting to communicate with the detonation cell phone will not be sent. As one of the goals is to identify the person who is attempting to contact the detonation cell phone, a call history of each suspect cell phone may be analyzed.

When a caller attempts to activate an IED, the caller's presence can be identified. Furthermore, the call being made is not forwarded to the detonation cell phone and the IED will not be activated. By determining a peak angle (triangulation) the caller's cell phone/satellite phone signal, the direction of the caller is then known. Direction identification is performed by using a technique such an interferometry. In this case, multiple antennas employing interferometry may be used to scan through the current cell phone traffic identifying first, candidate threats and then, pinpointing high probability locations which can be viewed through a high powered binoculars to determine whether the candidate is in need of investigation. Criteria for determining which cell locations may be threats is a pole or road sign, etc. The Pseudo Tower may continue controlling all of the phones in the area, preventing any forwarding of calls until all possible threats have been cleared. At this point, the personnel have the option of going after the caller or deactivating the IED, or both. It would be possible to clear the area and detonate the device later if that is a desired plan of action.

Given the varying parameters by which detonation can take place, the Pseudo Tower may also be designed to deny service to any active and inactive phone within a given geographical area and pinpoint the location of said phones.

Satellite cell phone transmission presents a somewhat different problem. Since the transmission from phone to satellite to phone is communicated to a number of satellites, becoming a replacement for the satellite will require cooperation from the provider. Via one or more specific codes, the satellites may be told that the vehicle mounted satellite simulator (i.e., Pseudo Tower) will be taking over the control of phones within a certain radius. Since this is a moving or ever changing circle, the replacement "satellite" will have to continuously update the actual satellite of its position and which phones are being released and which phones are being controlled. Once this function has been implemented, the control of the suspect phones is similar to that of the cell phone. Determining the caller's position and the location of the detonation phone is as above.

Figure 15:
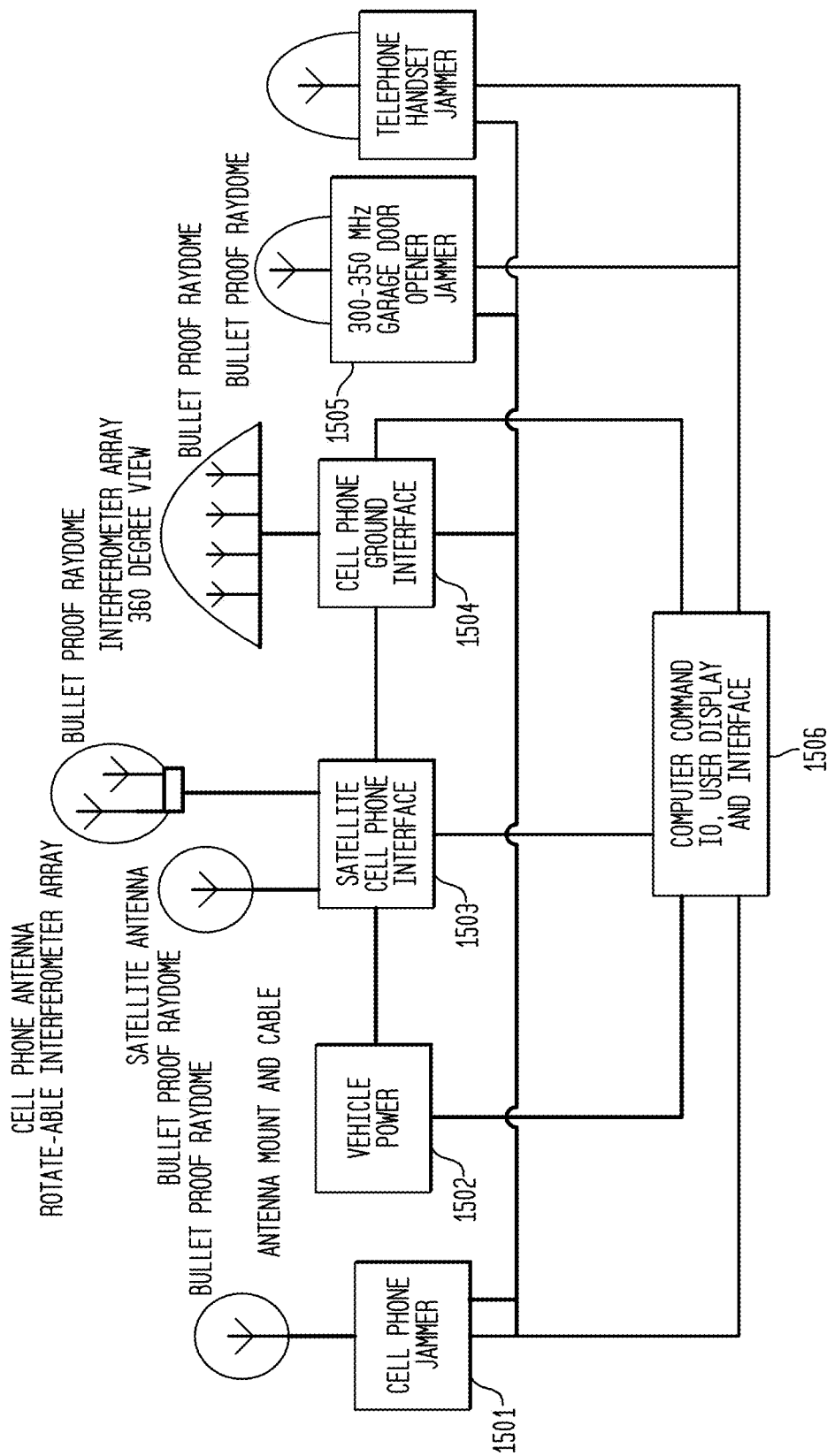
FIG. 15 Illustrates a system for detecting and controlling a transmission facility.

FIG. 15 illustrates an embodiment of a Cell Phone Detection, Control and Position Identification system (1500) in accordance with the principles of the invention which comprises cell phone jammer (1501) system that covers at least one of the known frequency ranges assigned to cell phone or mobile communication devices, a Power Unit (1502) that provides the necessary power to run all the units within the Cell Phone Detection, Control and Position Identification system 1500, Satellite Cell Phone Interface 1503 that operates as an interface and communications unit between the Cell Phone Detection, Control and Position Identification system 1500 and a satellite cell phone provider (not shown), a Cell Phone Ground Interface unit 1504, which includes base station technology for all communication devices operating within an area of interest. Also shown is an optional 300-350 MHz Jammer unit (1505) that operates to jam communication devices that communicate through an intermediary device, such as door openers, Walkie-Talkies and the like. It is anticipated that the system described herein to be modular and expandable to cover the entire frequency spectrum in which transmission facilities (cell phones, mobile communications devices) operate. The Computer Command I/O, User Display and Interface 1506, comprises a communication, command and control system ($C^3$) that manages communication, command and control of the detection system 1500. Unit 1506 may further comprise one or more databases, and/or processes to execute the processing described, herein. Although not shown it would be appreciated that Command I/O unit 1506 may be in communication, via a public or private network, to one or more devices to provide information to or obtain information from remote sites (not shown).

Figure 16:
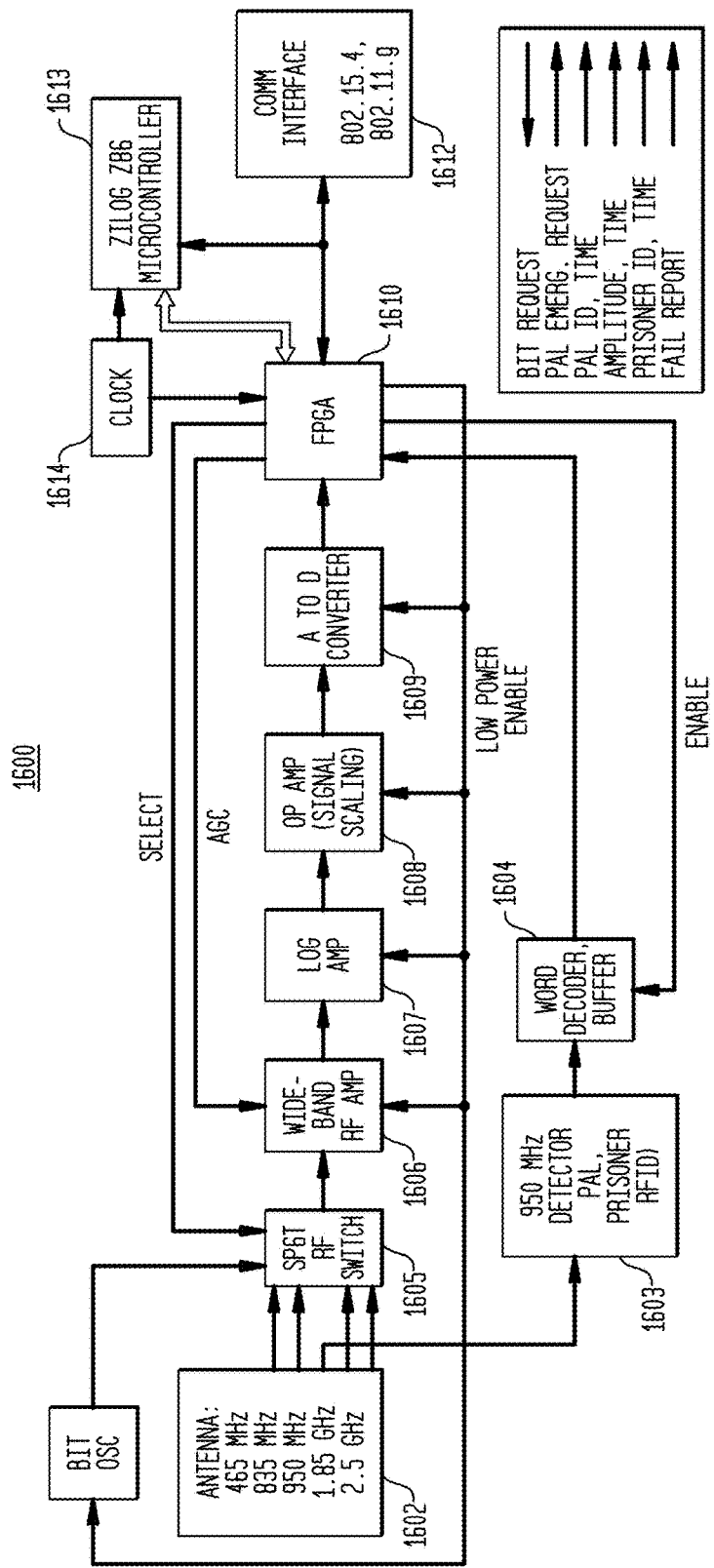
FIG. 16 Illustrates a system for tracking and locating transmission facilities.

FIG. 16 Illustrates a block diagram of an embodiment of a Cell Phone and Wireless Transmission Detection Facility in accordance with the principles of the invention. In the illustrated embodiment 1600, antenna 1602 is a multi-band directional array that operates to detect signals in a low band and in a high band (835 and 1.85 GHz range, respectively), a two way radio band (465 MHz), a Wi-Fi, a Bluetooth band (2.5 GHz) and PAL (Personal Alarm Locator) band (950 MHz). In the illustrated embodiment, the antenna connects to two components, first to a detector (1603) and also to a decoder (1604). The detector 1603 and decoder 1604 decodes the PAL Identification signal and may further decode biometric information, emergency information. In other embodiments, detector 1603 and decoder 1604 are configured to decode cell phone identifications. Antenna 1602 provides detected signals to a 6 way input switch (1605). The output of switch 1605 is connected to a wideband RF amplifier (1606). Wideband RF amplifier 1606 represents a variable gain amplifier that adjusts the detected signal amplitude based on the band in which a detected signal is detected by antenna 1602. In another aspect of the invention switch 1606 may be connected to a block gain amplifier (not shown) to provide amplification of the detected signal and the amplified detected signal may then be provided to a corresponding RF filter based on the frequency band of the detected frequency.

The wideband RF amplifier 1606 is connected to a Logarithmic amplifier 1607 (i.e., log amp) that amplifies the received or detected signal using an logarithmic function. Log amplifiers are well-known in the art to provide a larger amplification of a weak signal and a smaller amplification of a strong signal. The output of Log amplifier 1607 is provided to an Operational amplifier (OpAmp) 1608. The OpAmp 1608 amplifies the input signal and provides the amplified input signal to an A/D converter 1609 for conversion of the input analog signal to a digital signal. The converted (i.e., digital) signal is then provided to a FPGA (Field Programmable Gate Array) 1610 for subsequent processing. FPGA 1610 controls the operation of the illustrated Cell Phone and Wireless Transmission Detection Facility 1600 through feedback signals to switch 1605, for example. FPGA 1610 controls which signal frequency band and signal frequency is evaluated in what sequence. In the illustrated embodiment, FPGA 1610 communicates with the other sensors and/or access points via a communication interface 1612. In one aspect of the invention, communication interface 1612 may communicate with one or more wireless communication devices that operate using well-known IEEE wireless standard communication protocols (e.g., 802.15 and 802.11). In another embodiment, the communication interface may operate as a transceiver (transmitter/receiver) that may interface with two-way wireless transmission devices such as Walkie-Talkie or cellular telephone phones. The FPGA 1610 also interfaces with a microprocessor 1613, e.g., a Zilog Z86, an Intel xx86 series, Motorola Power PC. Processor 1613 may assist in the decoding, and operation of the Cell Phone and Wireless Transmission Detection Facility 1600. FPGA 1610 and the microprocessor 1613 may be synchronized by a crystal clock 1614. In other embodiments of the invention, the communications may be via a category 5 network interface connection in conjunction to the communication Interface 1612. Although an FPGA is referred to and illustrated in the embodiment of the invention, it would be recognized by those skilled in the art that the processing described by the FPGA may also be performed in other specific processor or processors (e.g., ASIC) or in a general purpose processor which when loaded with and executing an applicable software module converts the general purpose processor into a special purpose processor. As would be recognized, the system shown in FIG. 16 is similar to those shown in FIGS. 10 and 11.

Returning to the embodiment of the Cell Phone Detection, Control, and Position Identification system shown in FIG. 15, control of a wireless communication device (i.e., transmission facility 202) may utilize jammers, base station technology, Wi-Fi, and 3rd party base station technology, to acquire, control, obtain location and/or to stimulate a wireless communication device, which may be, in an active, non-transmitting, state or in a standby state.

The embodiment shown in FIG. 15 utilizes a high level of signal detection sensitivity to detect the presence of a wireless communication device (transmission facility) within a known distance from the transmission detection facility. As power is a critical component when dealing with wireless transmission devices, the communication protocol typically, by design, causes communication with the largest available signal source. Typically, this is the closest source (i.e., base station).

In accordance with one embodiment of the invention, the jammer units 1501 may jam or interfere with one or more frequencies or frequency bands to force wireless communication device within a local area to lose contact with an available base station and/or access point and to reacquire a connection to a local base station cell tower and/or access point. When the transmission facility (wireless communication device) initiates a process (referred to as hand-shake) to re-acquire a communication link with the available local base station cell tower, the communication link is diverted to a, and re-acquired by, the detection system 1500 (which is referred to as a pseudo-base station) due to the greater signal power of the pseudo-base station. In another aspect of the invention, the pseudo-base station power is raised so as to be greater than an actual cell tower signal strength. Thus, the cell phone, for example, will transition to the larger signal strength of the pseudo-base station and establish a communication with the pseudo base station. In a further aspect of the invention, the pseudo-base station may actively poll the area for cell phone (transmission facilities), and trigger the cell phones within an area of interest to cause the cell phones within the area to attach to the pseudo-base station.

In one aspect of the invention, where the application is to control the transmission facility within a local area, and to prevent communications from reaching the transmission facility of interest, the pseudo-base station may deny transmission of signals from the transmission facility to an actual base station or deny transmission of signals from the base station to the transmission facility.

In an embodiment of the invention where it is important to identify and not control the transmission facility within an area of interest providing greater power, polling, control line request, interleaving existing towers and/or jamming to force the transmission facility to communicate its identification parameters. In this embodiment of the invention, gaining control of the cell phone (or wireless communication device or transmission facility) within the area of interest allows the system to prevent incoming and/or outgoing communications. Thus, as the wireless communication device is re-acquiring a communication link with the access point or base station, the wireless communication device provides its identification information that positively identifies each transmission facility within the area of interest. This identification information may be provided to the actual cell tower provider, which uses this information to individually disable the cell phone (transmission facility) from receiving or transmitting data, voice and/or communicating in any manner.

In an embodiment, the detection system 1000 (see FIG. 10) is synchronized with an access point, an/or base station technology. This synchronization allows the tracking and positive identification of each transmission facility within an area of interest. In this example, the transmission facility of interest (a triggering device) may be connected to or trying to communicate with another transmission facility, such as a cell phone or a land line phone.

In an embodiment, of the Cell Phone Detection, Control, and Position Identification System shown in FIG. 15, determines the identification of an incoming caller based on information contained in the transmission signal and does not allow connection to the wireless network while determining the location of the caller by triangulating the caller from a plurality of detected signals and tracks the caller thereafter. In this embodiment of the invention, the system shown in FIG. 15 disables the wireless device from receiving or transmitting signals from/to the wireless network and tracks the caller using the wireless device. The Cell Phone Detection, Control, and Position Identification System described in FIG. 15 also has the capacity to track wireless transmission facilities from great distances, and in this application, the system is mobile, therefore, tracking the caller. In one aspect of the invention, where the cell phone or transmission facility information is known, as determined through its communication with a pseudo-base station, for example, additional information can be gathered, requested and/or, extracted from the cell phone or transmission facility. Information such as other transmission devices, cell phones, etc., that have been contacted or which have data transferred may be gathered, requested and/or extracted.

In an embodiment where information redundancy and positive authorization is important and positive identification is critical, the tools used in the school bus safety application egress point and school tracking system have direct applicability to positive identification of personnel and prison system automation, cost effectively tracking and monitoring lower threat classified inmates and staff and inmate safety. Safety application and tracking systems are more fully disclosed in the aforementioned related patent applications, whose contents are incorporated by reference herein. The tools and application described may include facial recognition, retina scan technology, card swipe, fingerprint analysis, in preventing escapes and misidentification within a prison environment.

In an embodiment where positive identification of the transmission facility 202 and positive identification of the user of the transmission facility 202 is important, as discussed earlier hand-held detection units 408 detector decoding module (and or chipset) or a hand-held detection units 408 in sync with the pseudo-base station/wireless access point module provides the location and the identification of the transmission facility 202 or in this case, for example a cell phone or a 802.xx (e.g., 802.11a/b/g/n, 802.15) communication device. In corrections facilities, outside areas of the facility, for example a large area like Angola state prison, a close-circuit television (CCTV) in synchronization with, or in communication, with the hand-held detection units 408 allows the CCTV to focus on the user of the cell phone. The CCTV system feeds images to the facial recognition software and a database of all known personal and/or inmates, to find a match and/or create an entry of a new found cell phone and their owner's and/or user's identity. In the case of a prison application, building a database of know criminals their associate and biometric information, including facial recognition, for data mining purposes is critical. An example, where inmates are passing contraband and using cell phone to coordinate their efforts, where positive identification of the transmission facility 202 and positive identification of the user of the transmission facility 202 is important, utilizing cell phone identification, location tracking and positive identify of the criminals involved is crucial to preventing and stopping their criminal enterprise.

In another embodiment and application where positive identification of the transmission facility 202 and positive identification of the user of the transmission facility 202 is important, as discussed earlier the hand-held detection units 408 detector decoding module (and or chipset) or a hand-held detection units 408 in sync with the Pseudo-base station/wireless access point module provides the location, in school safety where a student's location and a perpetrator who preys on school students, the tagging of visitors, student and employees is critical. In this application, CCTV and facial recognition, for data mining purposes of student, facility visitors (wanted or unwanted) is critical. The embodiment includes an allowance unit which determines who is allowed within the facility and/or area and who is suspect and who is a known danger. Tracking all transmission facilities and making positive identification of all communications, utilizing CORI and SORI databases of known perpetrator of students to detect when a threat is near around or in a school facility is critical to school safety.

In embodiments, a method of detecting, identifying and tracking the movements of a specific transmission facility 202 in standby requires provoking and/or requiring the transmission facility to transmit a signal and to detect their unique identification. As discussed and explained previously, a hand-held detection units 408 with an integrated identification detector/decoding module (and or identification chipset module) and/or a hand-held detection units 408 which functions in conjunction base station and/or wireless access point technology, blocking and/or jamming technique in concert of the identification function provides the tools to detect the transmission facility, track its location, and to detect its unique identification.

In the embodiment of FIG. 15, an interface with existing communication devices, such as a wireless cell phone provider or Wi-Fi access provider, may be provided. The interface which will allow and/or deny control is executed by the wireless provider. According, the embodiments shown may also include an interface to the third party controlling unit. For example, the system shown in FIG. 15 may include a system interface with the commercial satellite cell phone provider and control of the cell phones passed between the carrier and the transmission detection, identification, control and reporting system.

In the embodiment of FIG. 15 the detector units (not shown) may include an antenna and a controlling unit, where matching the transmission facilities 202 with its unique identifier is critical for proper identification, tracking and control in this configuration, the detector units may individually control or may direct control over the transmission facilities 202.

Figure 17:
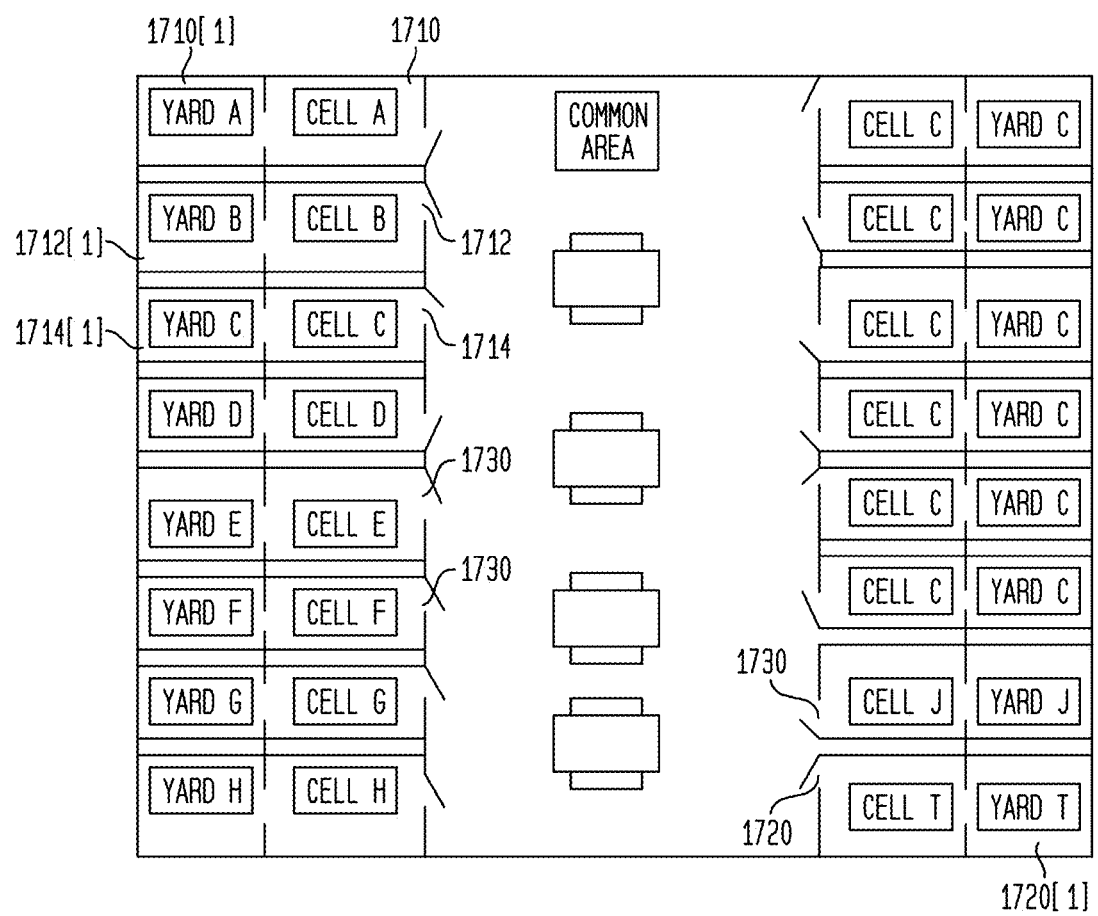
FIG. 17 Illustrates an exemplary corrections facility designed for automation.

FIG. 17 illustrates an embodiment, where it is the intention to run an automated prison to lower the necessary number of personnel and still run a safe and secure facility. This automated facility is controlled by a centralized command and control center and/or a decentralize compartmental command and control center for all functions of the facility including movement of the persons within the facility. In this type of a facility, where complete and accurate identification and location of all personnel is critical, the tracking of individuals, their wireless transmission devices, cell phones, identification units, Walkie-Talkies, and verifying their access to authorized areas, integrating their movement with CCTV and positive facial identification, biometric identification, preventing movement into unauthorized area, developing inclusion zones, creating exclusion zones, ensuring proper count, providing an ability to restrict and/or authorized movement a specific design of the facility and convergence of technology is essential. The technologies discussed herein integrated to the central control provide the backbone and framework to operate such an automated facility, wherein each staff member and inmate transmission facility will allow specific movement throughout the facility. All movement throughout the facility may be monitored through CCTV and facial recognition. At each egress point, movement will be restricted to individual movement through one area to another area of the facility. For example, daily functions include, meals, medical, programs, court visits, and recreation, may be functions that may be monitored and controlled. As an example of the facility of the needs within the automation and the parameters and rules, may be established. For example, Inmate Movement: need a creation of a Movement list and movement schedule, scheduling resources, allocation seating in particular program area classrooms, access to computers, access to the Law library, time allocation in program and use facility assets, Enemy exclusion, (predator sheep wolf exclusion) conflicts in scheduling GED, adult education, culinary arts; and anger management developing Waiting list, ability for inmates to signup, morning schedule and movement, afternoon schedule and movement, Pre-trail and religious services scheduling. Data mining database techniques and methodologies may be executed to provide for inmate scheduling movement and allocation of assets for the inmate relying on transmission facility authorization. The transmission facility will control access to all movement, asset resources, doors and egress, facility resources and the time allocation on facility assets and in which movement takes place. Because of minimum human interaction, display kiosks display schedules and informs the inmate where it is scheduled.

In this embodiment, where there is limited corrections personnel, all cells will be designed to allow outdoor access and unit access. The facility structure may need to be modified to allow inmate access to the outdoor area, this design modification eliminates the need for outside movement and still provides greater freedom for the inmates with less need for direct supervision.

In this embodiment, for medical reasons all inmates will wear two transmission detection sensors. Each sensor will monitor biometric signs including heart rate, temperature, and the like. With two wristbands echo cardiogram can be generated that provide for health monitoring and for positive identification. The Cell Phone Detection, Control and Position Identification system 1500 (FIG. 15) will include a detector and decoder for all transmission facilities, which will provide positive identification for all transmission facilities, including cell phone and other hand held communication devices, and the specific individual in position of the transmission facility. All CCTV units will integrate with facial recognition software, all egress points will require biometric checks, such as fingerprint and renal eye scan devices, and this combined with the transmission facility positive identification. The design of the facility is important to provide adequate exercise movement and limited interaction with staff and other inmates. Therefore, a redesign of the facility, to provide services such as decentralized education is important.

In this embodiment, the wireless communication of the sensors will also carry education information and data to each of the inmate cells. As earlier described, the ideal location of sensors may be in water-chases to prevent tampering. This also provides the opportunity to have wireless communication with education units within the cells. This wireless communication also provides the ability to include wireless surveillance devices, such as cell monitoring into the mix.

In this embodiment where inmate programs, services, commissary, inmate phones, medicine distribution, vending machines, GED education, needs to be inmate specific, positive identification is a critical must. To ensure this outcome, the positive identification of each transmission facility is paramount. An example of this embodiment, when an inmate approaches an education display system, the unique identifier of the inmate's transmission facility, provides information to the transmission facility detector of the unique identifier of the transmission facility. A database controls and provides all the applicable information to provide the correct information for each transmission facility. In this case, the transmission facility is a wristband ID bracelet.

In an embodiment, the transmission facility is a cell phone, PDA or a Wi-Fi appliance, the education display system is an interactive display screen in a school telling the school supervisors that one or more students or personnel needs to turn off his cell phone, or a hospital advising a specific visitor by name, that cell phone even in standby may cause harm to the medical devices being used to treat patients or the transmission facility provides information to the transmission facility detector of a unique identifier of the transmission facility via an interactive screen on the road side to tell a user to slow down as he is speeding. These are just examples of uses of the system illustrated. In addition, the system illustrated may be connected to any data mining database (not shown) to provide customized information to any transmission facility and specific information to a uniquely identified transmission facility.

In an embodiment where the classification of inmates is such where many inmates can co-exist in an inside and outside (minimum security, non-violent, criminals and the like) the use of CCTV, facial recognition and laser microphone, and inmate tracking and a database driven set of rules and parameters, coupled with the combine technologies mentioned in this application. This provides the solutions to reduce the number of employees while maintaining a high level of safety and security.

In an embodiment of FIG. 15 the detector units (not shown) may include an antennas 104 and a controlling unit, that are externally integrated with the transmission detection, controlling, identification, and reporting system 1500, where matching the transmission facilities 202 with its unique identifier is critical for proper identification, tracking and location matching of the transmission facility 202 unique identifier with the proper transmission facility 202 may be accomplished through the time of signal arrival, phone type, transmission frequency, time division separation, time sync, channel frequency, cell tower identifier, (cell phone) transmission facility identifier or a combination of one or more methodologies depending on complexity and transmission facility 202 environment and the like.

In the embodiment of FIG. 15 in a situation where there is a large number of transmission facilities 202 (in this example, cell phones) on a congested highway being able to find all the transmission facility(s) and their accurate location is critical. In addition, being able to continuously track and positively identify each transmission is also critical wherein controlling a significant number of transmission facilities (cell phones) may be necessary. Therefore, specific techniques need to be developed to regulate the frequency band the wireless devices occupy, when and in what order they are processed, the rate and the density and rate in which they are monitored. Techniques discussed earlier describe how to have a cell phone provide their identification. Here we will discuss some of the techniques to regulate the detection, frequency, volume and period of those transmissions.

Knowing the frequency and time of the transmission facility 202 transmissions provides the ability to tighten the bandwidth of the detection sensors, which increases sensitivity, and thus provides greater distance of detection. It also provides an intercept, in time and frequency providing for faster processing of signals. One technique is for the transmission detection sensor to tell the base station and/or enabling technology when to transmit and also indicate the desired response frequency and/or channel. Another methodology is to regulate and/or schedule the transmission time of the base station(s) and/or enabling technologies within geographical areas and set parameter on the direction, radiation pattern, zone, and strength of the signal being transmitted to regulate the number of transmission facility(s) contacted and/or regulating the number of responding transmission facilities.

In an embodiment, in a corrections complex, such as Angola State Prison, or a arbitrarily defined area where transmission facilities 202 are prohibited except for authorized transmission devices, the transmission detection, controlling, identification, and reporting system 100 whether internal or external to the facility may control, identify and prohibit transmissions from transmission facility 202 depending on the location or approximate location of the transmission facility 202. There are a variety of methods that may be employed in the determination of the location of a transmission facility 202. Methods include (i) a cell-sector system that collects information pertaining to cell and sector ID's, (ii) the assisted-global positioning satellite (GPS) technology utilizing a GPS chipset in a mobile communication facility, (iii) standard GPS technology, (iv) enhanced-observed time difference technology utilizing software residing on a server that uses signal transmission of time differences received by geographically dispersed radio receivers to pinpoint a user's location, (v) time difference of arrival, (vi) time of arrival, (vii) angle of arrival, (viii) triangulation of cellular signals, (ix) location based on proximity to known locations (including locations of other radio-transmitters), (x) map-based location, or any combination of any of the foregoing, as well as other location facilities known to those of skill in the art. In one aspect of the invention, the location may be determined using a method of non-iterative linear equations.

In an embodiment of the transmission detection, controlling, identification, and reporting system 1500 whether to control the transmission facility 202, may be determined by location of the transmission facility 202, type of transmission facility 202, identification of transmission facility 202, time of transmission of the transmission facility 202 frequency of the transmission facility 202, based on type of base station technology and/or location of base station technology and the like.

In an embodiment of the transmission detection, controlling, identification, and reporting system 1500 where the system is in synchronization with base station technology and techniques correlate the wireless signals, wherein the unique identifier is supplied by the base station when the transmission facility is stimulated by the jammer and/or base stations unit. Then the transmission facility is tracked and its interest is related to its location to the road, other variables include whether it is alone or it is in the hands of an individual and the like. The unique identifier is provided by the signal detection sensor or the base station unit and is used to synchronize the base station identification and the location of the transmission facility.

In an embodiment of FIG. 15, the transmission detection, controlling, identification, and reporting system 1500 may also transmit the type, time, frequency of the wireless transmission facility of interest to a base station. The base station may then provide the system with the unique identifier of the detected transmission facility or the base station may detect a transmission facility at a specific frequency and the transmission detection, controlling, identification, and reporting system 100 tunes to that frequency to determine the location and unique identifying information of the transmission device. The system 100 may then compare the unique identifying information to a data base (not shown), the information and the parameters obtained from the data base may then be used decide how to treat the transmission facility; what to do with the transmission facility depending on where the transmission facility is considered friend or foe (i.e., allowed or disallowed).

In an embodiment of the transmission detection, controlling, identification, and reporting system 1500 where the transmission detection units includes a transmission decoding unit the system determines the location and the allowability of the transmission unit by comparing the transmission found with allowable or non-allowable transmission facility lists.

In an embodiment shown in FIG. 15 of the transmission detection, controlling, identification, and reporting system 1500, the base station indicates there is a transmission facility within the area covered by the transmission detection, controlling, identification, and reporting system 1500. The base station provides at least one unique identifier to the transmission detection, controlling, identification, and reporting system 1500. For example, the base station may provide at least one of: a frequency; a type of transmission facility; a time of arrival (TOA), an IMEI and other similar identifiers (e.g., encoded NEI). The transmission detection, controlling, identification, and reporting system 1500 determines the location of the transmission facility, depending on the provided parameters, directs the base station and/or recorder, jammer, CCTV . . . to perform a set of actions. Some of the actions to be performed are jam the signal specific to the cell phone, deny service (Denial of Service (DoS)) to the cell phone, allow the continued receiving and allow transmission of the detected transmission, record the content of the transmission, provide an indication that the transmission is allowable. In addition, the provided parameters may change depending on location, and other variables depending on application parameter and the like.

In an embodiment shown in FIG. 15 of the transmission detection, controlling, identification, and reporting system 1500 where detection system is separate from the discriminator unit, the discriminator unit may also include the controlling unit (base station technology and the like). In this case, when a unique set characteristics (parameters) are received by the detecting unit, and/or system 1500, which then provides information to the discriminator unit and/or controlling unit, which then passes back the correlated transmission facilities (the controlling unit, software radio, and the like) this information is processed. For example, a cell phone on the side of the road, with a person talking on it may not need to be disabled, in contrast to a cell phone in standby located within a zone of danger (60 meters of the road) may need to be controlled and disabled.

In an embodiment, the system 1500 will allow an authorized transmission facility to continue and/or provide the ability for the wireless transmission, (i.e., to talk and/or to receive calls) depending on the configuration and application. In an embodiment of the transmission detection, controlling, identification, and reporting system 100 where detection system is separate from the discriminator unit, in this case the discriminator unit may also the controlling unit (base station technology and the like,) the system 1500 may further provide instruction to the controlling unit to allow or disallow transmission facilities, determined by their location.

In an embodiment of the transmission detection, controlling, identification, and reporting system 1500 the system compares the obtained information and depending on whether the detected transmission facility is determined to be a potential danger, the system may take the incoming transmission facility and determine its position prior to disallowing further transmission. This process is accomplished by knowing an identification of the transmission facility and using the information obtained by the controlling facility (frequency, time, type, channel, etc.) and searching for the incoming call signal. For example, in an improvised explosive detection (IED) situation, finding the trigger man may require the detection, identification and location determination in real-time. The array antennas will utilize large front end gain for the greatest distance. As discussed previously, jamming the area, to gain control of the transmission facility is one method of capturing the transmission facility. The ability exists to then track the trigger man from his current location and where he goes for investigative reasons.

In an embodiment shown in FIG. 15 of the transmission detection, controlling, identification, and reporting system 1500 where transmission facility retrieved data may be used to locate threats to personnel, and/or prevent an escape. Recovered transmission facility data may be used to track co-conspirators location and/or identify an unauthorized transmission facility.

Figure 18:
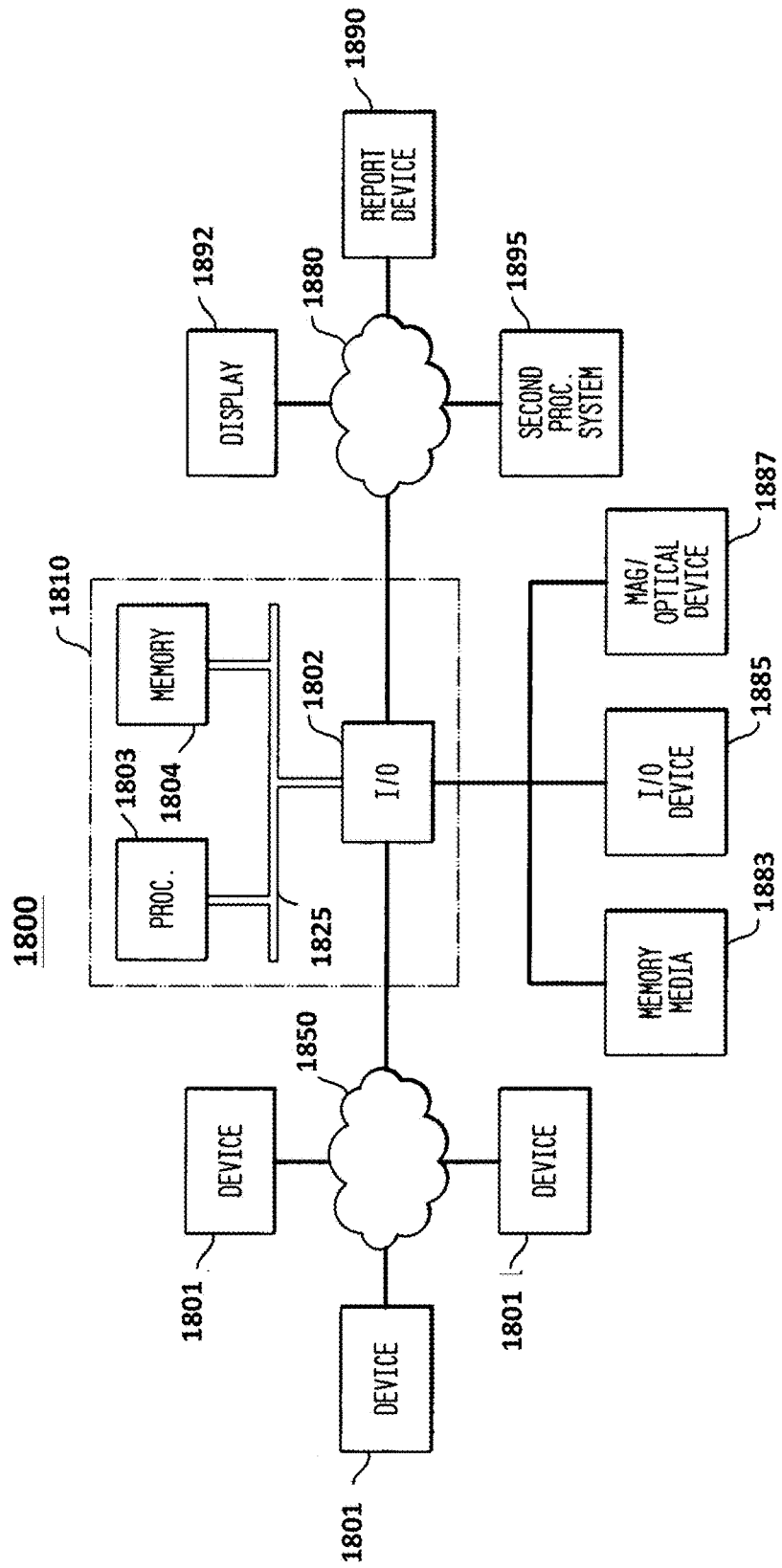
FIG. 18 illustrates a system for implementing the processing described herein.

FIG. 18 illustrates a system 1800 for implementing the principles of the invention shown herein. In this exemplary system embodiment 1800, input data is received from sources 1801 over network 1850 and is processed in accordance with one or more programs, either software or firmware, executed by processing system 1810. The results of processing system 1810 may then be transmitted over network 1880 for viewing on display 1892, reporting device 1890 and/or a second processing system 1895.

Processing system 1810 includes one or more input/output devices 1802 that receive data from the illustrated sources or devices 1801 over network 1850. The received data is then applied to processor 1803, which is in communication with input/output device 1802 and memory 1804. Input/output devices 1802, processor 1803 and memory 1804 may communicate over a communication medium 1825. Communication medium 1825 may represent a communication network, e.g., ISA, PCI, PCMCIA bus, one or more internal connections of a circuit, circuit card or other device, as well as portions and combinations of these and other communication media.

Processing system 1810 and/or processor 1803 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 1803 may be a central processing unit (CPU) or a special purposed processing unit or dedicated hardware/software, such as a PAL, ASIC, FGPA, operable to execute computer instruction code or a combination of code and logical operations. In one embodiment, processor 1803 may include, or access, code which, when executed by the processor, performs the operations illustrated herein. As would be understood by those skilled in the art when a general purpose computer (e.g., a CPU) loaded with or accesses code to implement the processing shown herein, the execution of the code transforms the general purpose computer into a special purpose computer. The code may be contained in memory 1804, may be read or downloaded from a memory medium such as a CD-ROM or floppy disk, represented as 1883, may be provided by a manual input device 1885, such as a keyboard or a keypad entry, or may be read from a magnetic or optical medium (not shown) or via a second I/O device 1887 when needed. Information items provided by devices 1883, 1885, 1887 may be accessible to processor 1803 through input/output device 1802, as shown. Further, the data received by input/output device 1802 may be immediately accessible by processor 1803 or may be stored in memory 1804. Processor 1803 may further provide the results of the processing to display 1892, recording device 1890 or a second processing unit 1895.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 1810 may also be in two-way communication with each of the sources 1805. Processing system 1810 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 1850 and 1880 may also be internal networks or one or more internal connections of a circuit, circuit card or other device, as well as portions and combinations of these and other communication media or an external network, e.g., the Internet and Intranet.

Figure 19A:
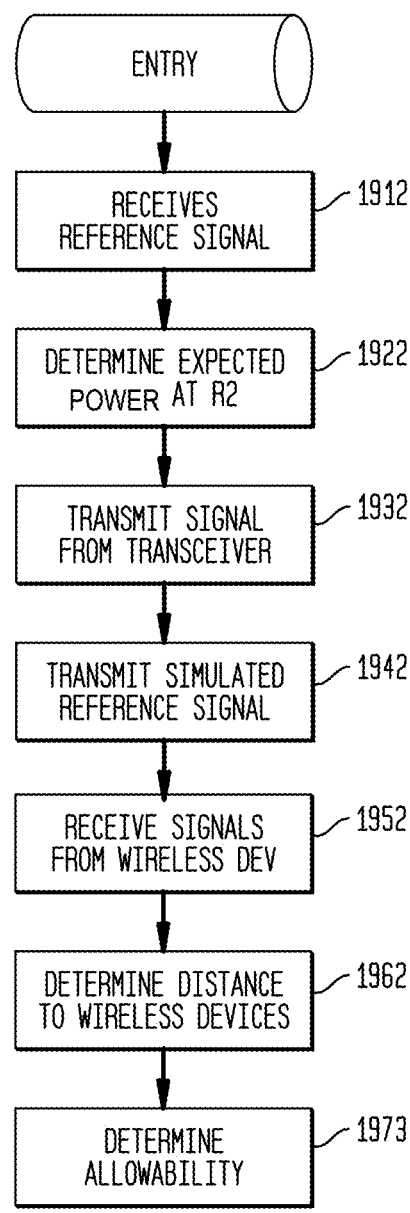
FIG. 19A illustrates an exemplary process for capturing a wireless transmission in accordance with the principles of the invention.
Figure 19B:
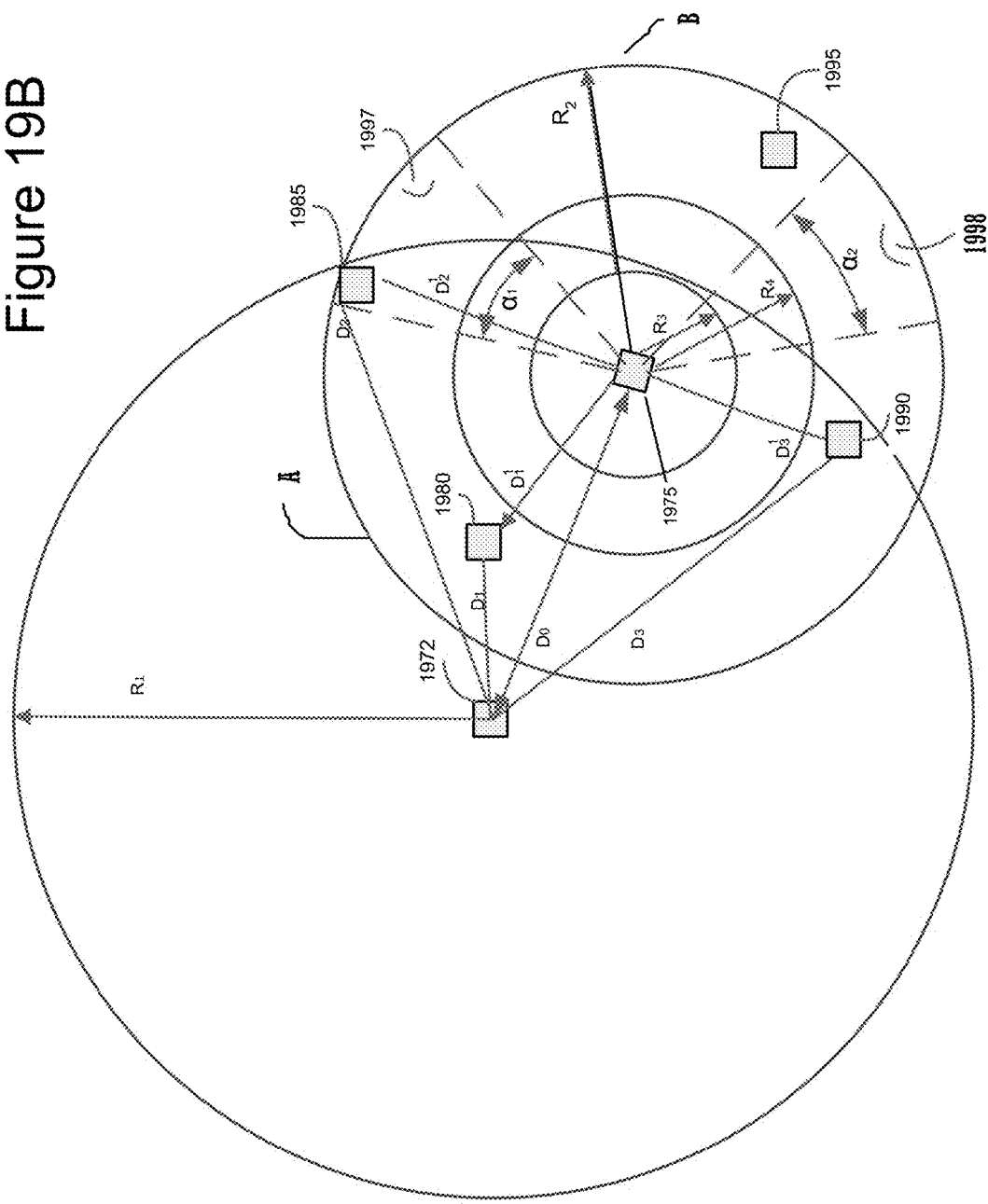
FIG. 19B illustrates an exemplary geographical representation to explain the processing shown in FIG. 19A.

FIG. 19A illustrates an exemplary process 1900 for capturing a wireless transmission in accordance with the principles of the invention and FIG. 19B illustrates an exemplary geographic configuration for explaining the processing shown in FIG. 19A. Referring now to FIG. 19A, at block 1910, a reference signal transmitted by a transmitter (1972, FIG. 19B) is received at a transceiving system (1975). The transmitter 1972 has a transmitting range represented by a distance $R_1$. An estimated distance ($D_0$) between the transceiving system 1975 and a transmitter 1972 of the reference signal is determined based on a received power at the transceiving system. At block 1920, a determination is made regarding an expected power of the reference signal to be received at wireless transmission facilities a known distance ($R_2$) from the transceiving system 1975. In one aspect of the invention, an expected received power may be determined without regard to the positions of the reference signal transmitter 1972 and the transceiving system 1975. That is, an expected received power may be determined a known distance ($R_2$) about the transceiving system 1975 based solely on the received power at the transceiving system 1975 and, thus, the expected received power at point A is the same as that received at point B. In another aspect of the invention, a position of the reference signal transmitter 1972 may be determined or provided to the transceiving system 1975. For example, a direction of the reference signal transmitter 1972 may be determined, using directional receiving antennas (or multiple receiving antennas separated by a known angular measure, such as four antenna spatially oriented 90 degrees to each other, such that the 3 dB antenna gain points intersect at 45 degrees from the antenna maximum gain) at the transceiving system 1975, and a position relative to the transceiving system 1975 may be determined based on the determined direction and estimated distance ($D_0$). In another aspect, a direction of the reference signal transmitter 1972 may be determined using a received signal strength of the reference signal on at least one receiving antenna. In another aspect, the position or location of the reference signal transmitter 1972 may be known and, thus, available to the transceiving system 1975. For example, the position of the transmitter 1972 may be known through a mapping of such transmitters and/or the location is known based on conventional surveying methods or from a global positioning satellite system (GPS). With the position of the reference signal transmitter 1972 known, the expected power of the reference signal may then be determined more accurately. For example, the expected received power of the reference signal a known distance from the transceiving system 1975 in line with, and between, the transmitter 1972 and the transceiving system 1975 is greater than the expected received power of the reference signal a known distance from the transceiving system in line with but on an opposite side of the transceiving system 1975.

With reference to FIG. 19B, the received signal strength at wireless transmission facility 1980 is greater than that of wireless transmission facility 1990. The expected received power may be determined continuously along the known distance (R2) about the transceiving system 1975 or may be determined at designated angles about the transceiving system 1975 (e.g., every 10 degrees). Interpolation between two designated angles may be used to determine an expected received power at an intermediate point. At block 1930, a signal is transmitted from the transceiving system within a general area, as represented by $R_2$. The area may include wireless transmission facilities 1980, 1985, 1990, capable of receiving the reference signal and wireless transmission facilities 1995 that may not be capable of receiving the reference signal. In one aspect, the signal may be transmitted in an omni-directional manner wherein the general area represents an area circling the transceiving system; assuming the system and corresponding antenna(s) are co-located. In another aspect of the invention, the signal may be transmitted in a directional manner wherein the general area represents a pie-shape area, 1997, 1998, having an apex at the transceiving system 1975 (a sector); assuming the antenna(s) and the system 1975 are co-located. The angular spread of the pie-shared area $\alpha_1$, $\alpha_2$ may be determined based on the directivity of the transmitting antenna. The signal transmitted by the transceiving system 1975 is transmitted with sufficient power to interfere with communications between the reference signal and wireless transmission facilities within an area in which wireless transmission facilities may receive the reference signal. The transmitted signal may be a continuous wave type signal (i.e., a jamming signal) or may be a discrete signal that commands the wireless transmission facilities to reestablish communication with the reference signal transmitter. At block 1940, a simulated reference signal, having the same characteristics as the reference signal, is transmitted by the transceiving system 1975. The simulated reference signal is transmitted at a power level such that the received power of the simulated reference signal at the known distance ($R_2$) from the transceiving system 1975 is greater than the received power of the reference signal. At block 1950, signal(s) received by the transceiving system 1975 from wireless transmission facilities 1980, 1985, 1990, 1995 in response to the interfering signal are analyzed and processed.

In one aspect of the invention, a distance $D_1'$, $D_2'$, $D_3'$, to each of the wireless transmission facilities 1980, 1985, 1990, respectively may be estimated based on a received power, at block 1960. In another aspect of the invention, a direction of the wireless transmission facilities may be determined using, for example, directional antennas and/or an amplitude-based angle of arrival method. In one aspect of the invention, the signals received by the transceiving system 1975 may be analyzed to determine if they are allowed to send and/or receive communication as previously disclosed at block 1970. As discussed previously, allowability may be determined based on a known set of wireless transmission facilities that are allowed within an area. All others are not allowed and, thus, communication is prohibited. If the signals are determined to be allowable, then control of the signal is "handed-off" to the reference signal transmitter 1972. Otherwise, the received signals may be further processed.

In one aspect of the invention, allowability of a wireless transmission facility may be determined based on a position of the wireless transmission facility with respect to the transceiving system 1972. For example, if the wireless transmission facility is determined to be within a predetermined distance, $R_3$, from the transceiving system 1975, then communication to and from the wireless transmission facility may not be allowed, even though the transmission would normally be allowed. In one aspect, the area defined by $R_3$ may be limited using directional information of the received signal associated with the wireless facility and the transceiving system 1975. Thus, if the transceiving system 1975 is moving towards the wireless transmission facility, then communication may not be allowed, while communication may be allowed if the transceiving system 1975 is moving away from the wireless transmission facility, even though the wireless transmission facility is within the area defined by $R_3$. In another aspect of the invention, transceiving system 1975 may attempt to determine other wireless transmission facilities within a region, $R_4$, attempting to communicate with the not-allowed transmission facility.

Figure 20A:
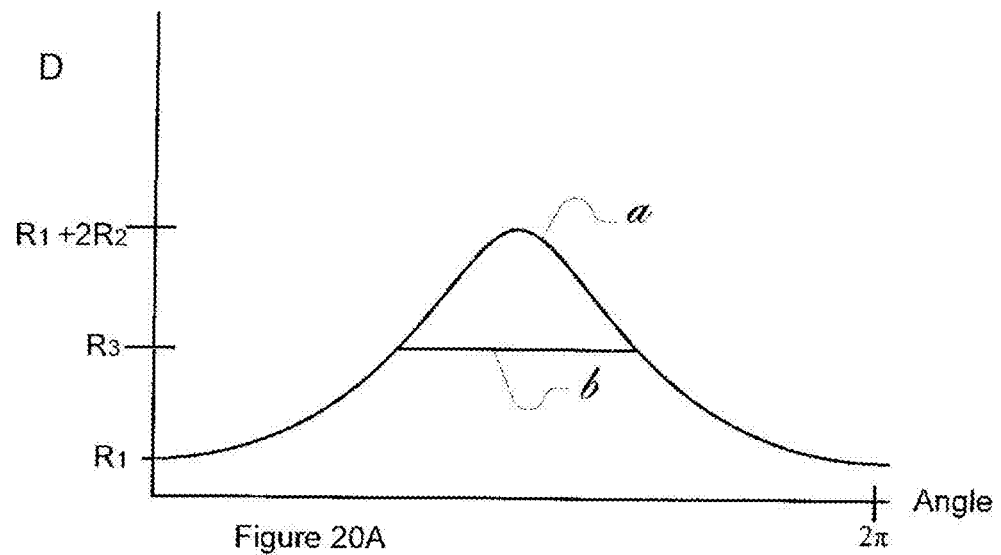
FIGS. 20A and 20B illustrate exemplary distance and power graphs associated with the network configuration shown in FIG. 19A.
Figure 21:
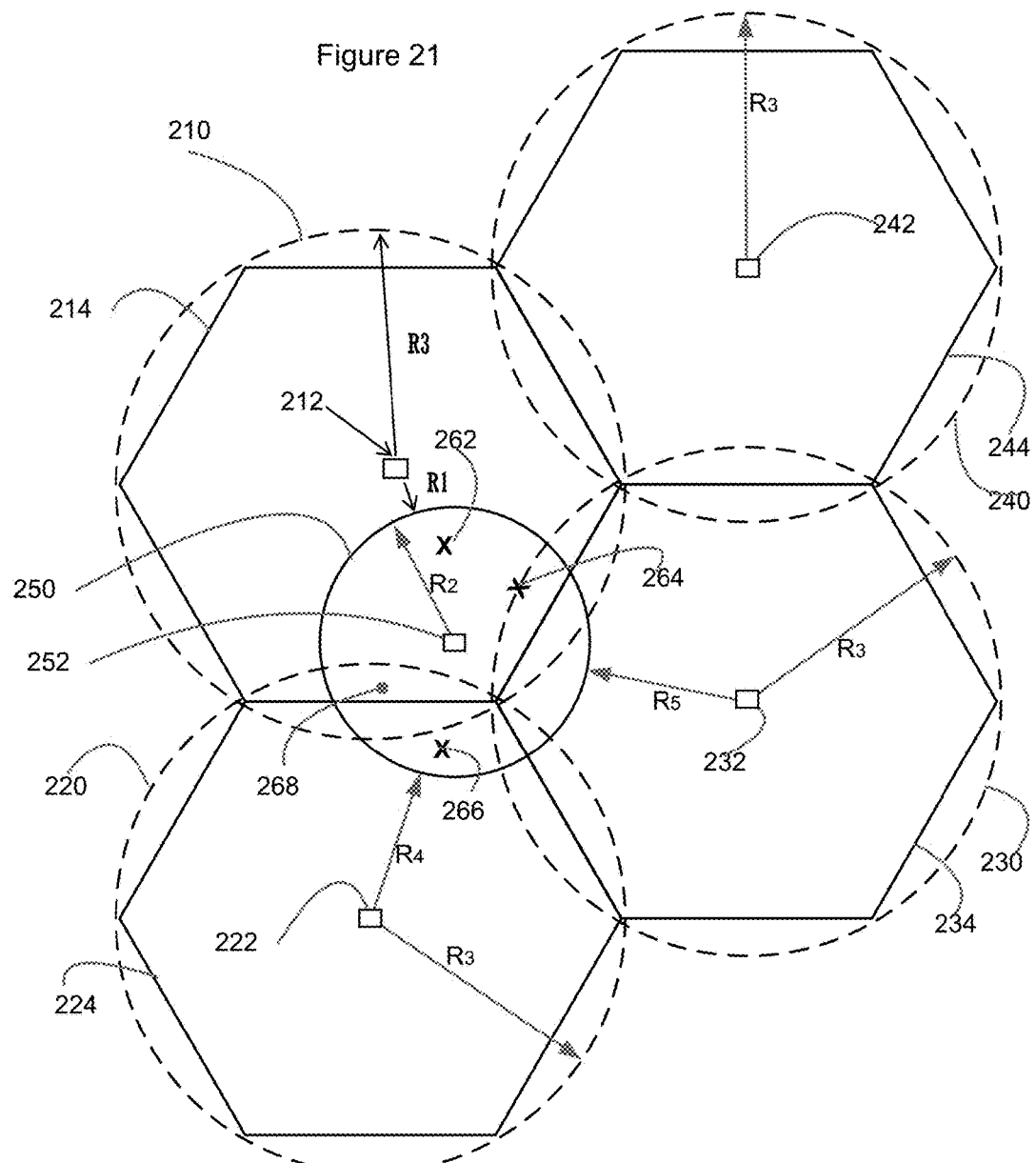
FIG. 21 illustrates a second example of an exemplary cellular network configuration.

FIG. 20A illustrates a graph of exemplary distances between the operating ranges of base stations 212 and device 252 as a function of angle, wherein the angle is normalized with respect to a line between base station 212 and device 252 (see FIG. 21). Thus, a minimum distance between base station 212 and device 252 is represented as R1, at an angle of zero degrees between base station 212 and device 252 and extends to a maximum distance of R1+2R2, at an angle of 180 degrees (see curve a).

However, as the operating range of device 152 exceeds the operating range of base station 212 at 180 degrees, the distance may thus be represented as R3 (see curve b).

Thus, as the angle between base station 212 and device 252 increases, the distance between base station 212 and device 252, at distance R2 from device 152, increases and becomes limited to a distance of R3 for an angular period around 180 degrees. The distance then decreases to R1 as the angle increases.

Figure 20B:
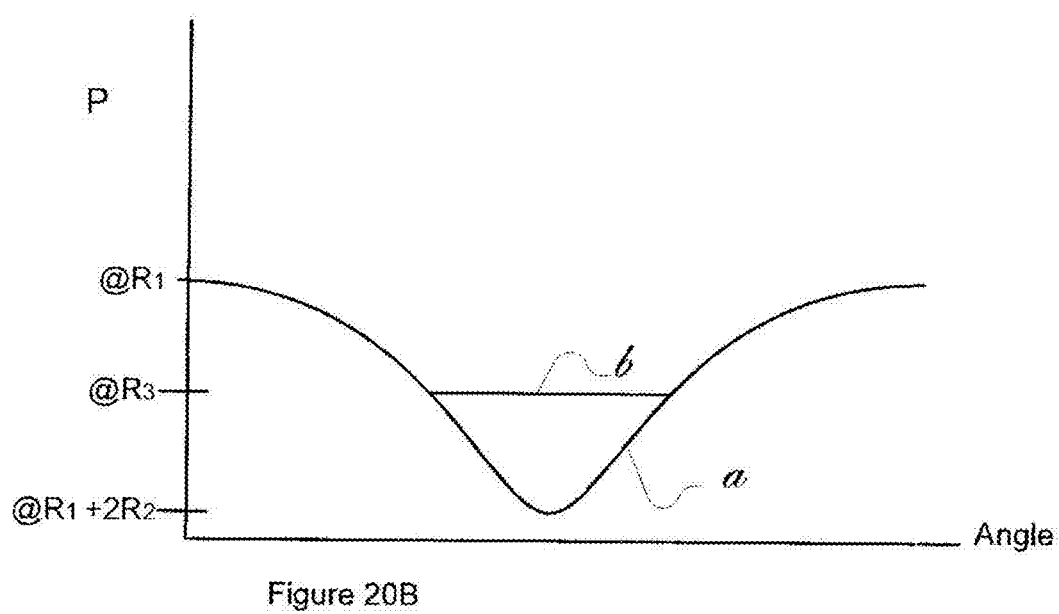

FIG. 20B illustrates an exemplary power received at the operating range R2 of device 252. In this case, the power received by a wireless device is a maximum at distance R1 and is a minimum at distance R1+2R2. (see curve a). However, as the distance R1+2R2 exceeds the operating range of base station 212, the power at distance R3 is limited to the power at the edge of the operating range of base station 112. (see curve b). Thus, to capture any devices within the local area of device 252, device 252 must transmit at a power between that received at R1 and that received at R3. Further the power transmitted varies as a function of the angle between base station 212 and device 252, as described with regard to FIG. 20A.

FIG. 21 illustrates a second exemplary network configuration in accordance with the principles of the invention. In this exemplary configuration overlapping regions 210, 220, 230, 240 provide continuous coverage of one or more devices within their respective regions. In this case, each of the regions 210, 220, 230, 240 are represented as having a coverage area defined as R3 with respect to corresponding base stations 212, 222, 232, and 242. As illustrated, a hexagon representation of each of the coverage areas 214, 224, 234 and 244 is used to define a continuous coverage area. The hexagon representations are provided solely to illustrate the interlocking coverage of the overlapping coverage regions 210, 220, 230, 240.

Also illustrated is a transceiving station (device) 252, (which is equivalent to device 1975 of FIG. 19B). Also illustrates are wireless devices 262, 264, 266, and 268. Devices 262 and 268 are well within the coverage region of base station 212, while device 264 is within an overlapping zone between areas 210 and 230. Device 266 is outside the coverage area of base station 212 and within coverage of base station 224. Each of the wireless devices is within a local area represented by distance R2 centered on transceiving device 252.

Figure 22:
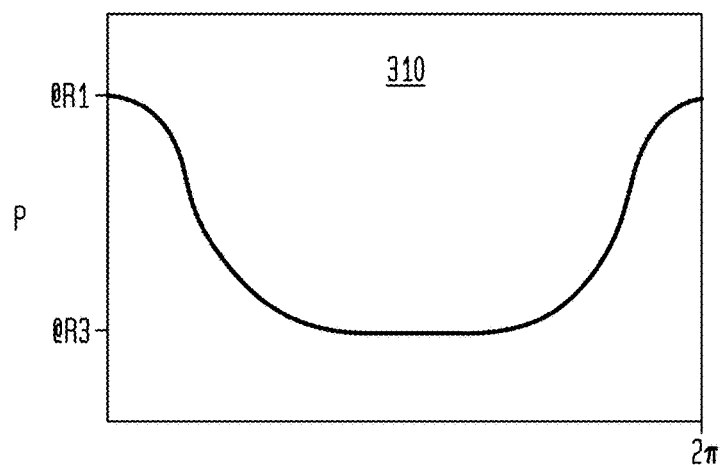
FIGS. 22, 23, and 24 illustrate exemplary power graphs associated with the network configuration shown in FIG. 21.
Figure 23:
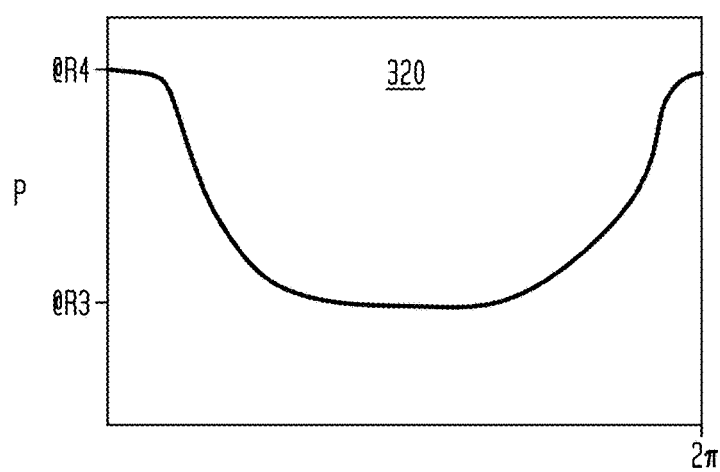
Figure 24:
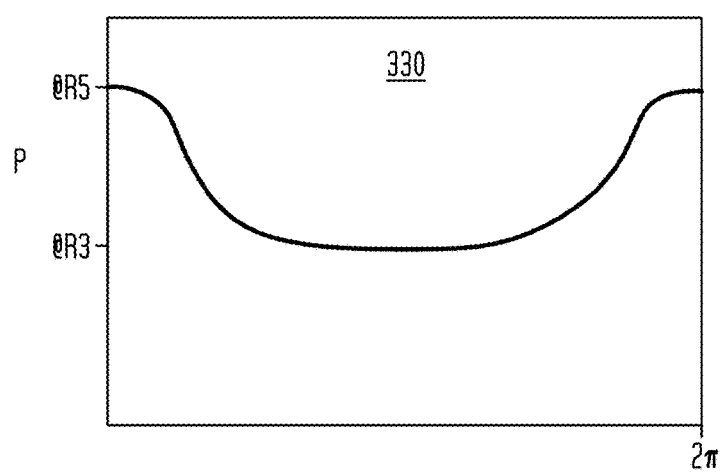

In addition, R1 represents the closest distance between base station 212 and transceiving system 252. R4 represents the closest distance between base station 222 and transceiving system 252 and R5 represents the closest distance between base station 232 and transceiving system 252. FIGS. 22-24 represent graphs of power at R2 for each of base stations 212, 222 and 234, respectively, in a manner similar to that shown in FIG. 20B. In this illustrated example, the power of each base station is assumed to be substantially equal so that the coverage areas, represented by R3, are substantially the same. However, it would be recognized that the power of each base station may be altered to provide greater or lesser coverage areas. In this case, the power received at R2 may be greater or lesser and is a function of the output transmission power and the distance (e.g., R1, R4 and R5, respectively).

In one aspect of the invention, the transceiving system 252 may select one of the base stations as a primary cell. The primary cell may be selected based on the base station being determined to be closest, in distance, to the transceiving device 252. The transceiving system 252 may normalize the received power based on distance and transmission power of each of the base stations. In addition, the transceiving system 252 may normalize the location of each of the base stations with respect to the location of the base station of the primary cell. That is, in the illustrated network configuration shown in FIG. 21, base station 212 may be selected as the primary cell and base stations 222 and 232 may be determined as angularly separated with respect to the line between the primary cell base station and the transceiving station 252. Thus, base station 232 is slightly greater than 90 degrees offset from the line between base station 212 and transceiving station 252. Similarly, base station 222 is slightly greater than 180 degrees offset from the line between base station 212 and transceiving station 252.

In one embodiment of the invention a repeat jamming module, provides repeat jamming capability and specifically jams targeted cell phones and/or wireless communication device. The repeat jamming techniques utilize the outgoing signal of the cell phone and repeats the transmission 100 nanoseconds (ns) after the initial signal with matching power so that the effect of the overlapping communication on the receiving transceiver provides a confusion in the receiving transceiver and makes communication impossible and the call and/or wireless communication is dropped. In one embodiment of the invention the jamming module include a duel repeating circuit which a programmable delay line built in to allow the same communication to be delayed by the programmed delay amount. In another embodiment of the invention, the repeat jammers are placed in each section of the facility. When the signal detection array detects an unauthorized cell phone the repeat jammer takes that cell phone and only that cell phone off line. When the phone tries to acquire the tower the cell phone identification is re-verified.

In one embodiment of the invention, a Base Station Controlling Module, which identifies and controls cell phones interfaces with the Cell Phone Detection system to determine authorized or unauthorized phones, provides phone type, the time of arrival and the cell phones frequency and seamlessly interfaces backhaul and Denial of Service (DoS) capabilities. The Base Station Controlling Module, which identifies and/or controls cell phones, interfaces with the Cell phone detection system to determine whether a cell phone is an authorized or unauthorized cell phone, the cell phone detection system provides phone type, the time of arrival and the cell phones frequency to the base station unit, the base station unit matches the cell phone detected signal with the base station controlled and/or reacquired cell phones and verifies the cell phone of interest is within the unauthorized areas. It also verifies, in one embodiment of the invention, whether the cell phone is an authorized cell phone for use within the facility, the data matrix determines authorized vs. unauthorized cell phone and authorized area vs. unauthorized areas and, seamlessly interfaces either providing backhaul and/or DoS capabilities.

In one aspect of the invention, a cell phone identification module which identifies cell phone identifications (IDs), determines whether an authorized or unauthorized phone exists, and provides the phone type, the time of arrival and the cell phone's frequency and seamlessly interfaces with the repeater jammer module, to disable the unauthorized phone in either the unauthorized area and/or an unauthorized phone in any area of interest. The repeat jamming unit jams all unauthorized cell phones within the facility and allows authorized cell phones.

In one embodiment of the invention, the signal detection sensors are placed throughout the facility to provide full coverage of the facility. Any cell phone within the facility will be detected and displayed on the centralized console interface. This information will be sent to the software radio Identification module to verify if this is an authorized or unauthorized cell phone. If the cell phone is unauthorized the repeat Jammer module will disable the cell phone or the software radio identification module will deny service. The software radio identification module is designed to receive a signal being transmitted from a cell phone and decode the IMEI number. The IMEI number is compared against a database of authorized IMEI authorized cell phones. In one aspect of the invention, to prevent cell phone from entering a facility undetected, Low Noise Jammers will be installed at all egress (entrance) points within the facility so that all cell phones coming into the facility are verified by the Software Radio Identification Module. An ancillary benefit is anyone mistakenly or unknowingly bringing a cell phone into the facility will be picked-up at the entrance point. In another embodiment, the Software Radio Identification Module (SRIM) identifies all cell phones within the coverage area. Any cell phone that is in an on state within the coverage area will be identified. The International Mobile Equipment Identity number or IMEI (Cell phone ID) will be compared with the facility's "authorized cell phone list". An authorized cell phone is allowed to make and receive calls. All unauthorized cell phones are prevented from making or receiving incoming and outgoing calls. The software radio Identification module can be expanded to provide cell phone call monitoring.

In one aspect of the invention, the base station acquires a new cell phone, the Base Station provides, time code, band, and type to the cell phone Detection Sensor Array. The cell phone Detection Sensor Array determines whether the cell phone is within an exclusion zone. If the cell phone is detected outside the "Cell phone control area", then the cell phone is released back to the Network Cell Tower and/or the calls are allowed where the cell phone is backhauled to the network. If the cell phone is found within the exclusion zone or "control area", the Base Station determines whether the cell phone is authorized and an "Authorized Cell Phone" (VIA HLR Database interface) and the console displays the location of authorized cell phone, the (IMEI), and "Authorized cell phone status". Alternatively, if the cell phone is determined to be an "Unauthorized Cell Phone" (VIA HLR Database interface) and the Base station prevents incoming and outgoing calls, the console displays the IMEI, the cell phone and "Unauthorized phone status." In addition, the repeat jammer module may jam the cell phone signal and the console displays the IMEI, the cell phone location and "Unauthorized phone status", depending on the system configuration. In another embodiment, the Base Station identifies all cell phones within the coverage area. Any cell phone on and within the coverage area will be identified. The International Mobile Equipment Identity number or IMEI (Cell phone ID) will be compared with the facility's "authorized cell phone list". An authorized cell phone is allowed to make and receive calls. All unauthorized cell phones are prevented from making or receiving incoming and outgoing calls. The base station module can also be expanded to provide cell phone call monitoring.

In another embodiment the signal detection sensor array is used to provide Real-time tracking of inmates utilizing the Signal Sensor Array with wristband tracking technology on each inmate. (See patent application Ser. No. 12/231,437). The system is expanded to include a Staff Safety Alert & Tracking System (SSAT) utilizing the Signal Sensor array with built-in real-time wristband and/or security tags for the tracking of correction officers. In this embodiment of the system, the system, reports real-time time and position of every inmate and officer in the facility. The database collects every movement of a wristband up to 1000 times per second and provides this data into a data mining and historical playback capability. In another embodiment of the system the wristband has a signal detection module which detects a cell phone within a specific area the wrist band determines the user of the cell phone and reports the information back to the console. Some of the advantages in tracking Officer and Inmates include: Increased Staff Safety; Inmate escape prevention tool; Inmate and staff out of position tool; Continuous and accurate count of inmates; Group/gangs interaction monitoring; Accurate work scheduling and monitoring tool; On post/off post position of all security personnel; Escape alarm; last known position; immediate alarm and the like. The data mining capabilities enable the data base and data mining to: Accurately locate inmates in relationship to other inmate/staff at all times and to accurately investigate assault/rape and assist in prosecution tool; and ability to physically contact detection system for incident/rape investigation and prevention tool; Inmate tracking/Data Mining which provides for the identification of predators and predatory behaviors, create exclusion zones and alerting system to notify security of a boundary violation; Inmate tracking and Data Mining: for assessing staff and inmates' vulnerabilities; provides for decreased agency liability by providing accurate forensic information for court; the system also provides for audio and alarm capability (incident/rape prevention tool).

In another embodiment of the invention, the Cell Phone Detection system is integrated with a Base Station(s) Module in which the base station(s) may also have back haul capability wherein the system utilizes a pico/nano base station technology and cell phone detection system, wherein the base station registers the cell phone(s) and has the cell phone detection system verify the location of cell phone and the allowability module determines whether the detected phone is authorized and/or unauthorized. The system verifies who the cell phone belongs to a known IMEI (via database). The base station(s) directs the system to back haul all authorized phones and display the authorized phones within the interested area and not display phones in non-interested areas. Then the base station(s) is directed to deny services to all non-registered/unauthorized within the restricted area and display these restricted phones and notify staff of their location and presence.

In another embodiment of the invention, the Cell Phone Detection system works in conjunction with an integrated Base Station Module without back haul capability in which the base station(s) register the phone and have the Cell Phone Detection system verifies the location of cell phone; the allowability module determines whether the detected phone is inside the restricted area. The system verifies who the phone belongs to by a known IMEI (via database). The base station is directed to release authorized cell phones and cell phones which are not in the restricted areas back to the local tower and display the authorized phones within the interested area, and not display phones in non-interested areas. The base station is directed to "hold on unauthorized cell phones and display the unauthorized phones. All non-registered cell phones will have Denial of Service (DoS), by being held onto by the base station unit and the like.

In another embodiment of the invention, the Cell Phone Detection and Identification Module in which the Cell Phone Detection system is the controlling unit, wherein the system utilizes a sniffer and/or embedded IMEI decoders within each cell phone detection sensor to determine the location and identification of all cell phones within a specific area. The signal detection sensors find and positively locate the phone. In a configuration in which each sensor does not possess a decoder IMEI module, the sensor provides the following information to the sniffer (TOA, frequency, type, channel). The sniffer scans for the phone, then reports back the identification information. The system verifies who the phone belongs to and whether the cell phone is authorized or not authorized. In a configuration in which each sensor has a decoder module, the system displays green for authorized phone, red for unauthorized phones and the like. In another embodiment, the Sniffer module finds and positively identifies the cell phones. The sniffer provides information to the cell phone detection and location system (TOA, ID, frequency, type, channel . . . ). The Cell phone detection and location system then scans for the cell phone, verifies who the phone belongs to and whether the cell phone is authorized and/or not authorized in that location and then displays green for authorized phones and red for unauthorized phones and the like.

In one aspect of the invention, the Cell Phone Detection and Identification Module works in conjunction with 3rd party Telco Support. In this aspect the sniffer module (IMEI decoder and identified) positively identify the phones, gives information to the cell phone detection and location system (TOA, ID, frequency, type, channel . . . ). The Cell phone detection system scans and identifies the location of an interested cell phone, verifies who the phone belongs to and whether the cell phone is authorized and/or not authorized and displays green for authorized phone and red for unauthorized phones. The system alerts the appropriate cell phone provider of unauthorized call phone to have the cell phone provider deny service on the cell phone. The staff may then confiscate the detected cell phone.

In another aspect of the invention, the Cell Phone Detection system works in conjunction with a repeat Jamming system and an Identification Module and/or embedded decoding module in which the sensors find and positively locate the phones In this case in which there is external identification of the IMEI, the system gives information to the sniffer (TOA, frequency, type, channel . . . ) scans for the phone and reports back the identification of the cell phone. The system compares the ID with the database of authorized phone—and verifies whether the phone belongs to an authorized or an unauthorized person. The system displays green for authorized phone and red for unauthorized phones. The facility may pick up that specific phone. The repeat jammer disrupts the specific phone with a set repeat delay to take the cell phone off-line. Pinpoint jamming disrupts all phones within the channel and area. A Broadband jammer disrupts all phones within the area and frequency coverage and the like.

Although not shown, it would be recognized that the receiving and/or the transmitting antennas and/or the processing systems may be co-located or may be geographically distributed. When a plurality of receiving antennas are employed and geographically distributed, it would be recognized that correlation of the information obtained from each antenna is necessary. In one aspect of the invention, a plurality of antennas having a known angular receiving pattern may be co-located, see FIG. 7, and remotely located from the processing system, to receive signals at substantially the same time. It would be recognized that when the antenna system is remotely located from the processing system, the areas shown in FIG. 19B are oriented with respect to the antenna system.

In another embodiment of the invention, the wristband as described in patent application Ser. No. 12/231,437, includes a signal detection module as described in FIG. 6 and/or alternatively in another embodiment, FIG. 11, the signal detection module detects cell phone signals, its use, and unique identifier information of the cell phone being used by the inmate. The wristband module may also include a voice recognition module. A Cell Phone Use, and Authorization Database module (CPU-ADM), interfaces with the cell phone detection system and the base station control system and controls when an inmate may make a phone call and/or receive a call. This module holds the allowed or dis-allowed cell phone information for each inmate, what cell phone(s) he is allowed to use, the areas and times in which an inmate may use his cell phone, the authorized places and phone numbers which the inmate may call and/or receive phone call from. The CPU-ADM system in cooperation with the base station unit and cell phone detection units inputs, controls and monitor how long an inmate may stay on the phone, the cost incurred for each phone call, records the inmates conversations, correlated voice pattern with each inmate to insure each is the inmate who is prescribed to be, and that one inmate is not talking on another inmate's cell phone; correlates voice pattern of all calls made by the inmate and their recipient(s). The CPU-ADM system analyzes all calls received and all calls made in conjunction with all person(s) contacted and for threat group, and security concerns and trends. The system monitors threat alerts analysis based on keys words. The CPU-ADM system interfaces with the canteen/inmate trust fund to debit inmate's account for each call made. The CPU-ADM system interface allows for inmates to input their desired call numbers, and the system allows for security personnel monitoring.

One of the challenges of controlling a cell phone is knowing which cell phone is posing a danger and which cell phone does not pose a danger. FIG. 24A illustrates a flow chart of one embodiment of the invention in which the system detects a wireless communication device and determines how that cell phone should be treated. In this embodiment a cell phone is detected by the Communication Control Unit (2410). A Unique Identifier associated with the detected cell phone is determined (or extracted from the detected signal) and compared to a list of "authorized phones" (2420). If the phone is authorized to make a call, (authorization variables, include, time of call, person calling, person called, shift information, scheduling information, unit location, job position . . . ) (2430) the system then checks the location of the phone (2440) to determine whether the phone is authorized to make a call from that area.

In an embodiment of the invention, the signal detection system verifies the location of the wireless communication device; the zone database identifies and classifies each area of the facility (2460). For example, red areas or zones may be housing units, inmate areas, inmates cells, programs and inmate population areas, inmate rec yard, etc., grey areas may be perimeter areas which are susceptible to misidentification. (i.e., fence lines, wall perimeter). Green areas are areas such as administration areas, staff dominated areas. The exact location of the phone is important to determine whether this phone is actually within one of those restricted areas and/or sectors. Processing then continues to process the different zones (see FIG. 26A).

Figure 25:
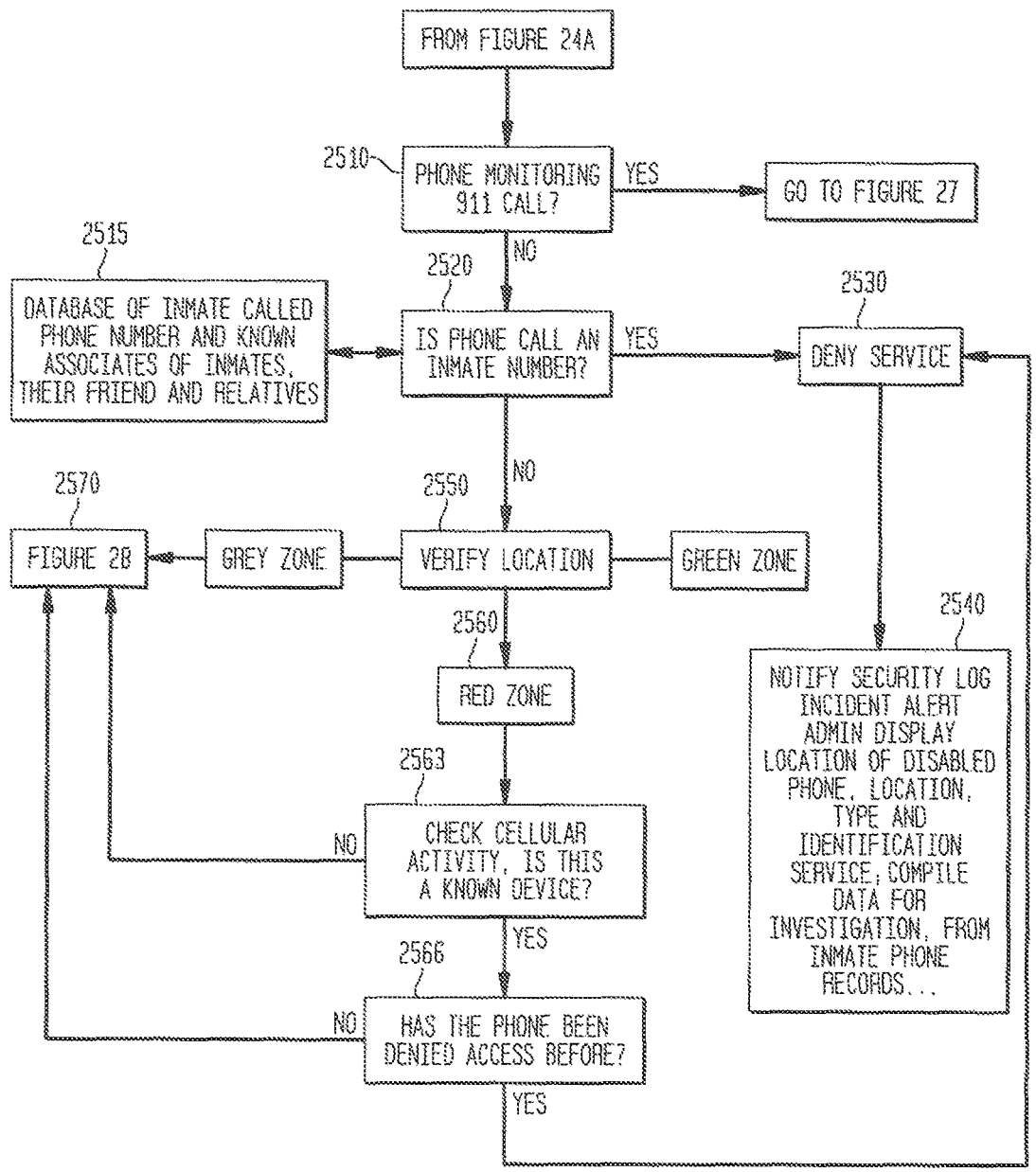
FIG. 25 further illustrates an exemplary process of determining authorized and/or unauthorized wireless communication devices.

In an embodiment, If the cell phone is not authorized, (2450) (cell phone is determined by the Unique Identifier not being on the authorized list), several scenarios need to be determined before the cell phone is denied making and/or receiving a call. Variables include, who is the caller trying to call, is this phone actually in a restricted area. FIG. 25 illustrates the processing to handle a cell phone that is indicated to not be an authorized cell phone (2452).

In an embodiment of the invention, the Communication Control Unit, controls and monitors cell phone activity to determine what number is being called and programs being executed on the cell phone. Additionally, the Communication Control Unit is monitoring the cell phone activity (email, messaging, tried calls,) so that all data is capable of being stored for retrieval and analysis. If the cell phone call is an emergency call (i.e., 911) the system determines how to handle the emergency call. Some options include, releasing the 911 call back to the commercial carrier to complete the 911 call, or redirecting the 911 call via a PBX connection routing the call to the facility security team or redirecting the call via a picocell and the like to the IP backhaul. The two latter options allow monitoring of the call automatically, and the former solution can be used to monitor the call. (See FIG. 27, for resolving 911 calls).

Returning to FIG. 24A, when the system verifies that the number trying to be called by the "not authorized" cell phone is not an inmate called phone number and/or a known number of an associates of inmates, their friends and relatives, processing continues in FIG. 25 (2452). A data base is generated (2515) from mining at least one of the Inmate phone calls, the inmate records, visitor records, the cell phone ID sensor in the lobby and other similar factors that may be used to define a profile of a user. If the telephone number being called is a known security risk (2520), which may be contained in the database numbers and/or the like, the system "denies service" (2530) to the cell phone and notifies security, logs the incident, alerts administration, displays a location of the disabled phone on a display, notates the location, type and Identification and service (2540). The system also compiles this data for investigation, and the like.

In an embodiment of the invention, if the "not authorized" cell phone/wireless device is trying to place a call, text message, email, or other similar electronic messaging (e.g., Twitter, Facetime, etc.) and the called/text-ed/communicated with device is unknown, and/or the wireless device is in standby, the system looks to the location of the phone to verify (2550) the phone is actually in a restricted zone (e.g., a red zone) (2560). If the detected phone is determined to be within a restricted zone (e.g., a red zone), a check is made (2563) whether the detected transmission device (i.e., cell phone) is one that is known. This check for being known may be based on information regarding whether there has been previous activity regarding this cell phone. If the device is not known, then processing continues as shown in FIG. 28 (2570). If the detected cell phone is known, then a determination is made (2566) whether the known cell phone has been previously denied service. If the device has not been previously denied service, the processing continues as shown in FIG. 28. Otherwise processing continues to block 2530 to deny service and notify the appropriate personnel (e.g., security) in order to log the detected call (2545).

FIG. 28 teaches how the Communication Control Unit (CCU) and/or the Cell Phone Detection System (CPDS) reconfirms the zone the cell phone is located (e.g., green, grey, red . . . ) to reliably insure that there has not been a mistake in identifying the zone (2810). If it may be positively determined that that the determined location is outside the restricted area, then processing checks whether the call dialed from the detected cell phone is one that is known. For example, from a neighbor or a staff member. In this case a weighted algorithm may use criteria such as a neighbors telephone number, a visitor's telephone number, or known telephone numbers of know agencies; local, state, federal, and other known entities. If the number is known, the processing continues to block 2855 to allow the call. Otherwise, processing continues to block 2815 to continue process.

At block 2815, the system checks the history of the known phone to see if the cell phone has been denied access before (e.g., previously a known inmate cell phone) (2805a). To check whether the phone has been denied access previously, the system runs a weighted set of algorithms (2820) to determine whether the cell phone, pending access, is actually an unauthorized phone or a phone which has, by accident, been picked up by the system (e.g., an employee, a visitor, and/or a neighbor outside of the restricted zone). Some of the variables which make up the analysis of the weighted algorithms are, but not limited to, a number of denials, a number of locations, a number of times numbers were called, the frequency of call attempts, a time and location of events, the volume of denials, times, frequency, period of time, error logs, missed identification logs, etc. When the system, detects a phone which is not an authorized phone, but also is confirmed to not pose a threat to the system, the detected cell phone is added to a "Possesses No Danger List". The agency decides how to deal with the phones on the "Possesses No Danger List." Some examples of cell phones that may be put on the Possesses No Danger List are neighbors who live next to a secure complex, people who work at the facility (employees), frequent pedestrian who walk frequently near the complex (visitors) and the like.

In an embodiment of the invention, the system uses different detection techniques such as phase angle cell phone detection, narrow band antenna signal detection, phase detection, amplitude detection, time-domain detection resolve the ambiguity and the precise location of the wireless device. If it is determined the cell phone is most likely outside the restricted zone the system checks to see if the number dialing is a neighbors, visitor, Staff/trusted persons (Possesses No Danger List). The system looks at databases which contain these numbers. The system also verifies whether this identification has been released before and verifies the reason for the release. The system also verifies whether the number being called is on a known agency list, state agency, and/or known entity.

In an embodiment of the invention, if the systems determines that the phone is not included on the Possesses No Danger list or there is an unambiguous determination to deny service (2824), (i.e., Positive weighting) then processing continues to step 2826 to deny service. However, if the system determines that the detected phone transmission belongs to a neighbor, and/or staff member, the system allows the call/text and/or the incoming call, and alerts facility administration. Optionally, the system may register neighbor phone(s) and staff phone(s), verify the location of the call, and may develop a matrix of "zone violation mis-identifications". Alternatively depending on policy denies service to said cell phone and the like.

Figure 26:
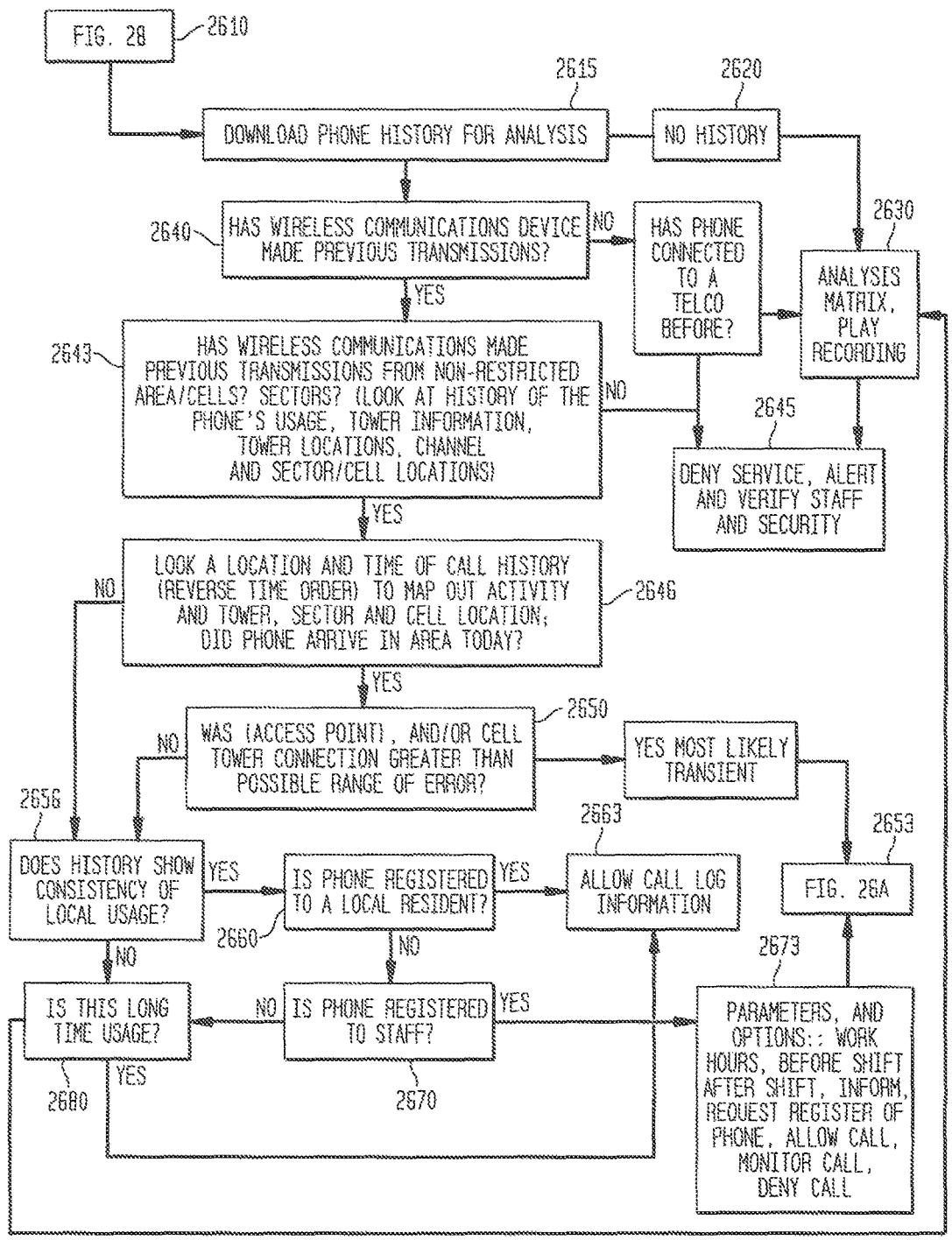
FIG. 26 further illustrates an exemplary process of determining authorized and/or unauthorized wireless communication devices.

In an embodiment of the invention, if it cannot be confirmed that the device is outside the restricted area and/or cannot confirm the previous history of that cell phone at the facility (i.e., negative weighting), the system runs additional tests (2822) and processing continues in FIG. 26.

FIG. 26 details an embodiment of the invention in which the system utilizes Telco (i.e., telephone company, wireless service provider) call history data to make a determination whether the wireless communications device is, new to the area, arrived that day, is a local cell phone, owned by a staff member, neighbor, relative of a neighbor is migrating through the area and the like. This TELCO data is also be used for investigative purposes to verify calls made by said phone calls received by said phone, messages and the like.

In an embodiment of the invention, upon entry from the processing shown in FIG. 28 (2610) the system downloads phone history from the commercial provider (2615) and uses the data to see whether the device has previous history (2620). The data from the TELCO may include, all data connections transfer, cell, locations connections (sector, Cell) transmission history, data, transmissions, GPS information, tower information connections history, Telco cell sector(s)/wireless access nodes, device ownership, payment information, name of owner. The system looks for phone's usage, tower information, tower locations, channel and sector/cell locations; checks to see if cell phone arrived in the area today; whether the cell phone belong to someone local; whether the phone history will show consistency of local usage; whether the phone registered to staff. With this analysis the system determines the likely hood that the cell phone is a legitimate cell phone or not and whether the call should be allowed and/or the phone should be allowed to receive calls.

If no history for the dialed telephone number is found, then an analysis is performed, (2630) as previously described, in order to deny the service and alert staff and security (2645).

Figure 26A:
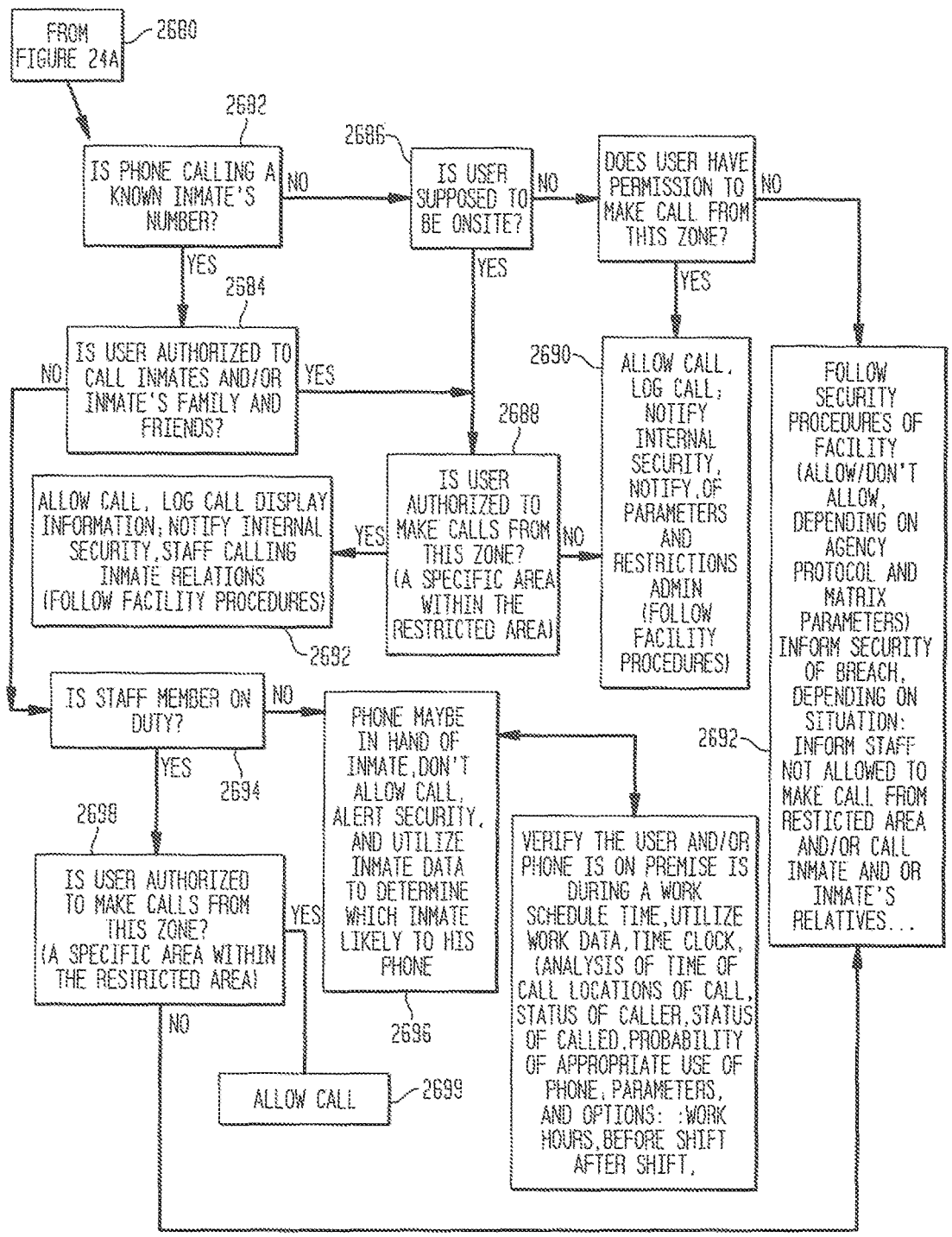
FIG. 26A further illustrates an exemplary process of determining authorized and/or unauthorized wireless communication devices.

Otherwise, a determination is made whether the device has made previous transmissions that have been detected (2640) and whether the previously detected calls were made from non-restricted areas (2643). If yes, then the history of location and times of the previously calls is made (2646). A determination is made using the history information to determine if the detected signal is a recent one (e.g., only received today). If yes, then a determination is made whether there is/could be an error in a connection range (2650). If yes, then the signal is deemed to be one of a transit and processing continues as shown in FIG. 26A (2653).

However, if there is no error in range, then a determination is made whether there is a consistency of local usage (2656). If there is consistent use then a determination is made whether the signal detected from the cell phone is registered to a local (or acceptable) user (2660). If so, then the call is allowed and information regarding the call is logged. (2663).

However, if the call is not from a registered user, a determination is made whether the detected signal is from a phone of an acceptable user, who is not registered (2670). If so then a request for registration is made (2673) and processing continues as shown in FIG. 26A (2653).

If the cell phone is not indicated to be registered to a staff member, then a determination is made whether there has been long term usage from this phone (2680). If so, then the call is allowed (2663). Otherwise the call is denied (2645).

Returning to FIG. 24A, processing determines an initial zone (e.g., red, green, grey) (2460) and proceeds to the processing shown in FIG. 26A Upon entry to the processing shown in FIG. 26A, from FIG. 24A (2680) a determination is made whether the phone verifies that the authorized user is not calling a known inmate's number (2682), and if the user is calling an inmate's number, verifying that the user is authorized to call inmates and/or inmate's family and friends (2684). Otherwise, the system verifies that the user is supposed to be onsite (2686) at the time the call is made and that the user has permission to make call from that specific zone (2688). In this case, the call may be allowed and logged. (2689).

Otherwise the call is allowed, but internal security procedures are implemented in order to monitor the call (2690).

Otherwise the service is denied and appropriate security procedures are initiated (2692).

If the user does not have permission to make the call from the determined zone, then the call is denied and appropriate security procedures are initiated (2692). In an embodiment of the invention, the system follows security procedures of the facility (allow/don't allow, depending on agency protocol and matrix parameters) to inform the staff of a security of breach. e.g., inform staff not allowed to make call from restricted area and/or call inmate and or inmate's relative.

Returning to block 2684, if the user is determined not to be authorized, then a determination is made whether a staff member (who may be associated with the called or called from number) is on duty (2694). If the staff member is not on duty, then the service is denied and appropriate security personnel are notified along with logging information regarding the call. Otherwise, a determination is made (2698) whether the user is authorized to make the detected call in the determined zone. If the user is authorized, then the call is allowed. (2699). However, if the user is not authorized, then the security is notified (2692).

In an embodiment of the invention, (see FIG. 27) the Communication Control Unit is currently controlling and monitoring the cell phone to determine if an emergency (i.e., 911) call is being attempted, wherein the system also records all numbers called and all texted messages and the like attempted to be transmitted. If a user tries to make a 911, (option 1) the Communication Control Unit routes the 911 call to either, a femtocell, (internet backhaul), PBX routed, or routes the 911 call straight to a facility based 911 center, or to the TELCO switch and/or another application in which the cell phone is still connected through the Communication Control Unit, while the call is being made. Once the call has finished, the unauthorized cell phone is placed back on a hold channel so that the unauthorized phone can not communicate further. All features of the cell phone are disabled except the voice and location indication.

Figure 27:
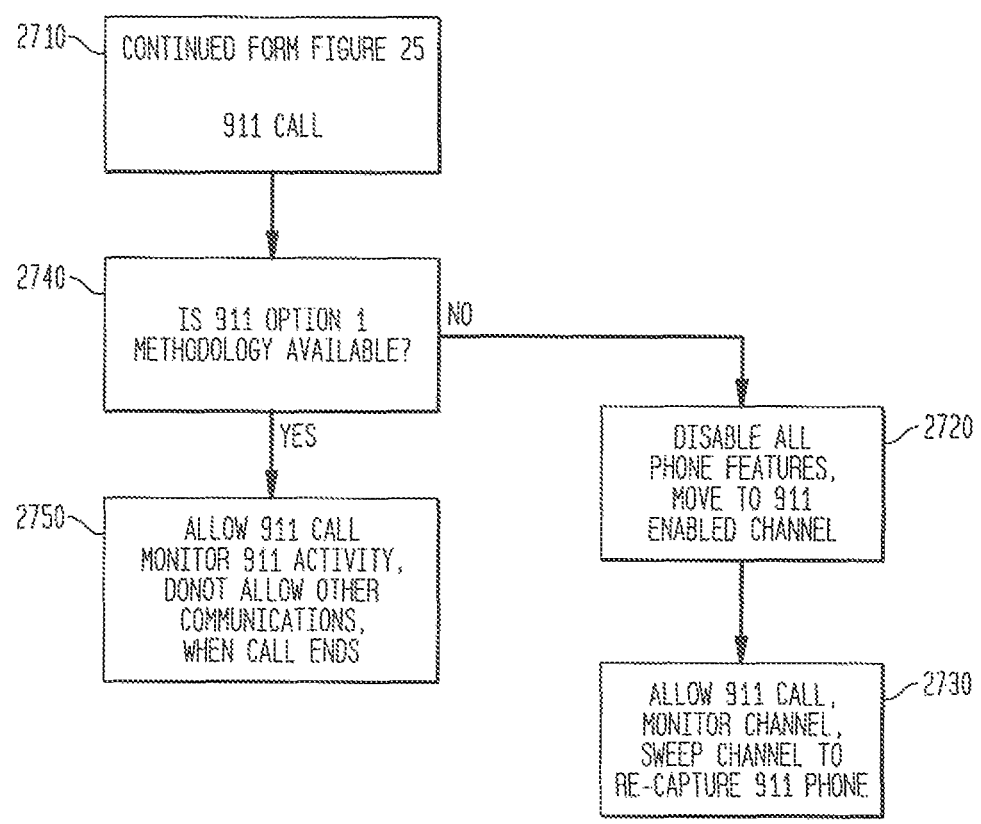
FIG. 27 further illustrates an exemplary process of determining authorized and/or unauthorized wireless communication devices.
Figure 2B:
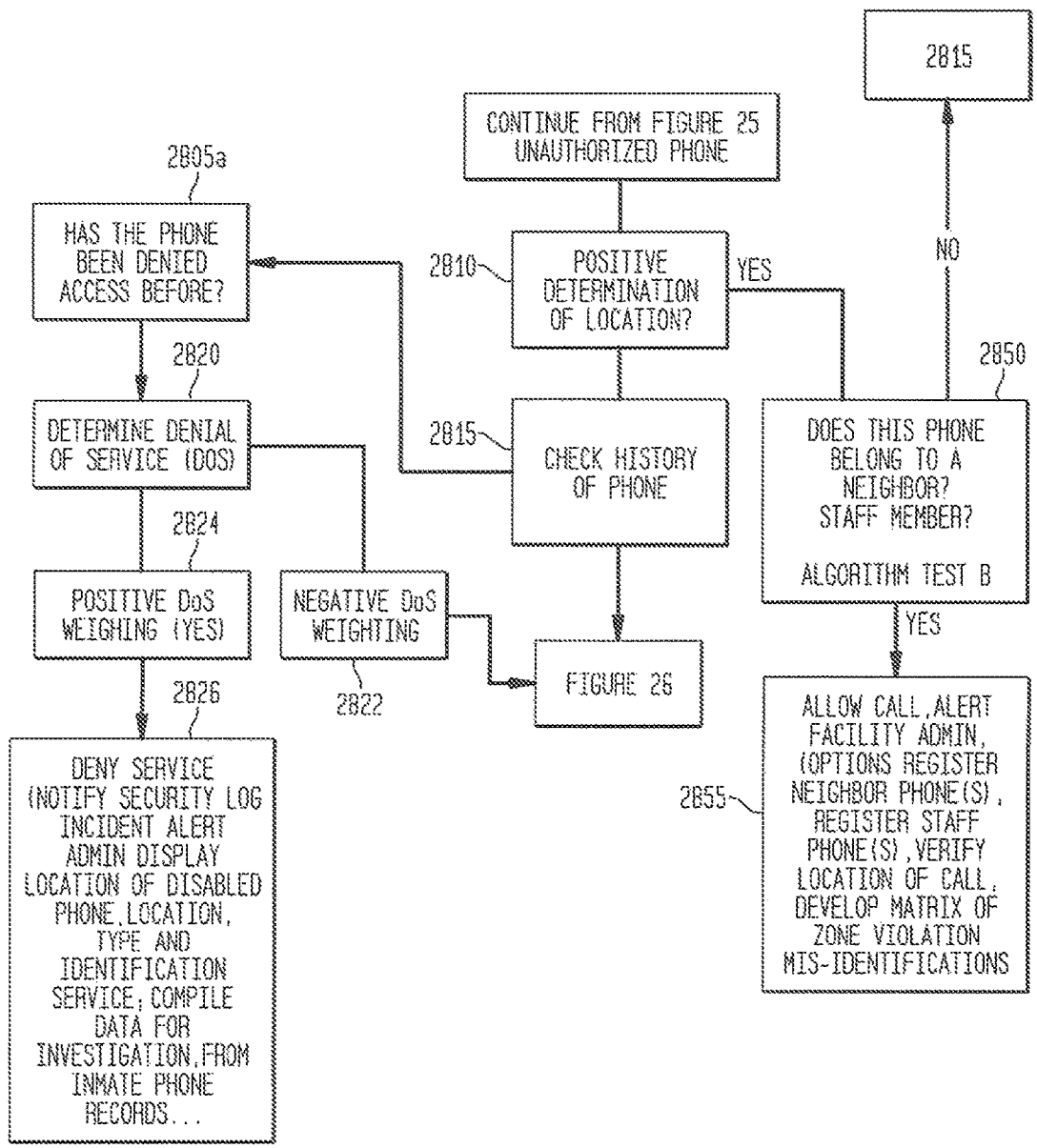

Returning to FIG. 25, if the determined telephone number being called is an emergency number (e.g., 911) (2510), the processing continues to FIG. 27, wherein the system (i.e., communication control unit) is currently controlling and monitoring the cell phone to determine the 911 call. Upon entry, in FIG. 27 (2710), the system determines that the user is making an emergency call (911) and the Communication Control Unit disables all phone features, moves the 911 wireless communication device to an enabled channel, allows the 911 call (passes it to a wireless provider), monitors the channel that the 911 call is using and sweeps the channel to re-capture 911 wireless communication device after the call is over. (2730).

Thus, in the processing shown in FIG. 27, the Communication Control Unit is currently controlling and monitoring the cell phone to determine if a user tries to make a 911 call. In one case, the Communication Control Unit disables all phone features, moves the 911 wireless communication device to an enabled channel, and allows the 911 call (2750). The TELCO monitors the channel that the 911 call is using. When the call is finished the TELCO disables the wireless communication device and switches the call back to the Communication Control Unit. The Communication Control Unit then sweeps the channel to re-capture the wireless communication device making the emergency call and places the cell phone back on a controlled channel (2750).

Figure 29:
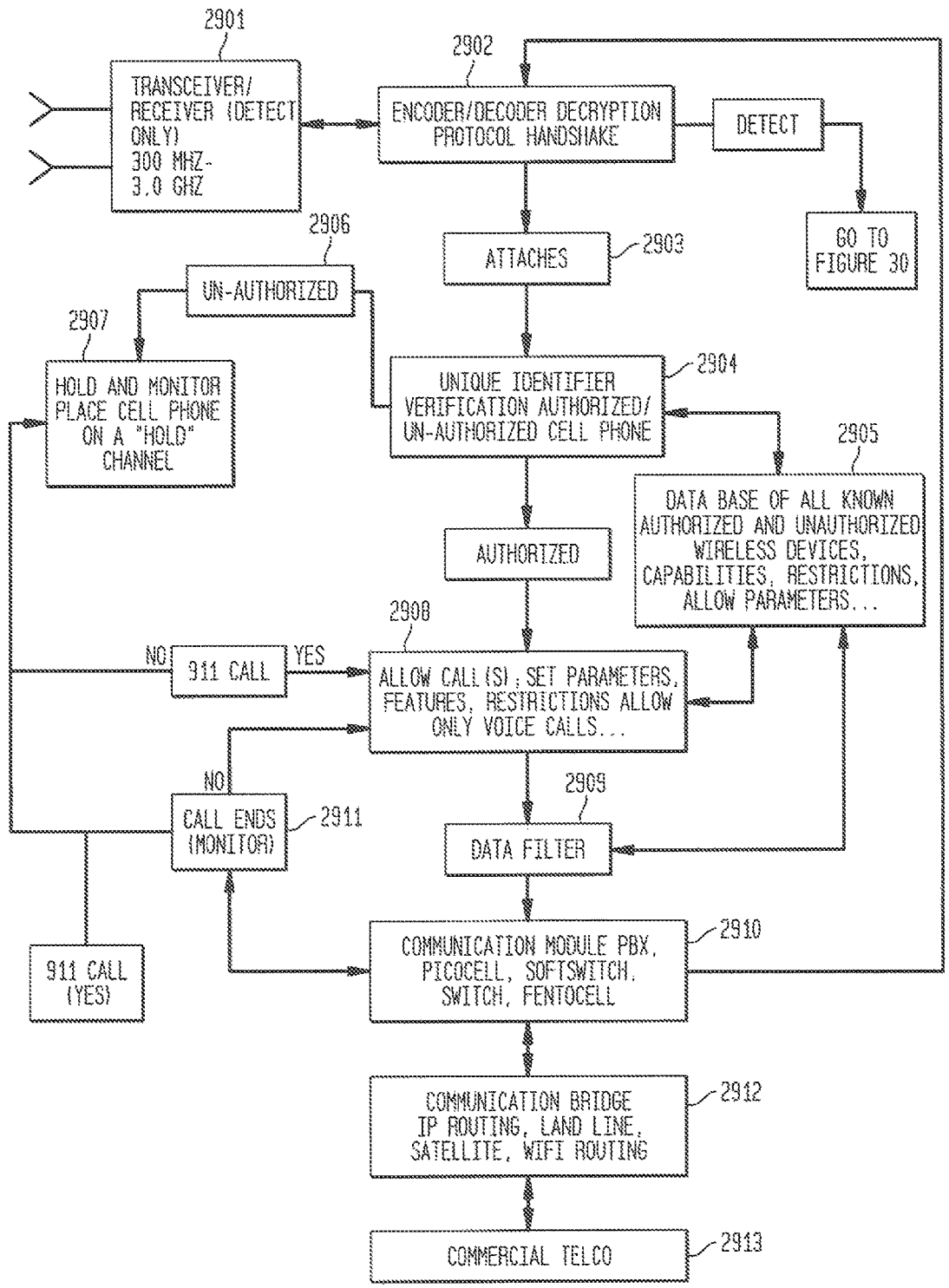
FIG. 29 further illustrates an exemplary process of determining authorized and/or unauthorized wireless communication devices.

In a preferred embodiment the system is a local wireless network that may be controlled by a Pseudo Tower as previously described, and does not allow restricted phones access to the macro wireless network (e.g., a wide area wireless communication channel operated by a third party) unless the phone is either authorized, or dialing an emergency call (i.e., 911). In the case of a 911 call the phone is prevented from making other communication while in a 911 call. In an preferred embodiment of the invention, as shown in FIG. 29, the system is made up of a transceiver (2901) which connects to an Encoder/decoder decryption protocol handshake (2902). In a preferred embodiment the system attaches to the wireless device (2903) via communication protocols, the system then compares (2904) the IMSI/ESN (a Unique Identifier) with the authorized list and/or know unauthorized list (2905). If the wireless device is on the unauthorized list (2905) the wireless device, is held, and its operations are monitored (2907). If the "held Phone" attempts to dial 911 the phone is allowed to make the call. However, the system restricts (2909) the phone's ability to place the call (2910) through the macro network without preventing the call from performing other activities (texting, piggybacking calls, email, data and the like). This is performed in one of several ways. In a preferred embodiment of the invention, the 911 call is routed through a communication module (2910) (PBX Module, which acts as a data filter and communication module) and rerouted locally via a landline to the operator (communication bridge) (2912). This allows the system to control the phone while allowing the call and preventing data transfers. In another embodiment, the phone is routed via a Data filter, (Software filter, allowing only voice communications) to the communication Module (2912), which bridges the call to the Macro network. This bridging can be performed by IP routing, Land line, satellite, Wi-Fi routing and the like (2912). In a preferred embodiment the 911 call is monitored (2911) and when the call is completed the phone is put back in the Hold and Monitor queue (2907). In a preferred embodiment the "Hold and Monitor queue" (2907) is a local network channel that is not used by the macro network. In a preferred embodiment, the Transceiver (2901) is transmitting on MACRO (Carrier Channel) used by the Telco and in their PRL list. Thus, all of the cell phones within the area of interest are routed through a local wireless network to the wide area (macro) network. In a preferred embodiment, the Transceiver (2901) will transmit signals on all know carrier frequencies.

Figure 30:
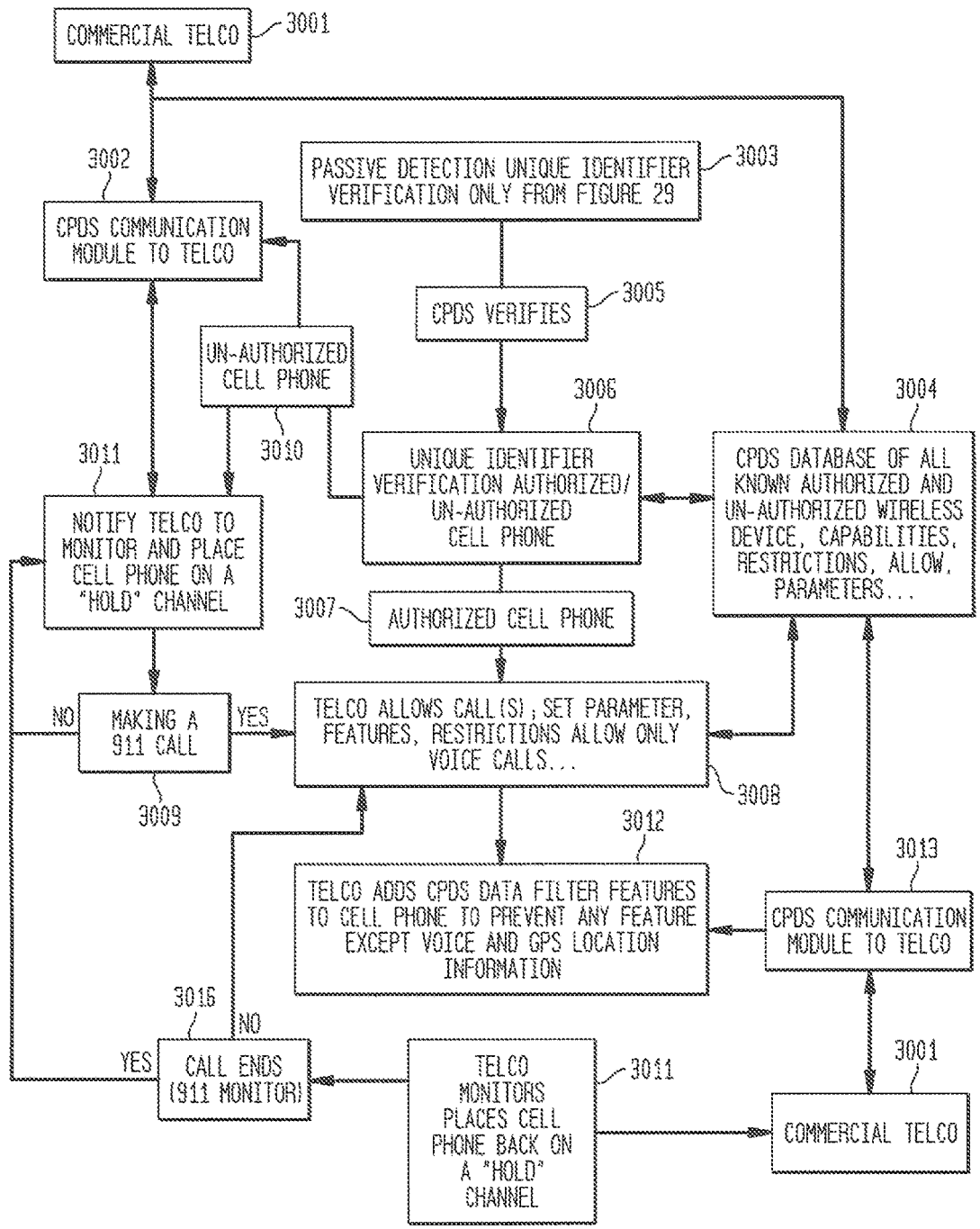
FIG. 30 further illustrates an exemplary process of determining authorized and/or unauthorized wireless communication devices.

In an embodiment of the invention, (see FIG. 30), The system detects a wireless communication with a unique Identifier, which is decoded (3003). The systems verifies whether the wireless communication device is authorized or unauthorized (3006). If the wireless communication device is authorized (3007), the Telco, allows the call to proceed (3008). In a preferred embodiment the Telco can be a commercial provider or a local private network and the like. The Telco restricts the ability of the wireless communication device to perform other features except voice only calls. If the wireless communication device is unauthorized (3010) the system notifies the Telco to hold and monitor the call (3011). If the caller tries to call 911 (3009), the Telco is instructed to allow the call but restricts the feature of the wireless communication device and allows voice only calls. The system (3012) instructs the TELCO to add CPDS Data filter features to cell phone to prevent any feature except voice and GPS location information.

It is expressly intended that all combinations of those elements that perform substantially the same function in substantially the same way to achieve the same results are within the scope of the invention. Substitutions of elements from one described embodiment to another are also fully intended and contemplated. For example, while the term "cell phone" or "transmission facility" or "transmission device" has been used herein, such terms relate to a general class of wireless transmission devices that includes standard cell phones, smart phones (e.g., PALM CENTRO), and iPhones. PALM is a registered trademark and CENTRO is a trademark of the Palm Inc., Sunnyvale, Calif. iPhone is a registered trademark of Apple Inc. Culpertino, Calif.

The terms "a" or "an" as used herein are to describe elements and components of the invention. This is done merely for convenience and to give a general sense of the invention. The description herein should be read to include one or at least one and the singular also includes the plural unless indicated to the contrary.

The term "comprises", "comprising", "includes", "including", "as", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

While there has been shown, described, and pointed out fundamental and novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

Any reference signs in the claims should not be construed as limiting the scope of the claims or the invention described by the subject matter claimed.

What is claimed is:

1. A system for managing wireless transmitting devices, said system comprising:
   at least one transceiving facility configured to:
      provide coverage of an area, and
      transmit least one signal, wherein a power of the transmitted at least one signal received within the area is at a greater value than a signal received in the area transmitted by a telecommunication facility associated with the area; and
      detect at least one transmission signal from one of said wireless transmitting devices;
   a processor in communication with said at least one transceiving facility and a memory, said memory including code, which when accessed by said processor configures said processor to:
      receive, from the at least one transceiving facility, at least one signal associated with the at least one detected transmission signal,
      determine a location and an identification of said one of said wireless transmitting devices associated with the detected at least one transmission signal;
      determine an allowability of said one of said wireless transmitting devices to operate within said area based on said identification and location of said one of said wireless transmitting devices;
      provide an indication regarding the detection of said one of said wireless transmitting devices to the telecommunication facility, said indication providing information regarding said determined allowability and said identification of said one of said wireless transmitting device,
      receive, from said telecommunication facility, information regarding said one of said wireless transmission devices, said information comprising historical information regarding usage of said one of said wireless transmission devices;
      re-confirm said indication of allowability based on said received information; and
      manage said one of said wireless transmitting devices based on said re-confirmed allowability.

2. The system of claim 1, wherein said processor is configured to:
   determine said identification from information associated with in said detected at least one transmission signal.

3. The system of claim 1, wherein said processor is configured to:
   determine an action being performed by said one of said wireless transmitting devices,
      wherein said action is one of: placing a call, sending a text message, sending an email, sending an electronic message, calling a number, making a call, retrieving data, accessing data, connecting to a IP backhaul connection, sending a picture, sending a data packet, connecting to a channel, receiving a call, receiving a text, receiving a IP backhaul call, receiving a message, receiving a picture, and receiving a data packet.

4. The system of claim 1, wherein said re-confirmation of allowability is determined based on at least one of: a voice recognition, a voice pattern of a caller, a voice pattern of a person being called, a voice pattern of a person on a call, words being spoken, an amount of money in an account, a program being executed on said one of said wireless transmitting devices, a location of said one of said wireless transmitting devices, an IMSI identification, an IMEI identification, an ESN identification, a signal identification, a channel identification, a tower identification, a time of call, a phone number called, a phone number not called, a previous activity of said one of said wireless transmitting devices, a phone number of a caller, an identification of a person calling, an identification of a person called, a shift information, a scheduling information, a unit location, and a job position.

5. The system of claim 4, wherein said previous activity includes at least one: a number of denials of service, a number of locations, a number of times numbers were called, a frequency of call attempts, a time and a location of events, a volume of denials, a time, a frequency, a period of time, error logs, missed identification logs, an indication of being new to the area, an indication of being a local cell phone, an indication of being owned by one of: a staff member, a neighbor, and a relative of a neighbor, all data connections, transfers of calls, a cell identification of said one of said wireless transmitting devices was in, location connections (sector, cell), a transmission history, a data, transmissions, a GPS information, a tower connection history, a Telco cell sector, a wireless access node, a device ownership, a payment information, a name of owner, a tower information, tower locations, a channel identification and a sector/cell location.

6. The system of claim 2, wherein said identification is determined from at least one of: a transmission frequency, a transmission identification number, a transmission time of arrival, a transmission type, a transmission characteristic, a transmission location, a transmission amplitude, a transmission width, a transmission frequency range, and an unique identifier.

7. The system of claim 1, wherein said telecommunication facility is at least one of: a telco switch, a picocell, an IP backhaul, a PBX switching system, a jamming unit, a transmitting unit, a hold channel, a channel, a communication module, a soft switch, a switch, a femtocell, a wide area wireless communication channel, a macro wireless network, PBX Module, a communication module, a data filter, a software filter, a wireless receiving unit, a base station, a satellite communication station, a camera system, a recording and transmission system, a graphical display, a text message system, a commercial carrier, a telephone company, a wireless telephone company and a wireless service provider.

8. The system of claim 1, wherein the processor is configured to:
provide an indication of disable to said telecommunication facility when said allowability is indicated as unallowed, wherein said indication of disable prevents said one of said wireless transmitting devices from performing at least one of: make a call, receive a call, send a text message, receive a text message, receive data, and send data.

9. The system of claim 1, wherein said telecommunication facility controls transmission signals associated with said one of said wireless transmitting devices based on the indication of allowability.

10. The system of claim 1, wherein said telecommunication facility manipulates said one of said wireless transmitting devices when said allowability is indicated to be unallowed.

11. The system of claim 1, wherein said location is determined based on at least one of:
a cell-sector system, an assisted-global positioning satellite, a GPS chipset technology, a standard GPS technology, a transmission enhanced-observed time difference technology, a transmission amplitude, a time difference of arrival, a time of arrival, an angle of arrival, a triangulation of detected signals associated with said one of said wireless transmitting devices based on proximity to known locations and transmission facilities, and a map-based location.

12. The system of claim 1, wherein the processor is configured to:
direct said one of said wireless transmitting devices to a hold channel, said hold channel preventing said one of said wireless transmitting devices from performing at least one of: make a call, receive a call, send a text message, receive a text message, receive data, send data, and call an emergency number.

13. The system of claim 1, wherein the processor is configured to:
monitor continued transmission of said one of said wireless transmitting devices when said one of said wireless transmitting devices is within said area.

14. The system of claim 1, wherein the processor is configured to:
provide an indication of enable to said telecommunication facility when said allowability is indicated as allowed, wherein said telecommunication facility allows continued transmission by said one of said wireless transmitting devices when said determined location is outside of said area.

15. The system of claim 1, wherein said processor is configured to:
disable all features, except voice communication during contact with an emergency number, of said one of said wireless transmitting devices when said one of said wireless transmitting devices is determined as unallowed.

16. A pseudo-tower system managing communications of wireless devices within an area controlled by said pseudo-tower, said pseudo-tower comprising:
at least one transmission facility configured to:
transmit into said area a signal having a higher signal power in said area than a power of a base station associated with a macro wireless system covering said area;
at least one transmission detection facility configured to:
detect signal transmission associated with wireless devices within said area,
a communication control center comprising:
a processor configured to:
receive at least one signal associated with one of said wireless devices;
determine an identification of said one of said wireless devices from information associated with said detected transmission signal;
determine an allowability of said one of said wireless devices based on said identification information, wherein said allowability is one of: allowed and unallowed;
provide instruction to the base station regarding said one of said wireless devices, said instruction including at least said identification and said determined allowability,
receive from the base station information associated with the said one of said wireless devices, said information comprising historical information regarding usage of said one of said wireless transmission device;
re-confirm the determined allowability based on the received information; and
manage said one of said wireless devices depending on the re-confirmed allowability.

17. The system of claim 16, wherein the processor is configured to:
determine said identification of said one of said wireless devices from said detected transmission signal.

18. The pseudo tower system of claim 16, wherein the processor is configured to:
determine an operation of said one of said wireless devices, said operation comprising at least one of: placing a call, sending a text message, sending an email, sending an electronic message, calling a number, making a call, retrieving data, accessing data, connecting to a IP backhaul connection, sending a picture, sending a data packet, connecting to a channel, receiving a call, receiving a text, receiving a IP backhaul call, receiving a message, receiving a picture, receiving a data packet.

19. The pseudo tower system of claim 16, wherein the processor is configured to:
re-confirm said allowability based on one of: a voice recognition, a voice pattern of a caller, a voice pattern of a person being called, a voice pattern of any person on the call, words being spoken, an amount of money in an account, programs being executed on the one of said wireless devices, a location of the one of said wireless devices, an IMSI identification, an IMEI identification, an ESN identification, a signal identification, a channel identification, a tower identification, a time of call, a phone number called, a phone number not called, a previous activity, a phone number of a caller, a person calling, a person called, a shift information, a scheduling information, a unit location, and a job position.

20. The pseudo tower system of claim 19, wherein said previous activity includes at least one of: a number of denials, a number of locations, a number of times numbers were called, the frequency of call attempts, a time and a location of events, a volume of denials, a time, a frequency, a period of time, error logs, missed identification logs, a new to the area indication, an arrived that day indication, a local cell phone, an indication of owned by one of: a staff member, a neighbor, a relative of a neighbor migrating thru the area, all data connections transfer, a cell, a locations connections (sector, cell), transmission history, data, a GPS information, a tower information connections history, a Telco cell sector, a wireless access node, a device ownership, a payment information, a name of an owner, tower information, tower locations, channel and sector/cell locations.

21. The pseudo tower system of claim 16, wherein said identification includes at least one unique characteristic determined from at least one of: a transmission frequency, a transmission identification number, a transmission time of arrival, a transmission type, a transmission characteristic, a transmission location, a transmission amplitude, a transmission width, a transmission frequency range, and an unique identifier.

22. The pseudo tower system of claim 16, wherein said base station is at least one of: a telco switch, a picocell, an IP backhaul, a PBX switching system, a jamming unit, a transmitting unit, a hold channel, a channel, a communication module, a soft switch, a switch, femtocell, a wide area wireless communication channel, a macro wireless network, a PBX Module, a data filter, a software filter, a wireless receiving unit, a base station, a satellite communication station, a camera system, a recording and transmission system, a graphical display, a text message system, a commercial carrier, a telephone company, a wireless telephone company and a wireless service provider.

23. The pseudo tower system of claim 16, wherein said processor is configured to:
provide an indication of unallowed to said base station wherein the base station is configured to:
disable said one of said wireless devices from performing at least one of:
make a call, receive a call, send a text message, receive a text message, receive data, and send data.

24. The pseudo tower system of claim 23, wherein said base station manipulates said one of said wireless devices when said allowability is indicated to be unallowed.

25. The pseudo tower system of claim 16, wherein said location of said one of said wireless devices is determined from at least one of: a cell-sector system, an assisted-global positioning satellite, a GPS chipset technology, a standard GPS technology, a transmission enhanced-observed time difference technology, a transmission amplitude, a time difference of arrival, a time of arrival, an angle of arrival, a triangulation of said transmission facility based on proximity to known locations and transmission facilities, and a map-based location.

26. The pseudo tower system of claim 16, wherein when said allowability is determined to be unallowed, said processor is configured to:
prevent the one of said wireless devices from performing at least one of: make a call, receive a call, send a text message, receive a text message, receive data, send data, and call an emergency number.

27. The pseudo tower system of claim 16, the processor configured to:
provide an indication of allowed to said base station when said one of said wireless devices is outside of said area.

28. The pseudo tower system of claim 16, wherein the processor is configured to:
monitor continued transmission of said one of said wireless devices when said detected transmission is within said area.

29. The system of claim 16, wherein when said allowability is determined to be allowed, said processor is configured to:
direct said one of said wireless devices to a carrier channel of said base station to allow said one of said wireless devices to communicate further.

* * * * *